(12) United States Patent
Balassanian et al.

(10) Patent No.: US 11,914,919 B2
(45) Date of Patent: Feb. 27, 2024

(54) LISTENER-DEFINED CONTROLS FOR MUSIC CONTENT GENERATION

(71) Applicant: AiMi Inc., Austin, TX (US)

(72) Inventors: Edward Balassanian, Austin, TX (US); Patrick E. Hutchings, Melbourne (AU); Toby Gifford, Melbourne (AU)

(73) Assignee: AiMi Inc., Austin, TX (US)

( * ) Notice: Subject to any disclaimer, the term of this patent is extended or adjusted under 35 U.S.C. 154(b) by 350 days.

(21) Appl. No.: 17/174,075

(22) Filed: Feb. 11, 2021

(65) Prior Publication Data

US 2021/0247955 A1 Aug. 12, 2021

Related U.S. Application Data

(60) Provisional application No. 63/068,433, filed on Aug. 21, 2020, provisional application No. 63/068,431, (Continued)

(51) Int. Cl.
*G06F 3/16* (2006.01)
*G05B 15/02* (2006.01)
(Continued)

(52) U.S. Cl.
CPC ........... *G06F 3/165* (2013.01); *G05B 13/027* (2013.01); *G05B 15/02* (2013.01); *G06F 21/105* (2013.01);
(Continued)

(58) Field of Classification Search
CPC ........ G06F 3/165; G06F 21/105; G06F 21/16; G05B 13/027; G05B 15/02; G10H 1/0025;
(Continued)

(56) References Cited

U.S. PATENT DOCUMENTS 5,410,100 A 4/1995 Kim
5,589,947 A 12/1996 Sato et al.
(Continued)

FOREIGN PATENT DOCUMENTS

CN 110089137 A 8/2019
CN 110444185 A 11/2019
(Continued)

OTHER PUBLICATIONS

International Search Report and Written Opinion in PCT Appl. No. PCT/US2021/017722 dated May 26, 2021, 12 pages.
(Continued)

*Primary Examiner* — Joseph Saunders, Jr.
(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed relating to implementing user-created controls to modify music content. A music generator system may be configured to automatically generate output music content by selecting and combining audio tracks based on various parameters. Users may create their own control elements that the music generator system may train (e.g., using AI techniques) to generate output music content according to a user's intended functionality of a user-created control element.

20 Claims, 25 Drawing Sheets

Related U.S. Application Data filed on Aug. 21, 2020, provisional application No. 63/028,233, filed on May 21, 2020, provisional application No. 62/972,711, filed on Feb. 11, 2020.

(51) Int. Cl.

| | |
|---|---|
| G10L 21/12 | (2013.01) |
| G06F 21/10 | (2013.01) |
| G06F 21/16 | (2013.01) |
| H04L 9/06 | (2006.01) |
| G05B 13/02 | (2006.01) |
| G10L 25/06 | (2013.01) |
| G10H 1/00 | (2006.01) |
| G10H 1/06 | (2006.01) |
| H04L 9/00 | (2022.01) |

(52) U.S. Cl.
CPC .......... *G06F 21/16* (2013.01); *G10H 1/0025* (2013.01); *G10H 1/0066* (2013.01); *G10H 1/06* (2013.01); *G10L 21/12* (2013.01); *G10L 25/06* (2013.01); *H04L 9/0637* (2013.01); *H04L 9/0643* (2013.01); *G10H 2210/076* (2013.01); *G10H 2220/126* (2013.01); *H04L 9/50* (2022.05)

(58) Field of Classification Search
CPC .. G10H 1/0066; G10H 1/06; G10H 2210/076; G10H 2220/126; G10L 21/12; G10L 25/06; H04L 9/0637; H04L 9/0643; H04L 9/50

See application file for complete search history.

(56) References Cited

U.S. PATENT DOCUMENTS

| | | | |
|---|---|---|---|
| 6,297,439 | B1 | 10/2001 | Browne |
| 6,506,969 | B1 | 1/2003 | Baron |
| 7,491,878 | B2 | 2/2009 | Orr |
| 8,115,090 | B2 | 2/2012 | Miyajima et al. |
| 8,751,030 | B2 | 6/2014 | You et al. |
| 8,812,144 | B2 | 8/2014 | Balassanian |
| 9,471,271 | B2 | 10/2016 | Georges et al. |
| 9,799,312 | B1 * | 10/2017 | Cabral ............ G06N 5/04 |
| 9,977,645 | B2 * | 5/2018 | Herlöfsson ........ H04H 60/04 |
| 2004/0199395 | A1 | 10/2004 | Schulz |
| 2005/0267819 | A1 | 12/2005 | Kaplan |
| 2008/0092721 | A1 | 4/2008 | Schnepel et al. |
| 2008/0249644 | A1 | 10/2008 | Jehan |
| 2008/0276793 | A1 | 11/2008 | Yamashita et al. |
| 2008/0314228 | A1 | 12/2008 | Dreyfuss et al. |
| 2009/0069917 | A1 | 3/2009 | Yamashita |
| 2009/0107320 | A1 | 4/2009 | Willacy |
| 2009/0157203 | A1 | 6/2009 | Bregar et al. |
| 2009/0164034 | A1 | 6/2009 | Cohen et al. |
| 2009/0231968 | A1 | 9/2009 | Ochi et al. |
| 2010/0071535 | A1 | 3/2010 | McKinney et al. |
| 2010/0146583 | A1 | 6/2010 | Prehofer et al. |
| 2011/0054646 | A1 | 3/2011 | Hernandez et al. |
| 2012/0192701 | A1 | 8/2012 | Watanabe et al. |
| 2014/0260909 | A1 | 9/2014 | Matusiak |
| 2014/0314391 | A1 | 10/2014 | Kim et al. |
| 2015/0179156 | A1 | 6/2015 | Uemura et al. |
| 2015/0179157 | A1 | 6/2015 | Chon et al. |
| 2015/0234564 | A1 | 8/2015 | Snibbe et al. |
| 2015/0347971 | A1 | 12/2015 | D'Amore et al. |
| 2016/0379611 | A1 | 12/2016 | Georges et al. |
| 2017/0062006 | A1 | 3/2017 | Plom et al. |
| 2017/0092247 | A1 | 3/2017 | Silverstein |
| 2017/0287135 | A1 | 10/2017 | Pozos et al. |
| 2018/0226063 | A1 | 8/2018 | Wood et al. |
| 2018/0247624 | A1 | 8/2018 | Elkins |
| 2020/0021966 | A1 | 1/2020 | Wylie et al. |
| 2020/0090632 | A1 * | 3/2020 | Rein ............ G06N 20/00 |
| 2020/0265817 | A1 | 8/2020 | Elkins |
| 2020/0402488 | A1 | 12/2020 | Williams |
| 2021/0247954 | A1 | 8/2021 | Balassanian et al. |
| 2021/0247955 | A1 | 8/2021 | Balassanian et al. |
| 2021/0248213 | A1 | 8/2021 | Balassanian et al. |
| 2021/0248983 | A1 | 8/2021 | Balassanian et al. |
| 2021/0319774 | A1 | 10/2021 | Elkins |
| 2022/0059062 | A1 | 2/2022 | Balassanian et al. |

FOREIGN PATENT DOCUMENTS

| | | |
|---|---|---|
| CN | 115331648 A | 11/2022 |
| JP | H08293039 A | 11/1996 |
| JP | 2559390 B2 | 12/1996 |
| JP | 2006084749 A | 3/2006 |
| WO | 2017/087333 | 5/2017 |

OTHER PUBLICATIONS

Modrzejewski et al., "Application of Deep Neural Networks to Music Composition Based on MIDI Datasets and Graphical Representation," May 24, 2019, Advances Indatabases and Information Systems; pp. 143-152, XP047508521.

Guan et al., "A GAN Model With Self-attention Mechanism to Generate Multi-instruments Symbolic Music," 2019 International Joint Conference on Neural Networks (IJCNN), IEEE, Jul. 14, 2019, pp. 1-6, XP033622129.

Casini et al., "Some Reflections on the Potential and Limitations of Deep Learning for Automated Music Generation," 2018 IEEE 29th Annual Internationalsymposium on Personal, Indoor and Mobileradio Communications (PIMRC), IEEE, Sep. 9, 2018, pp. 27-31, XP03347968.

ProTools Reference Guide (Year: 2019).

Open Music Initiative—Minimum Viable Interoperability Meeting Notes (Year: 2017).

Open Music Initiative—Minimum Viable Interoperability requirements (Year: 2017).

ID3 draft specification (Year: 2000).

MusicXML manual (Year: 2011).

Yakov Vorobyev and Eric Coomes, "Beyond Beatmatching—Take your DJ Career to the Next Level," Mixed in Key LLC, 2012, 129 pages.

International Search Report and Written Opinion in Application No. PCT/US13/55445 dated Jan. 17, 2014, 9 pages.

International Search Report and Written Opinion in Application No. PCT/US2019/033686 dated Aug. 16, 2019, 26 pages.

Christopher Anderson et al., "The Generative Electronic Dance Music Algorithmic System (GEDMAS)," Musical Metacreation: Papers from the 2013 AIIDE Workshop (WS-13-22), pp. 5-8.

Andrew R. Brown et al., "Adaptive Music Techniques," Improvise: The Australasian Computer Music Conference, pp. 26-31.

Carlos Castellanos, et al. "Biometric Tendency Recognition and Classification System: An Artistic Approach," Conference Paper, Sep. 2008, 8 pages.

Nick Collins, "INFNO: Generating Synth Pop and Electronic Dance Music on Demand," International Computer Music Conference, ICMC Aug. 2008, 4 pages.

Arne Eigenfeldt et al., "Evolving Structures for Electronic Dance Music," Genetic and Evolutionary Computation Conference (GECCO), Jul. 2013, 8 pages.

Toby Gifford, "Tuning Into the Task: Sonic Environmental Cues and Mental Task Switching," The 22nd International Conference on Auditory Display (ICAD-2016), Jul. 2-8, 2016, 6 pages.

Jon McCormack et al., "In a Silent Way: Communication Between AI and Improvising Musicians Beyond Sound," Proceedings of the 2019 CHI Conference on Human Factors in Computing Systems; Paper No. 38, May 4-9, 2019, 11 pages.

Steven R. Livingstone et al., "Dynamic Response: Real-Time Adaptation for Music Emotion," Australasian conference on Interactive Entertainment, 11, 2005, 7 pages.

Steven R. Livingstone et al., "Controlling musical emotionality: an affective computational architecture for influencing musical emotions," Digital Creativity, 2007, vol. 18, No. 1, pp. 43-53.

(56) References Cited

OTHER PUBLICATIONS

Aengus Martin et al., "Implementation of a Real-Time Musical Decision-Maker," ACMC 2012 Conference Proceedings, pp. 44-50.
Jack Stockholm et al., "Reinforcement Learning of Listener Response for Mood Classification of Audio," 12th IEEE International Conference on Computational Science and Engineering, Aug. 29-31, 2009, 5 pages.
International Preliminary Report in PCT Appl. No. PCT/US2019/033686 dated Aug. 18, 2020, 14 pages.
Office Action in U.S. Appl. No. 17/174,052 dated May 24, 2023, 10 pages.
Office Action in Japanese Appl. No. 2022-548683 dated Aug. 15, 2023, 6 pages.
Office Action in European Appl. No. 21710719.2 dated Oct. 2, 2023, 7 pages.
Notice of Allowance in U.S. Appl. No. 17/174,052 dated Nov. 29, 2023, 8 pages.
Office Action in U.S. Appl. No. 17/174,084 dated Nov. 30, 2023, 23 pages.
Kudumakis et al., "The Challenge: From MPEG Intellectual Property Rights Ontologies to Smart Contracts and Blockchains," IEEE Signal Processing Magazine, Mar. 2020, pp. 89-95.

\* cited by examiner

Example Greyscale Image Representation for Drum Beat 316

Example Greyscale Image Representation for Melody 316

| File identifier | Start timestamp | Total time |
|---|---|---|
| 1928572849 | 03/04/2020 16:32 PST | 32 |
| 5837682639 | 03/04/2020 16:37 PST | 38 |
| 2746512110 | 03/04/2020 16:38 PST | 37 |
| 9089784944 | 03/04/2020 16:44 PST | 12 |

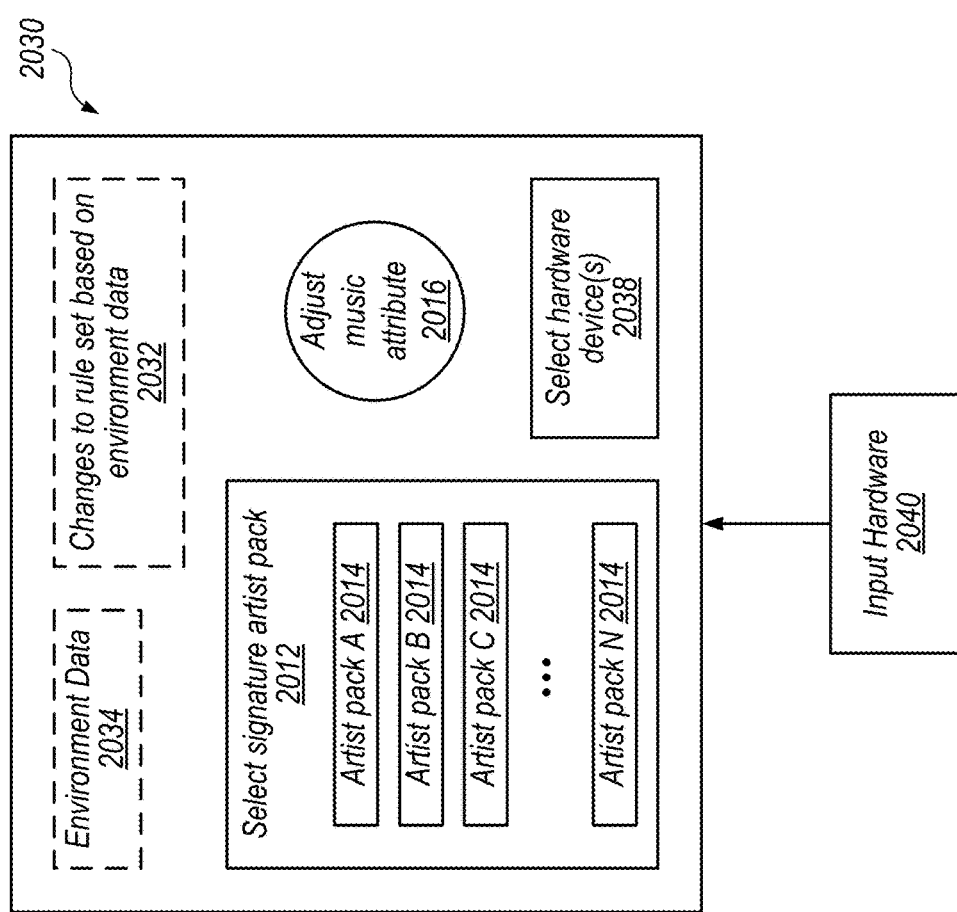
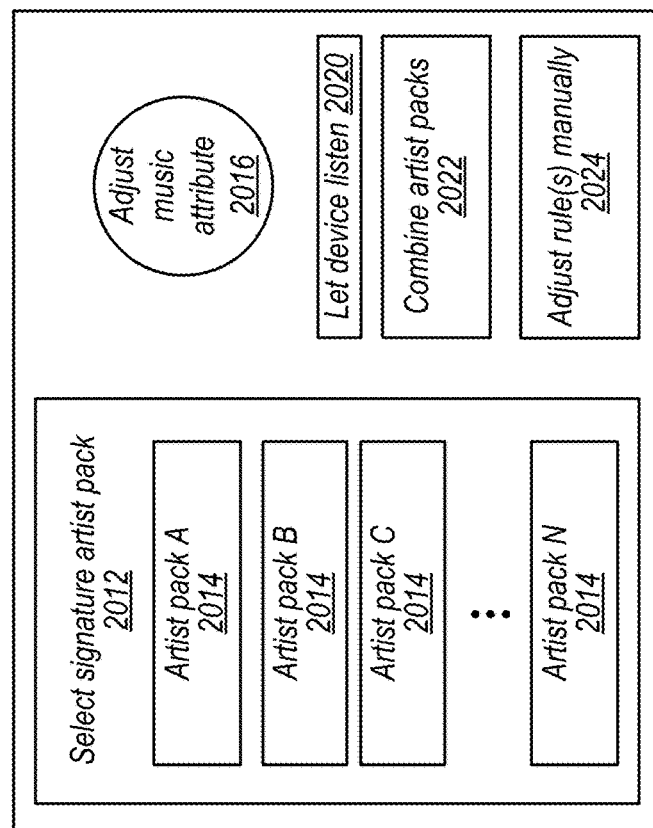
FIG. 20B
FIG. 20A

FIG. 22

LISTENER-DEFINED CONTROLS FOR MUSIC CONTENT GENERATION

PRIORITY CLAIM

This application claims the benefit of U.S. Provisional Application No. 62/972,711, filed on Feb. 11, 2020; U.S. Provisional Application No. 63/028,233, filed May 21, 2020; U.S. Provisional Application No. 63/068,431, filed Aug. 21, 2020; and U.S. Provisional Application No. 63/068,433 filed Aug. 21, 2020, each of which is incorporated by reference herein in its entirety.

BACKGROUND

Technical Field

This disclosure relates to audio engineering and more particularly to generating music content.

Description of the Related Art

Streaming music services typically provide songs to users via the Internet. Users may subscribe to these services and stream music through a web browser or application. Examples of such services include PANDORA, SPOTIFY, GROOVESHARK, etc. Often, a user can select a genre of music or specific artists to stream. Users can typically rate songs (e.g., using a star rating or a like/dislike system), and some music services may tailor which songs are streamed to a user based on previous ratings. The cost of running a streaming service (which may include paying royalties for each streamed song) is typically covered by user subscription costs and/or advertisements played between songs.

Song selection may be limited by licensing agreements and the number of songs written for a particular genre. Users may become tired of hearing the same songs in a particular genre. Further, these services may not tune music to users' tastes, environment, behavior, etc.

BRIEF DESCRIPTION OF THE DRAWINGS

FIGS. 20A-20B are block diagrams illustrating graphical user interfaces, according to some embodiments.

FIG. 22 is a diagram illustrating an example buildup section of music content, according to some embodiments.

Figure 1:
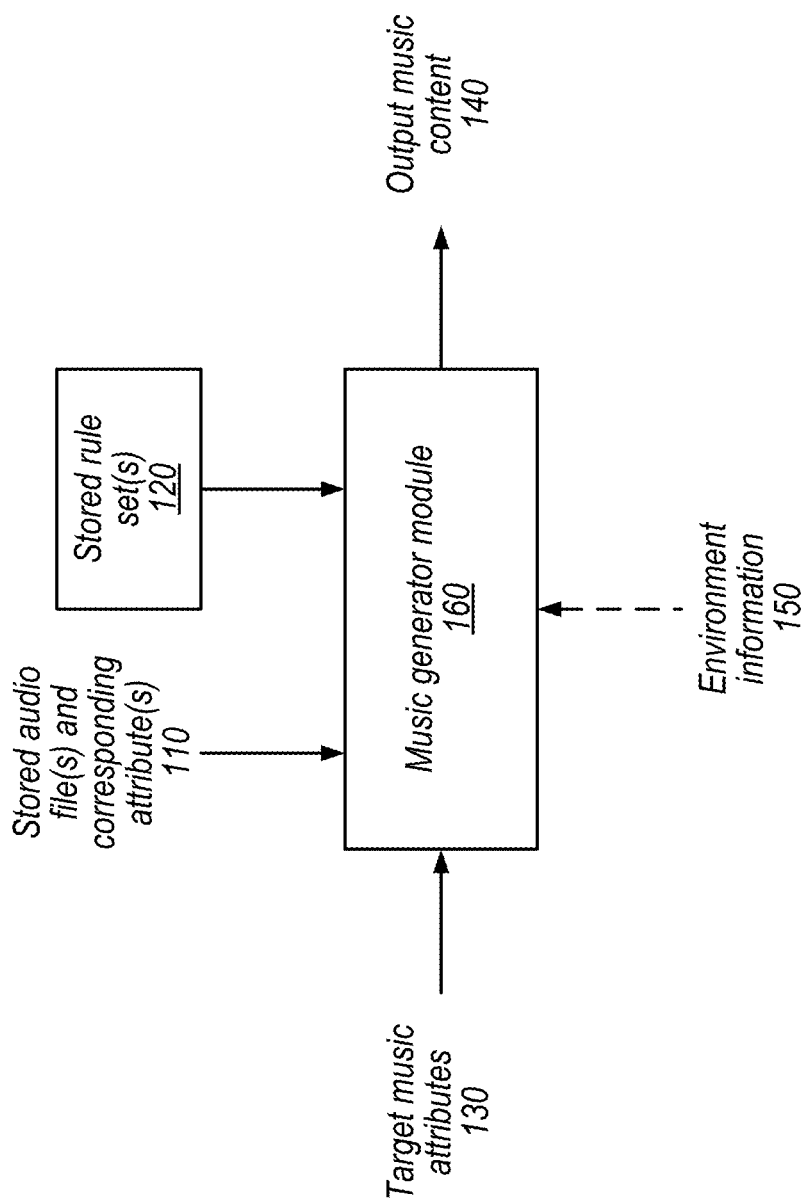
FIG. 1 is a diagram illustrating an exemplary music generator.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

U.S. patent application Ser. No. 13/969,372, filed Aug. 16, 2013 (now U.S. Pat. No. 8,812,144), which is incorporated by reference herein in its entirety, discusses techniques for generating music content based on one or more musical attributes. To the extent that any interpretation is made based on a perceived conflict between definitions of the '372 application and the remainder of the disclosure, the present disclosure is intended to govern. The musical attributes may be input by a user or may be determined based on environment information such as ambient noise, lighting, etc. The '372 disclosure discusses techniques for selecting stored loops and/or tracks or generating new loops/tracks, and layering selected loops/tracks to generate output music content.

U.S. patent application Ser. No. 16/420,456, filed May 23, 2019 (now U.S. Pat. No. 10,679,596), which is incorporated by reference herein in its entirety, discusses techniques for generating music content. To the extent that any interpretation is made based on a perceived conflict between definitions of the '456 application and the remainder of the disclosure, the present disclosure is intended to govern. Music may be generated based on input by a user or using computer-implemented methods. The '456 disclosure discusses various music generator embodiments.

The present disclosure generally relates to systems for generating custom music content by selecting and combining audio tracks based on various parameters. In various embodiments, machine learning algorithms (including neural networks such as deep learning neural networks) are configured to generate and customize music content to particular users. In some embodiments, users may create their own control elements and the computing system may be trained to generate output music content according to a user's intended functionality of a user-defined control element. In some embodiments, playback data of music content generated by techniques described herein may be recorded in order to record and track the usage of various music content by different rights-holders (e.g., copyright holders). The various techniques discussed below may provide more relevant custom music for different contexts, facilitate generating music according to a particular sound, allow users more control of how music is generated, generate music that achieves one or more specific goals, generate music in real-time to accompany other content, etc.

As used herein, the term "audio file" refers to sound information for music content. For instance, sound information may include data that describes music content in as raw audio in a format such as way, aiff, or FLAC. Properties of the music content may be included in the sound information. Properties may include, for example, quantifiable musical properties such as instrument classification, pitch transcription, beat timings, tempo, file length, and audio amplitude in multiple frequency bins. In some embodiments, an audio file includes sound information over a particular time interval. In various embodiments, audio files include loops. As used herein, the term "loop" refers to sound information for a single instrument over a particular time interval. Various techniques discussed with reference to audio files may also be performed using loops that include a single instrument. Audio files or loops may be played in a repeated manner (e.g., a 30 second audio file may be played four times in a row to generate 2 minutes of music content), but audio files may also be played once, e.g., without being repeated.

In some embodiments, image representations of audio files are generated and used to generate music content. Image representations of audio files may be generated based on data in the audio files and MIDI representations of the audio files. The image representations may be, for example, two-dimensional (2D) image representations of pitch and rhythm determined from the MIDI representations of the audio files. Rules (e.g., composition rules) may be applied to the image representations to select audio files to be used to generate new music content. In various embodiments, machine learning/neural networks are implemented on the image representations to select the audio files for combining to generate new music content. In some embodiments, the image representations are compressed (e.g., lower resolution) versions of the audio files. Compressing the image representations can increase the speed in searching for selected music content in the image representations.

In some embodiments, a music generator may generate new music content based on various parameter representations of the audio files. For instance, an audio file typically has an audio signal that can be represented as a graph of the signal (e.g., signal amplitude, frequency, or a combination thereof) relative to time. The time-based representation, however, is dependent on the tempo of the music content. In various embodiments, the audio file is also represented using a graph of the signal relative to beats (e.g., a signal graph). The signal graph is independent to tempo, which allows for tempo invariant modification of audio parameters of the music content.

In some embodiments, a music generator allows a user to create and label user-defined controls. For example, a user may create a control that the music generator can then train to influence the music according to the user's preferences. In various embodiments, user-defined controls are high-level controls such as controls that adjust mood, intensity, or genre. Such controls are typically subjective measures that are based on a listener's individual preferences. In some embodiments, a user creates and labels a control for a user-defined parameter. The music generator may then play various music files and allow the user to modify the music according to the user-defined parameter. The music generator may learn and store the user's preferences based on the user's adjustment of the user-defined parameter. Thus, during later playback, the user-defined control for the user-defined parameter may be adjusted by the user and the music generator adjusts the music playback according to the user's preferences. In some embodiments, the music generator may also select music content according to the user's preferences set by the user-defined parameter.

In some embodiments, music content generated by the music generator includes music with various stakeholder entities (e.g., rights-holders or copyright holders). In commercial applications with continuous playback of the generated music content, remuneration based on the playback of individual audio tracks (files) may be difficult. Thus, in various embodiments, techniques are implemented for recording playback data of continuous music content. The recorded playback data may include information pertaining to the playback time of individual audio tracks within the continuous music content matched with the stakeholder for each individual audio track. Additionally, techniques may be implemented to prevent tampering with the playback data information. For instance, the playback data information may be stored in a publicly accessible, immutable blockchain ledger.

Figure 2:
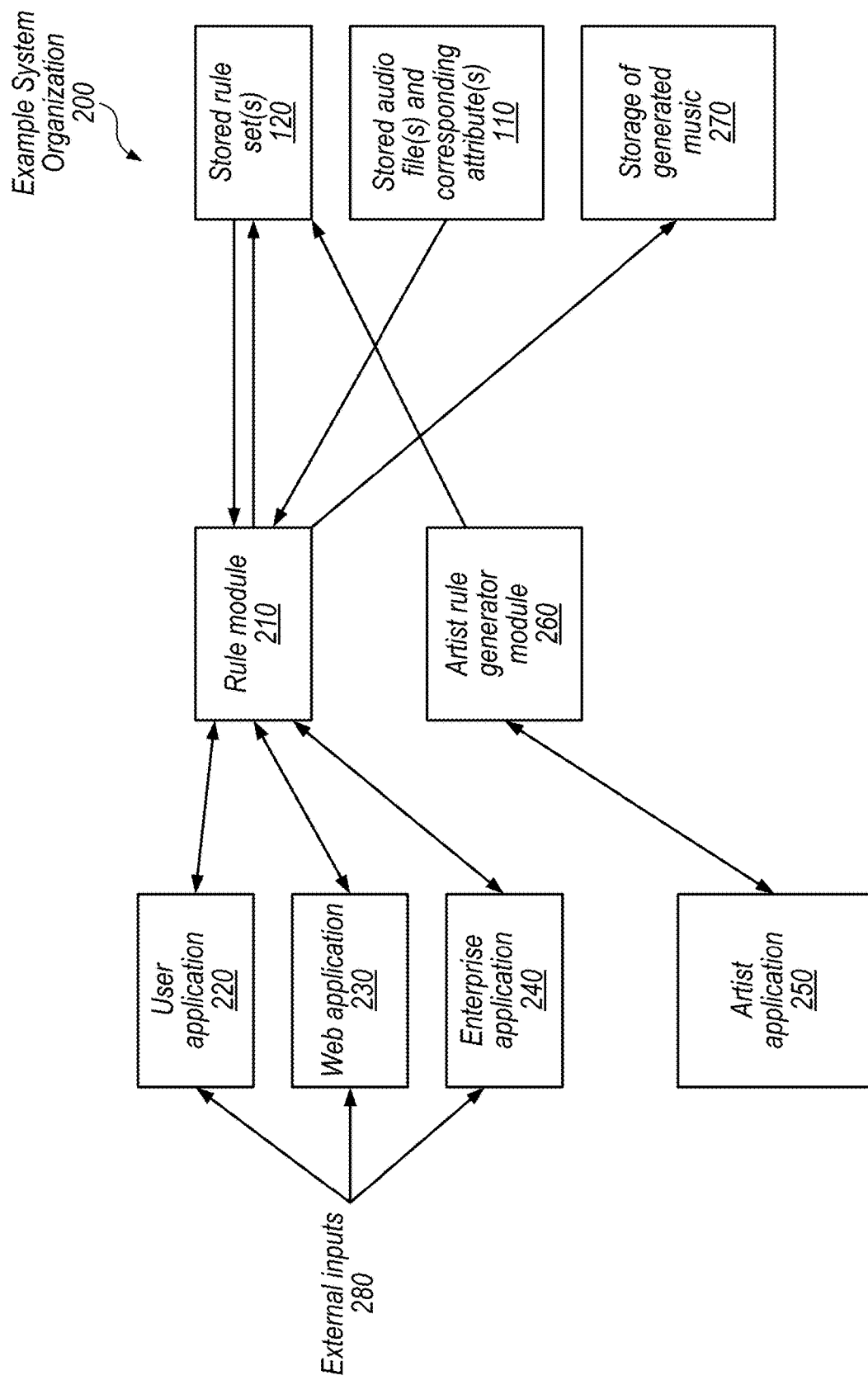
FIG. 2 is a block diagram illustrating an exemplary overview of a system for generating output music content based on inputs from multiple different sources, according to some embodiments.

This disclosure initially describes, with reference to FIGS. 1 and 2, an example music generator module and an overall system organization with multiple applications. Techniques for generating a music content from image representations are discussed with reference to FIGS. 3-7. Techniques for implementing user-created control elements are discussed with reference to FIGS. 8 and 10. Techniques for generating implementing audio techniques are discussed with reference to FIGS. 11-17. Techniques for recording information about generated music or elements in blockchains or other cryptographic ledgers are discussed with reference to FIGS. 18-19. FIGS. 20A-20B show exemplary application interfaces.

Generally speaking, the disclosed music generator includes audio files, metadata (e.g., information describing the audio files), and a grammar for combining audio files based on the metadata. The generator may create music experiences using rules to identify the audio files based on metadata and target characteristics of the music experience. It may be configured to expand the set of experiences it can create by adding or modifying rules, audio files, and/or metadata. The adjustments may be performed manually (e.g., artists adding new metadata) or the music generator may augment the rules/audio files/metadata as it monitors the music experience within the given environment and goals/characteristics desired. For example, listener-defined controls may be implemented for gaining user feedback on music goals or characteristics.

Overview of Exemplary Music Generator

FIG. 1 is a diagram illustrating an exemplary music generator, according to some embodiments. In the illustrated embodiment, music generator module 160 receives various information from multiple different sources and generates output music content 140.

In the illustrated embodiment, module 160 accesses stored audio file(s) and corresponding attribute(s) 110 for the stored audio file(s) and combines the audio files to generate output music content 140. In some embodiments, music generator module 160 selects audio files based on their attributes and combines audio files based on target music attributes 130. In some embodiments, audio files may be selected based on environment information 150 in combination with target music attributes 130. In some embodiments, environment information is used indirectly to determine target music attributes 130. In some embodiments, target music attributes 130 are explicitly specified by a user, e.g., by specifying a desired energy level, mood, multiple parameters, etc. For instance, listener-defined controls, described herein, may be implemented to specify listener preferences used as target music attributes. Examples of target music attributes 130 include energy, complexity, and variety, although more specific attributes (e.g., corresponding to the attributes of the stored tracks) may also be specified. Speaking generally, when higher-level target music attributes are specified, lower-level specific music attributes may be determined by the system before generating output music content.

Complexity may refer to a number of audio files, loops, and/or instruments that are included in a composition. Energy may be related to the other attributes or may be orthogonal to the other attributes. For example, changing keys or tempo may affect energy. However, for a given tempo and key, energy may be changed by adjusting instrument types (e.g., by adding high hats or white noise), complexity, volume, etc. Variety may refer to an amount of change in generated music over time. Variety may be generated for a static set of other musical attributes (e.g., by selecting different tracks for a given tempo and key) or may be generated by changing musical attributes over time (e.g., by changing tempos and keys more often when greater variety is desired). In some embodiments, the target music attributes may be thought of as existing in a multi-dimensional space and music generator module 160 may slowly move through that space, e.g., with course corrections, if needed, based on environmental changes and/or user input.

In some embodiments, the attributes stored with the audio files contain information about one or more audio files including: tempo, volume, energy, variety, spectrum, envelope, modulation, periodicity, rise and decay time, noise, artist, instrument, theme, etc. Note that, in some embodiments, audio files are partitioned such that a set of one or more audio files is specific to a particular audio file type (e.g., one instrument or one type of instrument).

In the illustrated embodiment, module 160 accesses stored rule set(s) 120. Stored rule set(s) 120, in some embodiments, specify rules for how many audio files to overlay such that they are played at the same time (which may correspond to the complexity of the output music), which major/minor key progressions to use when transitioning between audio files or musical phrases, which instruments to be used together (e.g., instruments with an affinity for one another), etc. to achieve the target music attributes. Said another way, the music generator module 160 uses stored rule set(s) 120 to achieve one or more declarative goals defined by the target music attributes (and/or target environment information). In some embodiments, music generator module 160 includes one or more pseudo-random number generators configured to introduce pseudo-randomness to avoid repetitive output music.

Environment information 150, in some embodiments, includes one or more of: lighting information, ambient noise, user information (facial expressions, body posture, activity level, movement, skin temperature, performance of certain activities, clothing types, etc.), temperature information, purchase activity in an area, time of day, day of the week, time of year, number of people present, weather status, etc. In some embodiments, music generator module 160 does not receive/process environment information. In some embodiments, environment information 150 is received by another module that determines target music attributes 130 based on the environment information. Target music attributes 130 may also be derived based on other types of content, e.g., video data. In some embodiments, environment information is used to adjust one or more stored rule set(s) 120, e.g., to achieve one or more environment goals. Similarly, the music generator may use environment information to adjust stored attributes for one or more audio files, e.g., to indicate target musical attributes or target audience characteristics for which those audio files are particularly relevant.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

As used herein, the phrase "music content" refers both to music itself (the audible representation of music), as well as to information usable to play music. Thus, a song recorded as a file on a storage medium (such as, without limitation a compact disc, flash drive, etc.) is an example of music content; the sounds produced by outputting this recorded file or other electronic representation (e.g., through speakers) is also an example of music content.

The term "music" includes its well-understood meaning, including sounds generated by musical instruments as well as vocal sounds. Thus, music includes, for example, instrumental performances or recordings, a cappella performances or recordings, and performances or recordings that include both instruments and voice. One of ordinary skill in the art would recognize that "music" does not encompass all vocal recordings. Works that do not include musical attributes such as rhythm or rhyme—for example, speeches, newscasts, and audiobooks—are not music.

One piece of music "content" can be distinguished from another piece of music content in any suitable fashion. For example, a digital file corresponding to a first song may represent a first piece of music content, while a digital file corresponding to a second song may represent a second piece of music content. The phrase "music content" can also be used to distinguish particular intervals within a given musical work, such that different portions of the same song can be considered different pieces of musical content. Similarly, different tracks (e.g., piano track, guitar track) within a given musical work may also correspond to different pieces of musical content. In the context of a potentially endless stream of generated music, the phrase "music content" can be used to refer to some portion of the stream (e.g., a few measures or a few minutes).

Music content generated by embodiments of the present disclosure may be "new music content"—combinations of musical elements that have never been previously generated. A related (but more expansive) concept—"original music content"—is described further below. To facilitate the explanation of this term, the concept of a "controlling entity" relative to an instance of music content generation is described. Unlike the phrase "original music content," the phrase "new music content" does not refer to the concept of a controlling entity. Accordingly, new music content refers to music content that has never before been generated by any entity or computer system.

Conceptually, the present disclosure refers to some "entity" as controlling a particular instance of computer-generated music content. Such an entity owns any legal rights (e.g., copyright) that might correspond to the computer-generated content (to the extent that any such rights may actually exist). In one embodiment, an individual that creates (e.g., codes various software routines) a computer-implemented music generator or operates (e.g., supplies inputs to) a particular instance of computer-implemented music generation will be the controlling entity. In other embodiments, a computer-implemented music generator may be created by a legal entity (e.g., a corporation or other business organization), such as in the form of a software product, computer system, or computing device. In some instances, such a computer-implemented music generator may be deployed to many clients. Depending on the terms of a license associated with the distribution of this music generator, the controlling entity may be the creator, the distributor, or the clients in various instances. If there are no such explicit legal agreements, the controlling entity for a computer-implemented music generator is the entity facilitating (e.g., supplying inputs to and thereby operating) a particular instance of computer generation of music content.

Within the meaning of the present disclosure, computer generation of "original music content" by a controlling entity refers to 1) a combination of musical elements that has never been generated before, either by the controlling entity or anyone else, and 2) a combination of musical elements that has been generated before, but was generated in the first instance by the controlling entity. Content type 1) is referred to herein as "novel music content," and is similar to the definition of "new music content," except that the definition of "novel music content" refers to the concept of a "controlling entity," while the definition of "new music content" does not. Content type 2), on the other hand, is referred to herein as "proprietary music content." Note that the term "proprietary" in this context does not refer to any implied legal rights in the content (although such rights may exist), but is merely used to indicate that the music content was originally generated by the controlling entity. Accordingly, a controlling entity "re-generating" music content that was previously and originally generated by the controlling entity constitutes "generation of original music content" within the present disclosure. "Non-original music content" with respect to a particular controlling entity is music content that is not "original music content" for that controlling entity.

Some pieces of music content may include musical components from one or more other pieces of music content. Creating music content in this manner is referred to as "sampling" music content, and is common in certain musical works, and particularly in certain musical genres. Such music content is referred to herein as "music content with sampled components," "derivative music content," or using other similar terms. In contrast, music content that does not include sampled components is referred to herein as "music content without sampled components," "non-derivative music content," or using other similar terms.

In applying these terms, it is noted that if any particular music content is reduced to a sufficient level of granularity, an argument could be made that this music content is derivative (meaning, in effect, that all music content is derivative). The terms "derivative" and "non-derivative" are not used in this sense in the present disclosure. With regard to the computer generation of music content, such computer generation is said to be derivative (and result in derivative music content) if the computer generation selects portions of components from pre-existing music content of an entity other than the controlling entity (e.g., the computer program selects a particular portion of an audio file of a popular artist's work for inclusion in a piece of music content being generated). On the other hand, computer generation of music content is said to be non-derivative (and result in non-derivative music content) if the computer generation does not utilize such components of such pre-existing content. Note some pieces of "original music content" may be derivative music content, while some pieces may be non-derivative music content.

It is noted that the term "derivative" is intended to have a broader meaning within the present disclosure than the term "derivative work" that is used in U.S. copyright law. For example, derivative music content may or may not be a derivative work under U.S. copyright law. The term "derivative" in the present disclosure is not intended to convey a negative connotation; it is merely used to connote whether a particular piece of music content "borrows" portions of content from another work.

Further, the phrases "new music content," "novel music content," and "original music content" are not intended to encompass music content that is only trivially different from a pre-existing combination of musical elements. For example, merely changing a few notes of a pre-existing musical work does not result in new, novel, or original music content, as those phrases are used in the present disclosure. Similarly, merely changing a key or tempo or adjusting a relative strength of frequencies (e.g., using an equalizer interface) of a pre-existing musical work does not produce new, novel, or original music content. Moreover, the phrases, new, novel, and original music content are not intended to cover those pieces of music content that are borderline cases between original and non-original content; instead, these terms are intended to cover pieces of music content that are unquestionably and demonstrably original, including music content that would be eligible for copyright protection to the controlling entity (referred to herein as "protectable" music content). Further, as used herein, the term "available" music content refers to music content that does not violate copyrights of any entities other than the controlling entity. New and/or original music content is often protectable and available. This may be advantageous in preventing copying of music content and/or paying royalties for music content.

Although various embodiments discussed herein use rule-based engines, various other types of computer-implemented algorithms may be used for any of the computer learning and/or music generation techniques discussed herein. Rule-based approaches may be particularly effective in the music context, however.

Overview of Applications, Storage Elements, and Data that May be Used in Exemplary Music Systems A music generator module may interact with multiple different applications, modules, storage elements, etc. to generate music content. For example, end users may install one of multiple types of applications for different types of computing devices (e.g., mobile devices, desktop computers, DJ equipment, etc.). Similarly, another type of application may be provided to enterprise users. Interacting with applications while generating music content may allow the music generator to receive external information that it may use to determine target music attributes and/or update one or more rule sets used to generate music content. In addition to interacting with one or more applications, a music generator module may interact with other modules to receive rule sets, update rule sets, etc. Finally, a music generator module may access one or more rule sets, audio files, and/or generated music content stored in one or more storage elements. In addition, a music generator module may store any of the items listed above in one or more storage elements, which may be local or accessed via a network (e.g., cloud-based).

FIG. 2 is a block diagram illustrating an exemplary overview of a system for generating output music content based on inputs from multiple different sources, according to some embodiments. In the illustrated embodiment, system 200 includes rule module 210, user application 220, web application 230, enterprise application 240, artist application 250, artist rule generator module 260, storage of generated music 270, and external inputs 280.

User application 220, web application 230, and enterprise application 240, in the illustrated embodiment, receive external inputs 280. In some embodiments, external inputs 280 include: environment inputs, target music attributes, user input, sensor input, etc. In some embodiments, user application 220 is installed on a user's mobile device and includes a graphical user interface (GUI) that allows the user to interact/communicate with rule module 210. In some embodiments, web application 230 is not installed on a user device, but is configured to run within a browser of a user device and may be accessed through a website. In some embodiments, enterprise application 240 is an application used by a larger-scale entity to interact with a music generator. In some embodiments, application 240 is used in combination with user application 220 and/or web application 230. In some embodiments, application 240 communicates with one or more external hardware devices and/or sensors to collect information concerning the surrounding environment.

Rule module 210, in the illustrated embodiment, communicates with user application 220, web application 230, and enterprise application 240 to produce output music content. In some embodiments, music generator 160 is included in rule module 210. Note that rule module 210 may be included in one of applications 220, 230, and 240 or may be installed on a server and accessed via a network. In some embodiments, applications 220, 230, and 240 receive generated output music content from rule module 210 and cause the content to be played. In some embodiments, rule module 210 requests input from applications 220, 230, and 240 regarding target music attributes and environment information, for example, and may use this data to generate music content.

Stored rule set(s) 120, in the illustrated embodiment, are accessed by rule module 210. In some embodiments, rule module 210 modifies and/or updates stored rule set(s) 120 based on communicating with applications 220, 230, and 240. In some embodiments, rule module 210 accesses stored rule set(s) 120 to generate output music content. In the illustrated embodiment, stored rule set(s) 120 may include rules from artist rule generator module 260, discussed in further detail below.

Artist application 250, in the illustrated embodiment, communicates with artist rule generator module 260 (which may be part of the same application or may be cloud-based, for example). In some embodiments, artist application 250 allows artists to create rule sets for their specific sound, e.g., based on previous compositions. This functionality is further discussed U.S. Pat. No. 10,679,596. In some embodiments, artist rule generator module 260 is configured to store generated artist rule sets for use by rule module 210. Users may purchase rule sets from particular artists before using them to generate output music via their particular application. The rule set for a particular artist may be referred to as a signature pack.

Stored audio file(s) and corresponding attribute(s) 110, in the illustrated embodiment, are accessed by module 210 when applying rules to select and combine tracks to generate output music content. In the illustrated embodiment, rule module 210 stores generated output music content 270 in a storage element.

In some embodiments, one or more of the elements of FIG. 2 are implemented on a server and accessed via a network, which may be referred to as a cloud-based implementation. For example, stored rule set(s) 120, audio file(s)/attribute(s) 110, and generated music 270 may all be stored on the cloud and accessed by module 210. In another example, module 210 and/or module 260 may also be implemented in the cloud. In some embodiments, generated music 270 is stored in the cloud and digitally watermarked. This may allow detection of copying generated music, for example, as well as generating a large amount of custom music content.

In some embodiments, one or more of the disclosed modules are configured to generate other types of content in addition to music content. For example, the system may be configured to generate output visual content based on target music attributes, determined environmental conditions, currently-used rule sets, etc. As another example, the system may search a database or the Internet based on current attributes of the music being generated and display a collage of images that dynamically changes as the music changes and matches the attributes of the music.

Exemplary Machine Learning Approaches

As described herein, music generator module 160, shown in FIG. 1, may implement a variety of artificial intelligence (AI) techniques (e.g., machine learning techniques) to generate output music content 140. In various embodiments, AI techniques implemented include a combination of deep neural networks (DNN) with more traditional machine learning techniques and knowledge-based systems. This combination may align the respective strengths and weaknesses of these techniques with challenges inherent in music composition and personalization systems. Music content has structure at multiple levels. For instance, a song has sections, phrases, melodies, notes and textures. DNNs may be effective at analyzing and generating very high level and very low level details of music content. For example, DNNs may be good at classifying the texture of a sound as belonging to a clarinet or an electric guitar at a low level or detecting verses and choruses at a high level. The middle levels of music content details, such as the construction of melodies, orchestration, etc. may be more difficult. DNNs are typically good at capturing a wide range of styles in a single model and thus, DNNs may be implemented as generative tools that have a lot of expressive range.

In some embodiments, music generator module 160 utilizes expert knowledge by having human-composed audio files (e.g., loops) as the fundamental unit of music content used by the music generator module. For example, social context of expert knowledge may be embedded through the choice of rhythms, melodies and textures to record heuristics in multiple levels of structure. Unlike the separation of DNN and traditional machine learning based on a structural level, expert knowledge may be applied in any areas where musicality can be increased without placing too strong of limitations on the trainability of music generator module 160.

In some embodiments, music generator module 160 uses DNNs to find patterns of how layers of audio are combined vertically, by layering sounds on top of each other, and horizontally, by combining audio files or loops into sequences. For example, music generator module 160 may implement an LSTM (long short-term memory) recurrent neural network, trained on MFCC (Mel-frequency cepstral coefficient) audio features of loops used in multitrack audio recordings. In some embodiments, a network is trained to predict and select audio features of loops for upcoming beats based on knowledge of the audio features of previous beats. For example, the network may be trained to predict the audio features of loops for the next 8 beats based on knowledge of the audio features of the last 128 beats. Thus, the network is trained to utilize a low-dimension feature representation to predict upcoming beats.

In certain embodiments, music generator module 160 uses known machine learning algorithms for assembling sequences of multitrack audio into musical structures with dynamics of intensity and complexity. For instance, music generator module 160 may implement Hierarchical Hidden Markov Models, which may behave like state machines that make state transitions with probabilities determined by multiple levels of hierarchical structure. As an example, a specific kind of drop may be more likely to happen after a buildup section but less likely if the end of that buildup does not have drums. In various embodiments, the probabilities may be trained transparently, which is in contrast to the DNN training where what is being learned is more opaque.

A Markov Model may deal with larger temporal structures and thus may not easily be trained by presenting example tracks as the examples may be too long. A feedback control element (such as a thumbs up/down on the user interface) may be used to give feedback on the music at any time. In certain embodiments, the feedback control element is implemented as one of UI control element(s) 830, shown in FIG. 8. Correlations between the music structure and the feedback may then be used to update structural models used for composition, such as transition tables or Markov models. This feedback may also be collected directly from measurements of heart-rate, sales, or any other metric where the system is able to determine a clear classification. Expert knowledge heuristics, described above, are also designed to be probabilistic where possible and trained in the same way as the Markov model.

In certain embodiments, training may be performed by composers or DJs. Such training may be separate from listener training. For example, training done by listeners (such as typical users) may be limited to identifying correct or incorrect classification based on positive and negative model feedback, respectively. For composers and DJs, training may include hundreds of timesteps and include details on layers used and volume control to give more explicit detail into what is driving changes in music content. For example, training performed by composers and DJs may include sequence prediction training similar to global training of DNNs, described above.

In various embodiments, a DNN is trained by taking in multi-track audio and interface interactions to predict what a DJ or composer will do next. In some embodiments, these interactions may be recorded and used to develop new heuristics that are more transparent. In some embodiments, the DNN receives a number of previous measures of music as input and utilizes a low-dimension feature representation, as described above, with additional features that describe modifications to a track that a DJ or composer has applied. For example, the DNN may receive the last 32 measures of music as input and utilize the low-dimension feature representation along with additional features to describe modifications to the track that a DJ or composer has applied. These modifications may include adjustments to gain of a particular track, filters applied, delay, etc. For example, a DJ may use the same drum loop repeated for five minutes during a performance but may gradually increase the gain and delay on the track over time. Therefore, the DNN may be trained to predict such gain and delay changes in addition to loop selection. When no loops are played for a particular instrument (e.g., no drum loops are played), the feature set may be all zeros for that instrument, which may allow the DNN to learn that predicting all zeros may be a successful strategy, which can lead to selective layering.

In some instances, DJs or composers record live performances using mixers and devices such as TRAKTOR (Native Instruments GmbH). These recordings are typically captured in high resolution (e.g., 4 track recording or MIDI). In some embodiments, the system disassembles the recording into its constituent loops yielding information about the combination of loops in a composition as well as the sonic qualities of each individual loop. Training the DNN (or other machine learning) with this information provides the DNN with the ability to correlate both composition (e.g., sequencing, layering, timing of loops, etc.) and sonic qualities of loops to inform music generator module 160 how to create music experiences that are similar to the artists performance without using the actual loops the artist used in their performance.

Exemplary Music Generator Using Image Representations of Audio Files

Music with wide popularity often has combinations of rhythm, texture, and pitch that are widely observed. When creating music note by note for each instrument in a composition (as may be done by a music generator), rules may be implemented based on these combinations to create coherent music. Generally, the more rigid the rules, the less room is given for creative variation, thus making it more likely to create copies of existing music.

When music is created through a combination of music phrases already performed and recorded as audio, multiple, unchangeable combinations of notes in each phrase may need to be considered for creating the combination. When drawing from a library of thousands of audio recordings, however, a search of every possible combination may be computationally expensive. Additionally, note by note comparisons may need to be made to check for harmonically dissonant combinations, especially on the beat. New rhythms created by combining multiple files may also be checked against rules for rhythmic makeup of the combined phrases.

Extracting the necessary features to make combinations from audio files may not always be possible. Even when possible, extracting the features needed from audio files may be computationally expensive. In various embodiments, symbolic audio representations are used for music composition to reduce computational expenses. Symbolic audio representations may rely on the music composer's memory of instrumental texture and stored rhythm and pitch information. A common format of symbolic music representation is MIDI. MIDI contains precise timing, pitch, and performance control information. In some embodiments, MIDI may be simplified and compressed further through piano roll representations in which notes are shown as bars on a discrete time/pitch graph, typically with 8 octaves of pitch.

In some embodiments, a music generator is configured to generate output music content by generating image representations of audio files and selecting combinations of music based on analysis of the image representations. Image representations may be representations that are further compressed from piano roll representations. For example, image representations may be lower resolution representations generated based on MIDI representations of audio files. In various embodiments, composition rules are applied to the image representations to select music content from the audio files to combine and generate output music content. The composition rules may be applied, for example, using rules-based methods. In some embodiments, machine learning algorithms or models (such as deep learning neural networks) are implemented to select and combine audio files for generating output music content.

Figure 3:
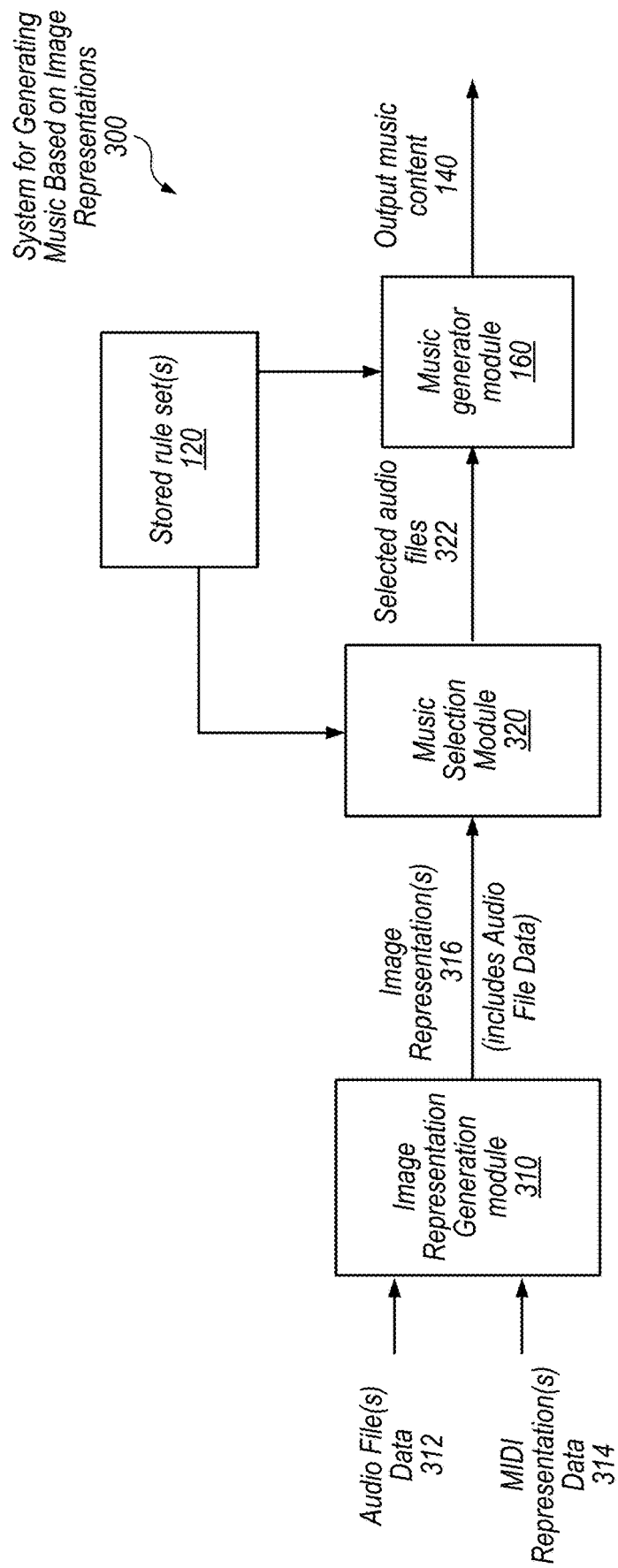
FIG. 3 is a block diagram illustrating an exemplary music generator system configured to output music content based on analysis of image representations of audio files, according to some embodiments.

FIG. 3 is a block diagram illustrating an exemplary music generator system configured to output music content based on analysis of image representations of audio files, according to some embodiments. In the illustrated embodiment, system 300 includes image representation generation module 310, music selection module 320, and music generator module 160.

Image representation generation module 310, in the illustrated embodiment, is configured to generate one or more image representations of audio files. In certain embodiments, image representation generation module 310 receives audio file data 312 and MIDI representation data 314. MIDI representation data 314 includes MIDI representation(s) of specified audio file(s) in audio file data 312. For instance, for a specified audio file in audio file data 312 may have a corresponding MIDI representation in MIDI representation data 314. In some embodiments with multiple audio files in audio file data 312, each audio file in audio file data 312 has a corresponding MIDI representation in MIDI representation data 314. In the illustrated embodiment, MIDI representation data 314 is provided to image representation generation module 310 along with audio file data 312. In some contemplated embodiments, however, image representation generation module 310 may generate MIDI representation data 314 on its own from audio file data 312.

As shown in FIG. 3, image representation generation module 310 generates image representation(s) 316 from audio file data 312 and MIDI representation data 314. MIDI representation data 314 may include pitch, time (or rhythm), and velocity (or note intensity) data for notes in the music associated with an audio file while audio file data 312 includes data for playback of the music itself. In certain embodiments, image representation generation module 310 generates an image representation for an audio file based on the pitch, time, and velocity data from MIDI representation data 314. The image representation may be, for example, a two-dimensional (2D) image representation of an audio file. In the 2D image representation of an audio file, the x-axis represents time (rhythm) and the y-axis represents pitch (similar to a piano roll representation) with values of the pixels at each x-y coordinate representing velocity.

The 2D image representation of an audio file may have a variety of image sizes, though the image size is typically selected to correspond to musical structure. For instance, in one contemplated embodiment, a 2D image representation is a 32 (x-axis)×24 image (y-axis). A 32 pixels wide image representation allows each pixel to represent a quarter of a beat in the temporal dimension. Thus, 8 beats of music may be represented by the 32 pixels wide image representation. While this representation may not have enough detail to capture expressive details of the music in an audio file, the expressive details are retained in the audio file itself, which is used in combination with the image representation by system 300 for the generation of output music content. Quarter beat temporal resolution does, however, allow for significant coverage of common pitch and rhythm combination rules.

Figure 4:
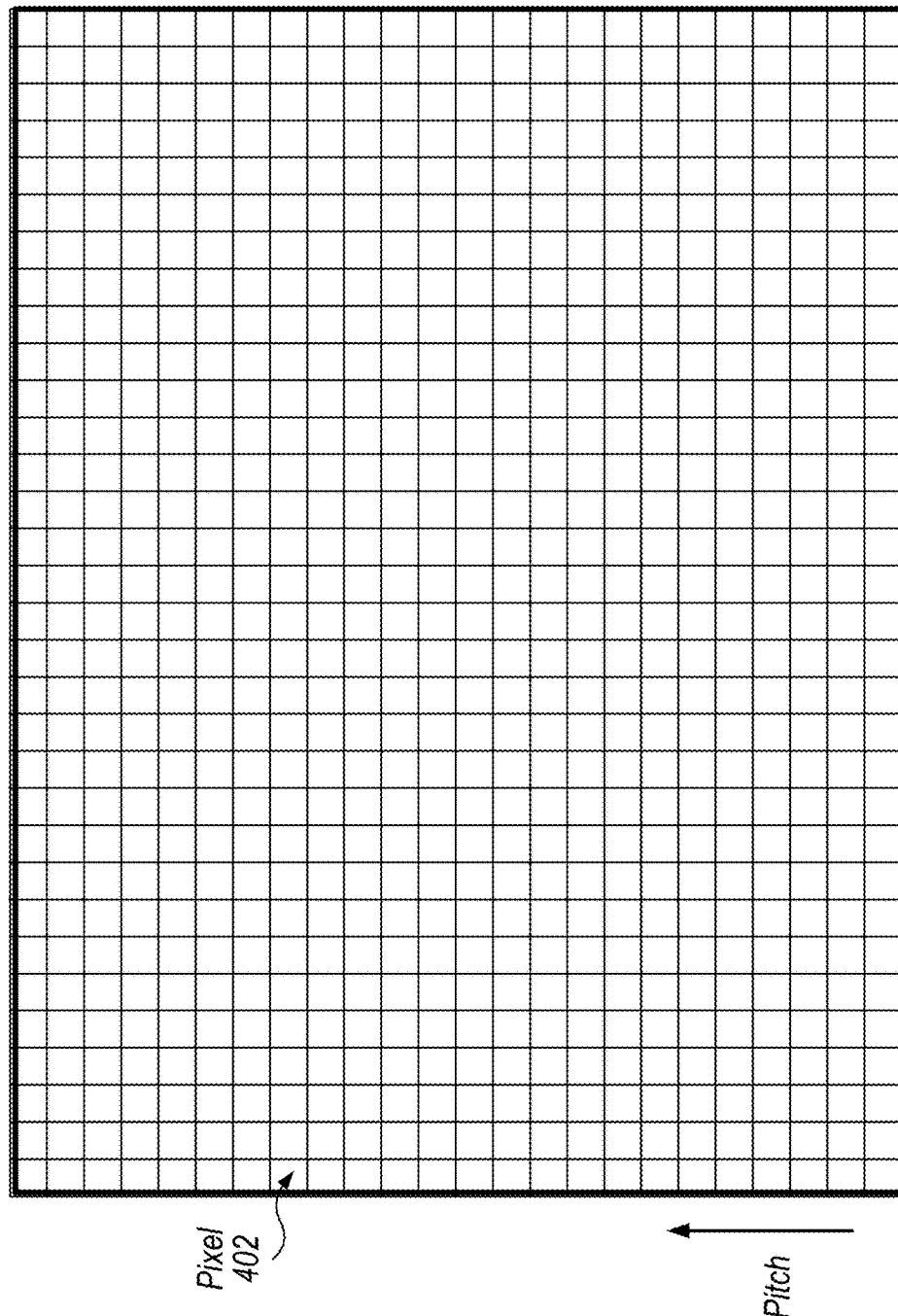
FIG. 4 depicts an example of an image representation of an audio file.
Figure 5B:
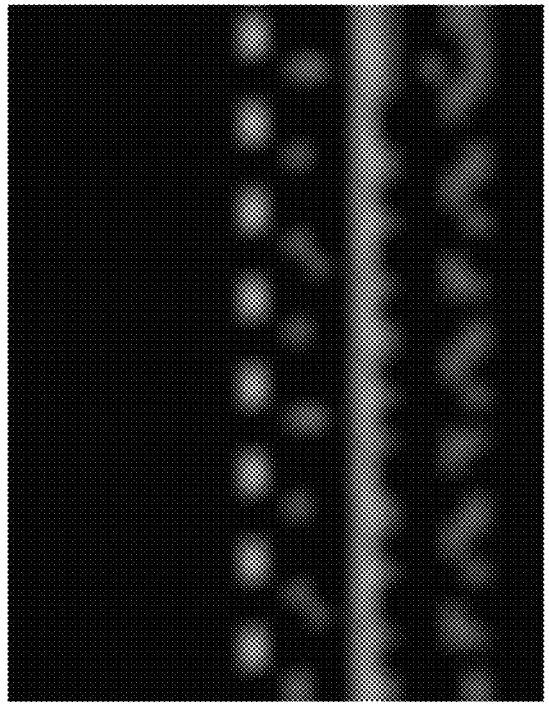
FIGS. 5A and 5B depict examples of greyscale images for a melody image feature representation and a drum beat image feature representation, respectively.
Figure 5A:
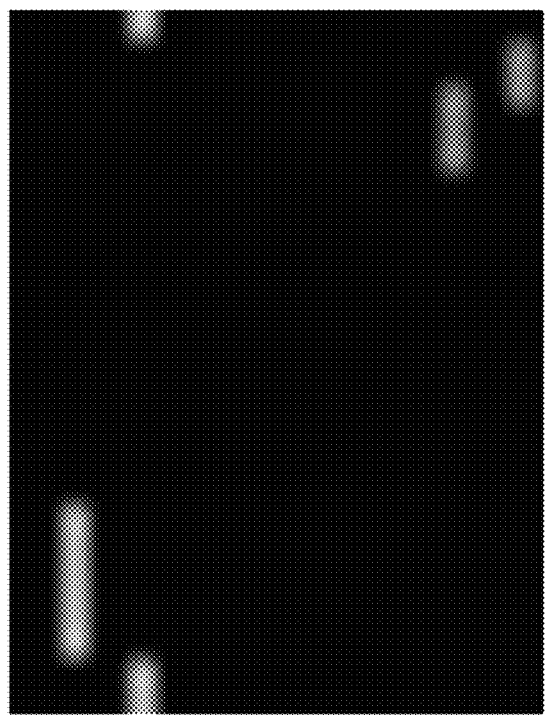

FIG. 4 depicts an example of an image representation 316 of an audio file. Image representation 316 is 32 pixels wide (for time) and 24 pixels high (for pitch). Each pixel (square) 402 has a value that represents the velocity for that time and pitch in the audio file. In various embodiments, image representation 316 may be a greyscale image representation of an audio file where pixel values are represented by varying intensity of grey. The variations in grey, based on pixel values, may be small and imperceptible to many people. FIGS. 5A and 5B depict examples of greyscale images for a melody image feature representation and a drum beat image feature representation, respectively. Other representations (e.g., color or numeric) may, however, also be contemplated. In these representations, each pixel may have multiple different values corresponding to different music attributes.

In certain embodiments, image representation 316 is an 8-bit representation of the audio file. Thus, each pixel may have 256 possible values. A MIDI representation typically has 128 possible values for velocity. In various embodiments, the detail in velocity values may be less important than the task of selecting audio files for combination. Thus, in such embodiments, the pitch axis (y-axis) may be banded to cover into two sets of octaves in an 8 octaves range with 4 octaves in each set. For example, the 8 octaves can be defined as follows:

Octave 0: rows 0-11, values 0-63;
Octave 1: rows 12-23, values 0-63;
Octave 2: rows 0-11, values 64-127;
Octave 3: rows 12-23, values 64-127;
Octave 4: rows 0-11, values 128-191;
Octave 5: rows 12-23, values 128-191
Octave 6: rows 0-11, values 192-255; and
Octave 7: rows 12-23, values 192-255.

With these defined ranges for the octaves, the row and value of a pixel determines a note's octave and velocity. For instance, a pixel value of 10 in row 1 represents a note in octave 0 with a velocity of 10 while a pixel value of 74 in row 1 represents a note in octave 2 with a velocity of 10. As another example, a pixel value of 79 in row 13 represents a note in octave 3 with a velocity of 15 while a pixel value of 207 in row 13 represents a note in octave 7 with a velocity of 15. Thus, using the define ranges for octaves above, the first 12 rows (rows 0-11) represent a first set of 4 octaves (octaves 0, 2, 4, and 6) with the pixel value determining which one of the first 4 octaves is represented (the pixel value also determining the velocity of the note). Similarly, the second 12 rows (rows 12-23) represent a second set of 4 octaves (octaves 1, 3, 5, and 7) with the pixel value determining which one of the second 4 octaves is represented (the pixel value also determining the velocity of the note).

By banding the pitch axis to cover an 8 octaves range, as described above, the velocity of each octave may be defined by 64 values rather than the 128 values of a MIDI representation. Thus, the 2D image representation (e.g., image representation 316) may be compressed (e.g., have a lower resolution) than the MIDI representation of the same audio file. In some embodiments, further compression of the image representation may be allowed as 64 values may be more than is needed by system 300 to select music combinations. For instance, velocity resolution may be reduced further to allow compression in a temporal representation by having odd pixel values represent note starts and even pixel values representing note sustains. Reducing the resolution in this manner allows for two notes with the same velocity played in quick succession to be distinguished from one longer note based on odd or even pixel values.

The compactness of the image representation, as described above, reduces the size of files needed for representation of the music (for example, as compared to MIDI representations). Thus, implementing image representations of audio files reduces the amount of disk storage needed. Further, compressed image representations may be stored in high speed memory that allows quick searches for possible music combinations. For instance, 8-bit image representations may be stored in graphics memory on a computer device, thus allowing large parallel searches to be implemented together.

In various embodiments, image representations generated for multiple audio files are combined into a single image representation. For instance, image representations for tens, hundreds, or thousands of audio files may be combined into a single image representation. The single image representation may be a large, searchable image that can be used for parallel searching of the multiple audio files making up the single image. For example, the single image may be search in a similar manner to a large texture in a video game using software such as MegaTextures (from id Software).

Figure 6:
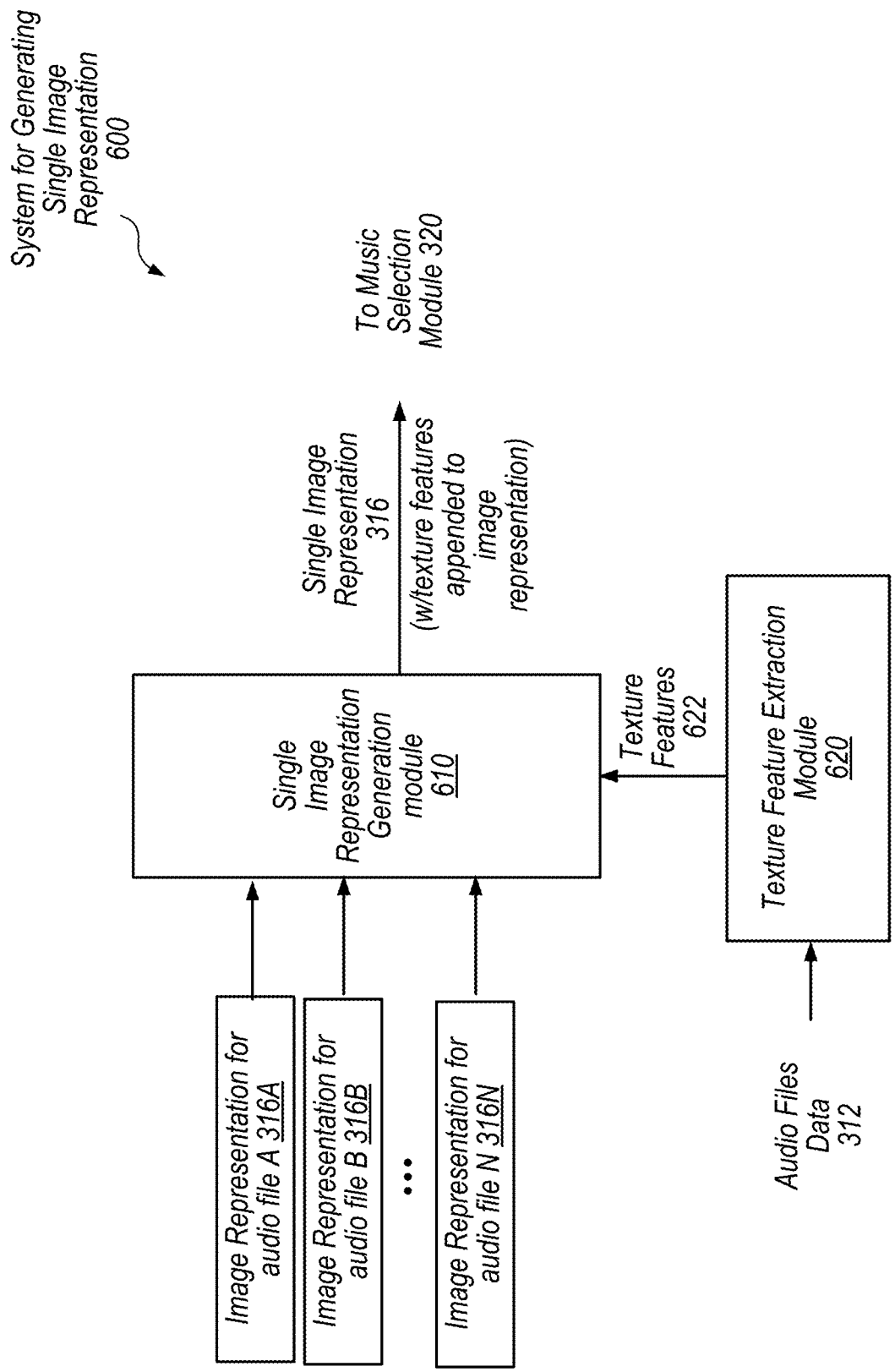
FIG. 6 is a block diagram illustrating an exemplary system configured to generate a single image representation, according to some embodiments.

FIG. 6 is a block diagram illustrating an exemplary system configured to generate a single image representation, according to some embodiments. In the illustrated embodiment, system 600 includes single image representation generation module 610 and texture feature extraction module 620. In certain embodiments, single image representation generation module 610 and texture feature extraction module 620 are located in image representation generation module 310, shown in FIG. 3. Single image representation generation module 610 or texture feature extraction module 620 may, however, be located outside of image representation generation module 310.

As shown in the illustrated embodiment of FIG. 6, multiple image representations 316A-N are generated. Image representations 316A-N may be N number of individual image representations for N number of individual audio files. Single image representation generation module 610 may combine individual image representations 316A-N into a single, combined image representation 316. In some embodiments, individual image representations combined by single image representation generation module 610 include individual image representations for different instruments. For instance, different instruments within an orchestra may be represented by individual image representations, which are then combined into a single image representation for searching and selection of music.

Figure 7:
FIG. 7 depicts an example of a single image representation of multiple audio files.

In certain embodiments, the individual image representations 316A-N are combined into single image representation 316 with the individual image representations placed adjacent each other without overlap. Thus, single image representation 316 is a complete data set representation of all individual image representations 316A-N without loss of data (e.g., without any data from one image representation modifying data for another image representation). FIG. 7 depicts an example of a single image representation 316 of multiple audio files. In the illustrated embodiment, single image representation 316 is a combined image generated from individual image representations 316A, 316B, 316C, and 316D.

In some embodiments, single image representation 316 is appended with texture features 622. In the illustrated embodiment, texture features 622 are appended as a single row to single image representation 316. Turning back to FIG. 6, texture features 622 are determined by texture feature extraction module 620. Texture features 622 may include, for example, instrumental textures of music in audio files. For instance, texture features may include features from different instruments such as drums, stringed instruments, etc.

In certain embodiments, texture feature extraction module 620 extracts texture features 622 from audio files data 312. Texture feature extraction module 620 may implement, for example, rules-based methods, machine learning algorithms or models, neural networks, or other feature extraction techniques to determine texture features from audio files data 312. In some embodiments, texture feature extraction module 620 may extract texture features 622 from image representation(s) 316 (e.g., either multiple image representations or a single image representation). For instance, texture feature extraction module 620 may implement image-based analysis (such as image-based machine learning algorithms or models) to extract texture features 622 from image representation(s) 316.

The addition of texture features 622 to single image representation 316 provides the single image representation with additional information that is not typically available in MIDI representations or piano roll representations of audio files. In some embodiments, the row with texture features 622 in single image representation 316 (shown in FIG. 7) may not need to be human readable. For instance, texture features 622 may only need to be machine readable for implementation in a music generation system. In certain embodiments, texture features 622 are appended to single image representation 316 for use in image-based analysis of the single image representation. For example, texture features 622 may be used by image-based machine learning algorithms or models used in the selection of music, as described below. In some embodiments, texture features 622 may be ignored during the selection of music, for example, in rules-based selections, as described below.

Turning back to FIG. 3, in the illustrated embodiment, image representation(s) 316 (e.g., either multiple image representations or a single image representation) is provided to music selection module 320. Music selection module 320 may select audio files or portions of audio files to be combined in music generator module 160. In certain embodiments, music selection module 320 applies rules-based methods to search and select audio files or portions of audio files for combination by music generator module 160. As shown in FIG. 3, music selection module 320 accesses rules for rules-based methods from stored rule set(s) 120. For example, rules accessed by music selection module 320 may include rules for searching and selection such as, but not limited to, composition rules and note combination rules. Applying rules to image representation(s) 316 may be implemented using graphics processing available on a computer device.

For example, in various embodiments, note combination rules may be expressed as vector and matrix calculations. Graphics processing units are typically optimized for making vector and matrix calculations. For instance, notes one pitch step apart may be typically dissonant and frequently avoided. Notes such as these may be found by searching for neighboring pixels in additively layered images (or segments of a large image) based on rules. Therefore, in various embodiments, disclosed modules may invoke kernels to perform all or a portion of the disclosed operations on a graphics processor of a computing device.

In some embodiments, the banding of pitch in image representations, described above, allows the use of graphics processing for implantation of high-pass or low-pass filtering of audio. Removing (e.g., filtering out) pixel values below a threshold may simulate high-pass filtering while removing pixel values above a threshold value may simulate low-pass filtering. For instance, filtering out (removing) pixel values lower than 64 in the above banding example may have a similar effect as applying a high-pass filter with a shelf at B1 by removing octaves 0 and 1 in the example. Thus, the use of filters on each audio file can be efficiently simulated by applying rules on image representations of audio files.

In various embodiments, when audio files are layered together to create music, the pitch of a specified audio file may be changed. Changing the pitch may both open up a much larger range of possible successful combinations and the search space for combinations. For instance, each audio file can be tested in 12 different pitch shifted keys. Offsetting the row order in an image representation when parsing images, and adjusting for octave shift, if necessary, may allow optimized searching through these combinations.

In certain embodiments, music selection module 320 implements machine learning algorithms or models on image representation(s) 316 to search and select audio files or portions of audio files for combination by music generator module 160. Machine learning algorithms/models may include, for example, deep learning neural networks or other machine learning algorithms that classify images based on training of the algorithms. In such embodiments, music selection module 320 includes one or more machine learning models that are trained based on combinations and sequences of audio files providing desired musical properties.

In some embodiments, music selection module 320 includes machine learning models that continually learn during selection of output music content. For instance, the machine learning models may receive user input or other input reflecting properties of the output music content that can be used to adjust classification parameters implemented by the machine learning models. Similar to rules-based methods, machine learning models may be implemented using graphics processing units on a computer device.

In some embodiments, music selection module 320 implements a combination of rules-based methods and machine learning models. In one contemplated embodiment, a machine learning model is trained to find combinations of audio files and image representations for beginning a search for music content to combine where the search is implemented using rules-based methods. In some embodiments, music selection module 320 tests for harmony and rhythm rule coherence in music selected for combination by music generator module 160. For example, music selection module 320 may test for harmony and rhythm in selected audio files 322 before providing the selected audio files to music generator module 160, as described below.

In the illustrated embodiment of FIG. 3, music selected by music selection module 320, as described above, is provided to music generator module 160 as selected audio files 322. Selected audio files 322 may include complete or partial audio files that are combined by music generator module 160 to generate output music content 140, as described herein. In some embodiments, music generator module 160 accesses stored rule set(s) 120 to retrieve rules applied to selected audio files 322 for generating output music content 140. The rules retrieved by music generator module 160 may be different than the rules applied by music selection module 320.

In some embodiments, selected audio files 322 includes information for combining the selected audio files. For example, a machine learning model implemented by music selection module 320 may provide an output with instructions describing how music content is to be combined in addition to the selection of the music to combine. These instructions may then be provided to music generator module 160 and implemented by the music generator module for combining the selected audio files. In some embodiments, music generator module 160 tests for harmony and rhythm rule coherence before finalizing output music content 140. Such tests may be in addition to or in lieu of tests implemented by music selection module 320.

Exemplary Controls for Music Content Generation

In various embodiments, as described herein, a music generator system is configured to automatically generate output music content by selecting and combining audio tracks based on various parameters. As described herein, machine learning models (or other AI techniques) are used to generate music content. In some embodiments, AI techniques are implemented to customize music content for particular users. For instance, the music generator system may implement various types of adaptive controls for personalizing music generation. Personalizing the music generation allows content control by composer or listeners in addition to content generation by AI techniques. In some embodiments, users create their own control elements, which the music generator system may train (e.g., using AI techniques) to generate output music content according to a user's intended functionality of a user-created control element. For example, a user may create a control element that the music generator system then trains to influence the music according to the user's preferences.

In various embodiments, user-created control elements are high-level controls such as controls that adjust mood, intensity, or genre. Such user-created control elements are typically subjective measures that are based on a listener's individual preferences. In some embodiments, a user labels a user-created control element to define a user-specified parameter. The music generator system may play various music content and allow the user to modify the user-specified parameter in the music content using the control element. The music generator system may learn and store the manner in which the user-defined parameter varies audio parameters in the music content. Thus, during later playback, the user-created control element may be adjusted by the user and the music generator system adjusts audio parameters in the music playback according to the adjustment level of the user-specified parameter. In some contemplated embodiments, the music generator system may also select music content according to the user's preferences set by the user-specified parameter.

Figure 8:
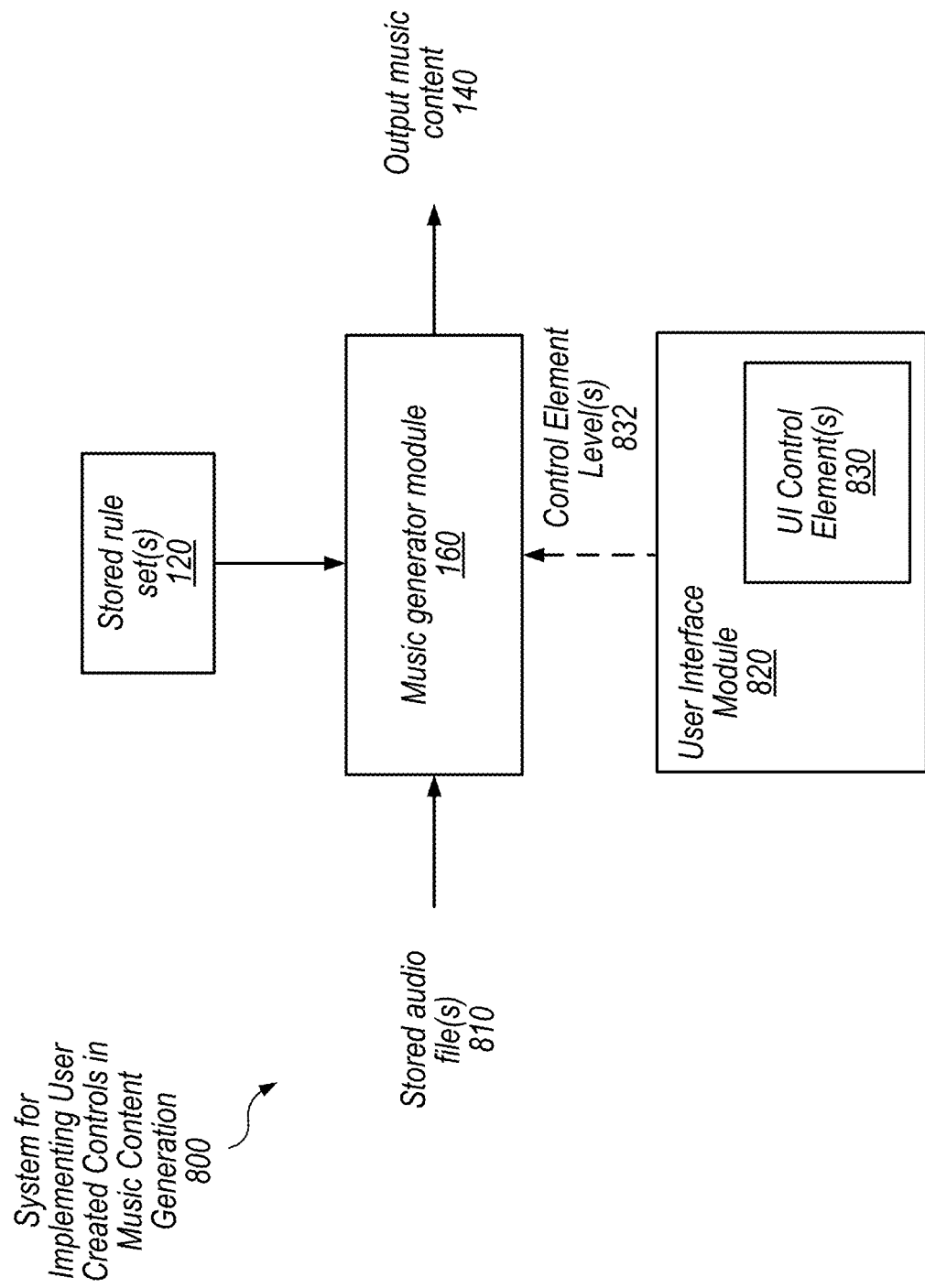
FIG. 8 is a block diagram illustrating an exemplary system configured to implement user-created controls in music content generation, according to some embodiments.

FIG. 8 is a block diagram illustrating an exemplary system configured to implement user-created controls in music content generation, according to some embodiments. In the illustrated embodiment, system 800 includes music generator module 160 and user interface (UI) module 820. In various embodiments, music generator module 160 implements techniques described herein for generating output music content 140. For instance, music generator module 160 may access stored audio file(s) 810 and generate output music content 140 based on stored rule set(s) 120.

In various embodiments, music generator module 160 modifies music content based on input from one or more UI control elements 830 implemented in UI module 820. For instance, a user may adjust a level of control element(s) 830 during interaction with UI module 820. Examples of control elements include, but are not limited to, sliders, dials, buttons, or knobs. The level of control element(s) 830 then sets control element level(s) 832, which are provided to music generator module 160. Music generator module 160 may then modify output music content 140 based on control element level(s) 832. For example, music generator module 160 may implement AI techniques to modify output music content 140 based on control element level(s) 830.

In certain embodiments, one or more of control element(s) 830 is a user-defined control element. For instance, a control element may be defined by a composer or a listener. In such embodiments, a user may create and label a UI control element that specifies a parameter that the user wants to implement to control output music content 140 (e.g., the user creates a control element for controlling a user-specified parameter in control output music content 140).

In various embodiments, music generator module 160 may learn or be trained to influence output music content 140 in a specified way based on input from the user-created control element. In some embodiments, music generator module 160 is trained to modify audio parameters in output music content 140 based on a level of the user-created control element set by a user. Training music generator module 160 may include, for example, determining a relationship between audio parameters in output music content 140 and a level of the user-created control element. The relationship between the audio parameters in output music content 140 and the level of the user-created control element may then be utilized by music generator module 160 to modify output music content 140 based on an input level of the user-created control element.

Figure 9:
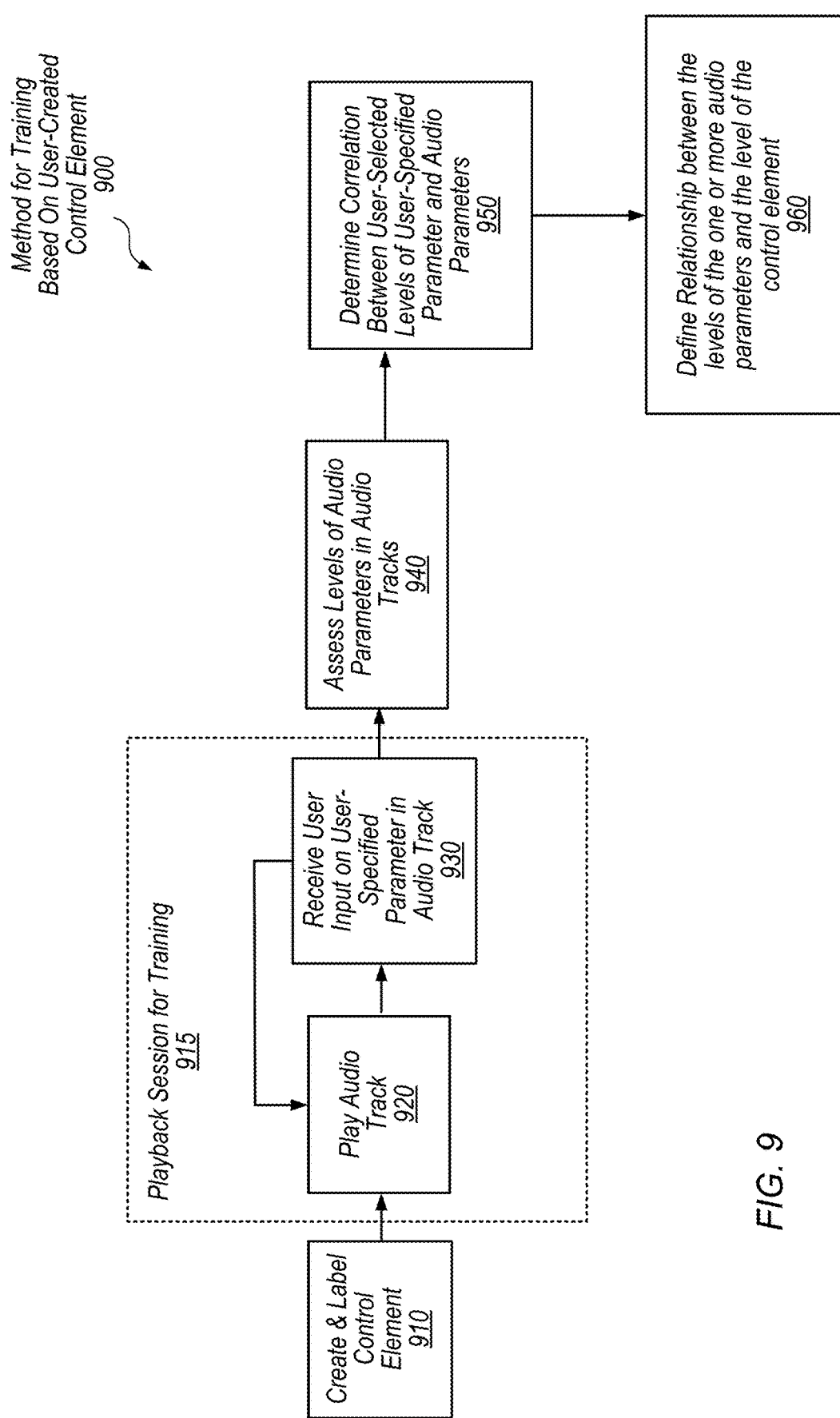
FIG. 9 depicts a flowchart of a method for training a music generator module based on a user-created control element, according to some embodiments.

FIG. 9 depicts a flowchart of a method for training music generator module 160 based on a user-created control element, according to some embodiments. Method 900 begins with a user creating and labelling a control element in 910. For example, as described above, a user may create and label a UI control element for controlling a user-specified parameter in output music content 140 generated by music generator module 160. In various embodiments, the label of the UI control element describes the user-specified parameter.

For example, a user may label a control element as "Attitude" to specify that the user wants to control attitude (as defined by the user) in generated music content.

After creation of the UI control element, method 900 continues with playback session 915. Playback session 915 may be used to train a system (e.g., music generator module 160) how to modify audio parameters based on a level of the user-created UI control element. In playback session 915, an audio track is played in 920. The audio track may be a loop or sample of music from an audio file stored on the device or accessed by the device.

In 930, the user provides input on his/her interpretation of the user-specified parameter in the audio track being played. For instance, in certain embodiments, the user is asked listen to the audio track and to select a level of the user-specified parameter that the user believes describes the music in the audio track. The level of the user-specified parameter may be selected, for example, using the user-created control element. This process may be repeated for multiple audio tracks in playback session 915 to generate multiple data points for levels of the user-specified parameter.

In some contemplated embodiments, the user may be asked to listen to multiple audio tracks at a single time and comparatively rate the audio tracks based on the user-defined parameter. For instance, in the example of a user-created control defining "attitude", the user may listen to multiple audio tracks and the select which audio tracks have more "attitude" and/or which audio tracks have less "attitude". Each of the selections made by the user may be a data point for a level of the user-specified parameter.

After playback session 915 is completed, levels of audio parameters in the audio tracks from the playback session are assessed in 940. Examples of audio parameters include, but are not limited to, volume, tone, bass, treble, reverb, etc. In some embodiments, levels of audio parameters in the audio tracks are assessed as an audio track is played (e.g., during playback session 915). In some embodiments, audio parameters are assessed after playback session 915 ends.

In various embodiments, audio parameters in the audio tracks are assessed from metadata for the audio tracks. For instance, audio analysis algorithms may be used to generate metadata or symbolic music data (such as MIDI) for the audio tracks (which may be short, prerecorded music files). Metadata may include, for example, note pitches present in the recording, onsets-per-beat, ratio of pitched to unpitched sounds, volume level and other quantifiable properties of sound.

In 950, a correlation between the user-selected levels for the user-specified parameters and the audio parameters is determined. As the user-selected levels for the user-specified parameters correspond to levels of the control element, the correlation between the user-selected levels for the user-specified parameters and the audio parameters may be utilized to define a relationship between the levels of the one or more audio parameters and the level of the control element in 960. In various embodiments, the correlation between the user-selected levels for the user-specified parameters and the audio parameters and the relationship between the levels of the one or more audio parameters and the level of the control element are determined using AI techniques (e.g., regressive models or machine learning algorithms).

Turning back to FIG. 8, the relationship between the levels of the one or more audio parameters and the level of the control element may then be implemented by music generator module 160 to determine how to adjust audio parameters in output music content 140 based on input of control element level 832 received from a user-created control element 830. In certain embodiments, music generator module 160 implements machine learning algorithms to generate output music content 140 based on input of control element level 832 received from a user-created control element 830 and the relationship. For example, machine learning algorithms may analyze how the metadata descriptions of audio tracks vary throughout recordings. The machine learning algorithms may include, for example, a neural network, a Markov model, or a dynamic Bayesian network.

As described herein, the machine learning algorithms may be trained to predict the metadata of the upcoming fragment of music when provided with the metadata of music up to that point. Music generator module 160 may use implement the predictive algorithm by searching a pool of prerecorded audio files for those with properties that most closely match the metadata predicted to come next. Selecting the closest matching audio file to play next helps create output music content with sequential progression of music properties similar to the example recordings that the predictive algorithm was trained on.

In some embodiments, parametric control of music generator module 160 using predictive algorithms may be included in the predictive algorithm itself. In such embodiments, some predefined parameter may be used alongside musical metadata as an input to the algorithm and predictions vary based on this parameter. Alternatively, parametric control may be applied to the predictions to modify them. As one example, by sequentially selecting the closest music fragment predicted to come next by the predictive algorithm and appending the audio of the files end to end, a generative composition is made. At some point, a listener may increase a control element level (such as an onsets-per-beat control element) and the output of the predictive model is modified by increasing the predicted 'onsets-per-beat' data-field. When selecting the next audio file to append to the composition, those with higher onset-per-beat properties will be more likely to be selected in this scenario.

In various embodiments, generative systems, such as music generator module 160, utilizing metadata descriptions of music content may use hundreds or thousands of data-fields in the metadata for each music fragment. To give more variability, multiple concurrent tracks, each featuring different instrument and sound types may be used. In these instances, the predictive model may have many thousands of data-fields representing music properties, with each having a perceptible effect on the listening experience. For a listener to control the music in such instances, an interface for modifying each data-field of the predictive model's output may be used, creating thousands of control elements. Alternatively, multiple data-fields may be combined and exposed as a single control element. As more music properties are affected by a single control element, the more abstract the control element becomes from the specific music properties, and labelling of these controls becomes subjective. In this way primary control elements and sub-parameter control elements (as described below) may be implemented for dynamic and individualized control of output music content 140.

As described herein, users may specify their own control elements and train music generator module 160 regarding how to act based on user adjustment of the control element. This process may reduce bias and complexity, and the data-fields may be completely hidden from the listener. For example, in some embodiments the listener is provided with a user-created control element on the user interface. The listener is then presented with a short music clip, for which they are asked to set a level of the control element they believe best describes the music being heard. By repeating this process, multiple data points are created that may be used to regressively model the desired effect of the control on the music. In some embodiments, these data points may be added as an additional input in the predictive model. The predictive model may then try to predict the music properties that will produce a composition sequence similar to sequences it has been trained on while also matching the expected behavior of a control element being set to a particular level. Alternatively, a control element mapper, in the form of a regression model, may be used to map prediction modifiers to the control element without retraining the predictive model.

In some embodiments, training for a given control element may include both global training (e.g., training based on feedback from multiple user accounts) and local training (e.g., training based on feedback from the current user's account). In some embodiments, a set of control elements may be created that are specific to a subset of the musical elements provided by a composer. For instance, a scenario may include an artist creating a loop pack and then training music generator module 160 using examples of performances or compositions they have previously created using these loops. Patterns in these examples can be modelled with regression or neural network models and used to create rules for the construction of new music with similar patterns. These rules may be parametrized and exposed as control elements for the composer to manually modify offline, before the listener begins using music generator module 160, or for the listener to adjust while listening. Examples that the composer feels are opposite to the desired effect of the control may also be used for negative reinforcement.

In some embodiments, in addition to utilizing patterns in the example music, music generator module 160 may find patterns in music it creates that correspond to input from a composer, before the listener begins listening to the generated music. The composer may do this with direct feedback (described below) such as tapping a thumbs up control element for positive reinforcement of patterns or thumbs down control element for negative reinforcement.

In various embodiments, music generator module 160 may allow a composer to create their own sub-parameter control elements, described below, of control elements the music generator module has learned. For example, a control element for "intensity" may have been created as a primary control element from learned patterns relating to the number of note onsets per beat and the textural qualities of the instruments playing. The composer may then create two sub-parameter control elements by selecting patterns that relate to note onsets, such as a "rhythmic intensity" control element and a "textural intensity" control element for the textural patterns. Examples of sub-parameter control elements include control elements for vocals, intensity of a particular frequency range (e.g., bass), complexity, tempo, etc. These sub-parameter control elements may be used in conjunction with more abstract control elements (e.g., primary control elements) such as energy. These composer skill control elements may be trained for music generator module 160 by the composer similarly to user-created controls described herein.

As described herein, training of music generator module 160 to control audio parameters based on input from a user-created control element allows individual control elements to be implemented for different users. For example, one user may associate increased attitude with increased bass content while another user may associate increased attitude with a certain type of vocals or a certain tempo range. Music generator module 160 may modify audio parameters for the different specifications of attitude based on the training of the music generator module for a specific user. In some embodiments, individualized controls may be used in combination with global rules or control elements that are implemented in the same way for many users. The combination of global and local feedback or control may provide quality music production with specialized controls for involved individuals.

In various embodiments, as shown in FIG. 8, one or more UI control elements 830 are implemented in UI module 820. As described above, a user may adjust control element level(s) 832 using control element(s) 830 during interaction with UI module 820 to modify output music content 140. In certain embodiments, one or more of control element(s) 830 is a system-defined control element. For instance, a control element may be defined as a controllable parameter by system 800. In such embodiments, a user may adjust the system-defined control element to modify output music content 140 according to parameters defined by the system.

In certain embodiments, a system-defined UI control element (e.g., a knob or slider) allows users to control abstract parameters of output music content 140 being automatically generated by music generator module 160. In various embodiments, the abstract parameters act as primary control element inputs. Examples of abstract parameters include, but are not limited to, intensity, complexity, mood, genre, and energy level. In some embodiments, an intensity control element may adjust the number of low-frequency loops incorporated. A complexity control element may guide the number of tracks overlayed. Other control elements such as a mood control element may range from sober to happy and affect, for example, the key of music being played, among other attributes.

In various embodiments, a system-defined UI control element (e.g., a knob or slider) allows users to control energy level of output music content 140 being automatically generated by music generator module 160. In some embodiments, the label of the control element (e.g., "energy") may change in size, color, or other properties to reflect user input adjusting the energy level. In some embodiments, as the user adjusts the control element, the control element's current level may be output until the user releases the control element (e.g., releases a mouse click or removes a finger from a touchscreen).

Energy, as defined by the system, may be an abstract parameter related to multiple more specific music attributes. As an example, energy may be related to tempo in various embodiments. For instance, changes in energy level may be associated with tempo changes of a selected number of beats per minute (e.g., ~6 beats per minute). In some embodiments, within a given range for one parameter (such as tempo), music generator module 160 may explore music variations by changing other parameters. For example, music generator module 160 may create build-ups and drops, create tension, vary the number of tracks being layered at the same time, change keys, add or remove vocals, add or remove bass, play different melodies, etc.

In some embodiments, one or more sub-parameter control elements are implemented as control element(s) 830. Sub-parameter control elements may allow more specific control of attributes that are incorporated into a primary control element such as an energy control element. For example, the energy control element may modify the number of percussive layers and amount of vocals used, but a separate control element allows for direct control of these sub-parameters such that all control elements are not necessarily independent. In this way, the user can choose the level of specificity of control they wish to utilize. In some embodiments, sub-parameter control elements may be implemented for user-created control elements, described above. For example, a user may create and label a control element that specifies a sub-parameter of another user-specified parameter.

In some embodiments, user interface module 820 allows a user an option to expand a UI control element 830 to show one or more sub-parameter user control elements. Additionally, certain artists may provide attribute information that is used to guide music composition underneath user control of a high-level control element (e.g., an energy slider). For instance, an artist may provide an "artist pack" with tracks from that artist and rules for music composition. The artist may use an artist interface to provide values for sub-parameter user control elements. For example, a DJ might have rhythm and drums as a control element that is exposed to the user to allow the listener to incorporate more or less rhythm and drums. In some embodiments, as described herein, artists or users may generate their own custom control elements.

In various embodiments, human-in-the-loop generative systems may be used to generate artifacts with the aid of human intervention and control to potentially increase quality and fit of generated music for individual purpose. For some embodiments of music generator module 160, the listener may become a listener-composer by controlling generative processes through the interface control elements 830 implemented in UI module 820. The design and implementation of these control elements may affect the balance between listener and composer roles for an individual. For example, highly detailed and technical control elements may reduce the influence of generative algorithms and put more creative control in the hands of a user while requiring more hands-on interaction and technical skill to manage.

To the contrary, higher-level control elements may reduce the required effort and time of interaction while reducing creative control. For example, for individuals that desire a more listener-type role, primary control elements, as described herein, may be favorable. Primary control elements may be based, for example, on abstract parameters such as mood, intensity or genre. These abstract parameters of music may be subjective measures that are often interpreted individually. For instance, in many cases, the listening environment has an effect on how listeners describe music. Thus, music that a listener might call 'relaxing' at a party may be too energetic and tense for a meditation session.

In some embodiments, one or more UI control element(s) 830 are implemented to receive user feedback on output music content 140. User feedback control elements may include, for example, a star rating, a thumbs up/thumbs down, etc. In various embodiments, the user feedback may be used to train the system to a user's particular taste and/or more global tastes that are applied for multiple users. In embodiments with thumbs up/thumbs down (e.g., positive/negative) feedback, the feedback is binary. Binary feedback with that include strong positive and strong negative responses may be effective in providing positive and negative reinforcement for the function of control element(s) 830. In some contemplated embodiments, input from thumbs up/thumbs down control elements can be used to control output music content 140 (e.g., the thumbs up/thumbs down control elements are used to control output themselves). For instance, a thumbs up control element can be used to modify the maximum repetitions of the currently playing output music content 140.

In some embodiments, a counter for each audio file keeps track of how many times a section (e.g., an 8 beat segment) of that audio file has been played recently. Once a file has been used above a desired threshold value a bias may be applied against its selection. This bias may gradually return to zero over-time. Together with rule-defined music sections that set the desired function of the music (e.g., buildup, drop, breakdown, intro, sustain), this repetition counter and bias may be used to shape music into segments with coherent themes. For example, music generator module 160 may increase the counter on a thumbs down press such that the audio content of output music content 140 is encouraged to change sooner without disrupting the musical function of the section. Similarly, music generator module 160 may decrease the counter on a thumbs up press such that the audio content of output music content 140 is not biased away from repetition for a longer period. Before the threshold is reached and bias applied, other machine learning and rule-based mechanisms in music generator module 160 may still lead to selection of other audio content.

In some embodiments, music generator module 160 is configured to determine various contextual information (e.g., environment information 150, shown in FIG. 1) around the time that user feedback is received. For example, in conjunction with receiving a "thumbs up" indication from a user, music generator module 160 may determine the time of day, location, device velocity, biometric data (e.g., heart rate), etc. from environment information 150. In some embodiments, this contextual information may be used to train a machine learning model to generate music that the user prefers in various different contexts (e.g., the machine learning model is context aware).

In various embodiments, music generator module 160 determines the current type of environment and takes different actions for the same user adjustment in different environments. For example, music generator module 160 may take environmental measurements and listener biometrics when the listener trains an "attitude" control element. During the training, music generator module 160 is trained to include these measures as part of the control element. In this example, when the listener is doing a high intensity work-out at the gym the "attitude" control element may affect the intensity of the drum beat. When sitting at a computer, changing the "attitude" control element may not affect drum beat but may increase distortion of bass lines. In such embodiments, a single user control element may have different sets of rules or differently-trained machine learning models that are used, alone or in combination, differently in different listening environments.

In contrast to contextual awareness, if an expected behavior of a control element is static, it may be likely that a number of controls can become necessary or desired for every listening context music generator module 160 is used in. Thus, in some embodiments, the disclosed techniques may provide functionality for multiple environments with a single control element. Implementing a single control element for multiple environments may reduce the number of control elements, making the user interface simpler and more quickly searched. In some embodiments, control element behavior is made dynamic. Dynamism for a control element may come from utilizing measurements of the environment, such as: sound levels recorded by microphones, heart-rate measurements, time of day and rate of movement, etc. These measurements may be used as additional inputs to the control element training. Thus, the same listener interaction with a control element will have potentially different musical effects depending on the environmental context in which the interaction occurs.

In some embodiments, the contextual awareness functionality described above is different from the concept of a generative music system changing generative processes based on environmental context. For example, these techniques may modify the effects of user control elements based on environmental context, which may be used alone or in combination with the concept of generating music based on environmental context and outputs of user controls.

In some embodiments, music generator module 160 is configured to control generated output music content 140 to achieve a stated goal. Examples of stated goals include, but are not limited to, sales goals, biometric goals such as heart rate or blood pressure, and ambient noise goals. Music generator module 160 may learn how to modify manually (user-created) or algorithmically (system-defined) produced control elements using techniques described herein to generate output music content 140 in order to meet a stated goal.

Goal states may be measurable environment and listener states that a listener wants to achieve while, and with the aid of, listening to music with music generator module 160. These goal states may be influenced directly—through music modifying the acoustic experience of the space the listener is in, or may be mediated through psychological effects, such as certain music encouraging focus. As one example, the listener may set a goal to have a lower heart-rate during a run. By recording the heart rate of the listener under different states of the available control elements, music generator module 160 has learned that the listener's heart rate typically reduces when a control element named "attitude" is set to a low level. Thus, to help the listener achieve a low heart rate, music generator module 160 may automate the "attitude" control to a low level.

By creating the kind of music that the listener expects in a specific environment, music generator module 160 may help create the specific environment. Examples include heart-rate, overall volume of sound in the listener's physical space, sales in a store, etc. Some environmental sensors and state data may not be suitable for goal states. Time of day, for example, may be an environment measure that is used as input for achieving a goal state of inducing sleep, but music generator module 160 cannot control the time of day itself.

In various embodiments, while sensor inputs may be disconnected from the control element mapper while trying to reach a state goal, the sensors may continue to record and instead provide a measure for comparing the actual with the target goal state. A difference between the target and actual environmental states may be formulated as a reward function for a machine learning algorithm that may adjust the mappings in the control element mapper while in a mode trying to achieve the goal state. The algorithm may adjust mappings to reduce the difference between the target and actual environmental states.

While there are many physiological and psychological effects of music content, creating music content the listener expects in a specific environment may not always help create that environment for the listener. In some instances, no effect or a negative effect towards meeting the target state may occur. In some embodiments, music generator module 160 may adjust music properties based on past results while branching in other directions if changes are not meeting a threshold. For example, if reducing the "attitude" control element did not result in a lower heart-rate for the listener, music generator module 160 may transition and develop new strategies using other control elements or generate a new control element using the actual state of the target variable as positive or negative reinforcement for a regression or neural network model.

In some embodiments, if context is found to affect the expected behavior of a control element for a specific listener, it may imply that the data-points (e.g., audio parameters) being modified by the control element in some specific context is related to the context for that listener. As such, these data-points may provide a good initial point for trying to generate music that produces an environmental change. For example, if a listener always manually turns up a "rhythmic" control element when the listener goes to the train station, then music generator module 160 may begin to automatically increase this control element when it detects the listener is at the train station.

In some embodiments, as described herein, music generator module 160 is trained to implement control elements that match a user's expectations. If music generator module 160 is trained from end-to-end for each control element (e.g., from control element level to output music content 140), the complexity of a training for each control element may be high, which may make training slower. Further, establishing the ideal combinatorial effects of multiple control elements may be difficult. For each control element, however, music generator module 160 should ideally be trained to perform an expected musical change based on the control element. For example, music generator module 160 may be trained for an "energy" control element by a listener to make the rhythmic density increase as "energy" is increased. Because the listener is exposed to the final output music content 140 and not just individual layers of the music content, music generator module 160 may be trained to affect the final output music content using the control element. This may, however, become a multi-step problem such as, for a specific control setting, the music should sound like X, and to create music that sounds like X, the set of audio files Y should be used on each track.

Figure 10:
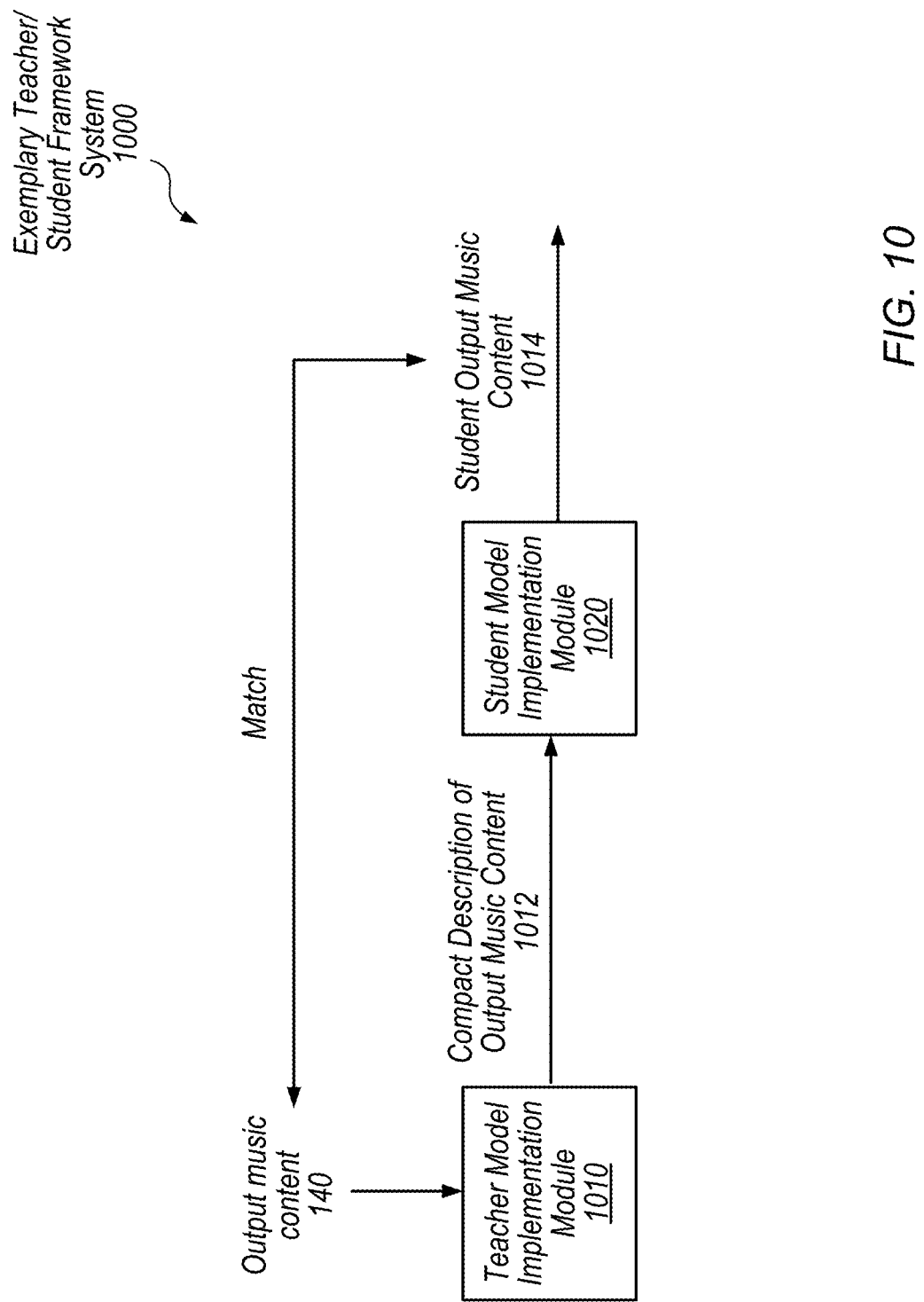
FIG. 10 is a block diagram illustrating an exemplary teacher/student framework system, according to some embodiments.

In certain embodiments, a teacher/student framework is adopted to address the above-described issues. FIG. 10 is a block diagram illustrating an exemplary teacher/student framework system, according to some embodiments. In the illustrated embodiment, system 1000 includes teacher model implementation module 1010 and student model implementation module 1020.

In certain embodiments, teacher model implementation module 1010 implements a trained teacher model. For instance, a trained teacher model may be a model that learns how to predict how a final mix (e.g., a stereo mix) should sound without any consideration of the set of loops available in the final mix. In some embodiments, a learning process for a teacher model utilizes real-time analysis of output music content 140 using a fast Fourier transform (FFT) to calculate the distribution of sound across different frequencies for sequences of short time steps. The teacher model may search for patterns in these sequences utilizing a time sequence prediction model such as a recurrent neural network (RNN). In some embodiments, the teacher model in teacher model implementation module 1010 may be trained offline on stereo recordings for which individual loops or audio files are not available.

In the illustrated embodiment, teacher model implementation module 1010 receives output music content 140 and generates compact description 1012 of the output music content. Using the trained teacher model, teacher model implementation module 1010 may generate compact description 1012 without any consideration of the audio tracks or audio files in output music content 140. Compact description 1012 may include a description, X, of what output music content 140 should sound like as determined by teacher model implementation module 1010. Compact description 1012 is more compact than output music content 140 itself.

Compact description 1012 may be provided to student model implementation module 1020. Student model implementation module 1020 implements a trained student model. For instance, a trained student model may be a model that learns how to produce music that matches a compact description using audio files or loops, Y (which is different than X). In the illustrated embodiment, student model implementation module 1020 generates student output music content 1014 that substantially matches output music content 140. As used here, the phrase "substantially matches" indicates that student output music content 1014 sounds similar to output music content 140. For example, a trained listener may consider that student output music content 1014 and output music content 140 sound the same.

In many instances, control elements may be expected to affect similar patterns in music. For example, a control element may affect both pitch relationships and rhythm. In some embodiments, music generator module 160 is trained for a large number of control elements according to one teacher model. By training music generator module 160 for a large number of control elements with a single teacher model, similar basic patterns may not need to be relearned for each control element. In such embodiments, student models of the teacher model then learn how to vary the selection of loops for each track to achieve the desired attributes in the final music mix. In some embodiments, properties of the loops may be pre-calculated to reduce the learning challenge and baseline performance (though it may be at the expense of potentially reducing the likelihood of finding an optimal mapping of a control element).

Non-limiting examples of music attributes pre-calculated for each loop or audio file that may be used for student model training includes the following: ratio of bass to treble frequencies, number of note onsets per second, ratio of pitched to unpitched sounds detected, spectral range, average onset intensity. In some embodiments, a student model is a simple regression model that is trained to select loops for each track to get the closest music properties in the final stereo mix. In various embodiments, the student/teacher model framework may have some advantages. For example, if new properties are added to the pre-calculation routine for loops, there is no need to retrain the whole end-to-end model, just the student models.

As another example, as properties of the final stereo mix that affect different controls are likely common to other control elements, training music generator module 160 for each control element as an end-to-end model would mean each model needs to learn the same thing (stereo mix music features) to get to the best loop selection, making training slower and harder than it may need to be. Only the stereo output needs to be analyzed in real-time and as the output music content is generated in real-time for the listener, music generator module 160 may get the signal for "free" computationally. Even the FFT may be already applied for visualization and audio mixing purposes. In this way, the teacher model may be trained to predict the combined behavior of control elements and music generator module 160 is trained to find ways of adapting to other control elements while still producing the desired output music content. This may encourage training for control elements to emphasize unique effects of a particular control element and reduce control elements having effects that diminish the impact of other control elements.

Exemplary Low Resolution Pitch Detection System

Pitch detection that is robust to polyphonic music content and diverse instrument types may traditionally be difficult to achieve. Tools that implement end-to-end music transcription may take an audio recording and attempt to produce a written score, or symbolic music representation in the form of MIDI. Without knowledge of beat placement or tempo, these tools may need to infer musical rhythmic structure, instrumentation, and pitch. The results may vary, with common problems being detecting too many short, nonexistent notes in the audio file and detecting harmonics of a note as the fundamental pitch.

Pitch detection may also be useful, however, in situations where end-to-end transcription is not needed. For making harmonically sensible combinations of music loops, for example, it may be sufficient to know which pitches are audible on each beat without needing to know the exact placement of a note. If the length and tempo of the loop are known, the temporal position of beats may not need to be inferred from the audio.

In some embodiments, a pitch detection system is configured to detect which fundamental pitches (e.g., C, C# . . . B) are present in short music audio files of known beat length. By reducing the problem scope and focusing on robustness to instrument texture, high-accuracy results may be achieved for beat resolution pitch detection.

In some embodiments, the pitch detection system is trained on examples where the ground truth is known. In some embodiments, the audio data is created from score data. MIDI and other symbolic music formats may be synthesized using software audio synthesizers with random parameters for texture and effects. For each audio file, the system may generate a log spectrogram 2D representation with multiple frequency bins for each pitch class. This 2D representation is used as input to a neural network or other AI technique where a number of convolutional layers are used to create a feature representation of the frequency and time representation of the audio. Convolution stride and padding may be varied dependent on audio file length to produce a constant model output shape with different tempo input. In some embodiments, the pitch detection system appends recurrent layers to the convolutional layers to output a temporally dependent sequence of predictions. A categorical cross entropy loss may be used to compare the logic output of the neural network with a binary representation of the score.

The design of convolutional layers combined with recurrent layers may be similar to work in speech to text, with modifications. For example, speech to text typically needs to be sensitive to relative pitch change but not absolute pitch. Thus, the frequency range and resolution is typically small. Further, text may need to be invariant to speed in a way that is not desirable in static-tempo music. Connectionist temporal classification (CTC) loss computation often utilized in speech-to-text tasks may not be needed, for example, because the length of output sequences is known in advance, which reduces complexity for training.

The following representation has 12 pitch classes for each beat, with 1 representing the presence of that fundamental note in the score used to synthesize the audio. (C, C# . . . B) and each row representing a beat, e.g., with later rows representing scores at different beats:

| 0 | 1 | 0 | 0 | 1 | 0 | 0 | 0 | 1 | 0 | 0 | 1 |
|---|---|---|---|---|---|---|---|---|---|---|---|
| 0 | 0 | 0 | 0 | 0 | 0 | 0 | 0 | 1 | 0 | 0 | 1 |
| 0 | 0 | 0 | 0 | 0 | 0 | 0 | 0 | 1 | 0 | 0 | 1 |
| 0 | 0 | 0 | 0 | 0 | 0 | 0 | 0 | 1 | 0 | 0 | 1 |
| 0 | 0 | 0 | 0 | 0 | 0 | 1 | 0 | 1 | 0 | 0 | 0 |
| 0 | 0 | 0 | 0 | 0 | 0 | 1 | 0 | 1 | 0 | 0 | 0 |
| 0 | 0 | 0 | 0 | 0 | 0 | 0 | 0 | 1 | 0 | 0 | 0 |
| 0 | 0 | 0 | 1 | 0 | 0 | 0 | 0 | 0 | 0 | 0 | 1 |

In some embodiments, the neural network is trained on classical music and pseudo random generated music scores of 1-4 parts (or more) harmony and polyphony. The data augmentation may help with robustness to music content with filters and effects such as reverb, which can be a point of difficulty for pitch detection (e.g., because part of the fundamental tone lingers after the original note has ended). In some embodiments, the dataset may be biased and loss weightings are used as it is much more likely for a pitch class to not have a note played on each beat.

In some embodiments, the format of output allows for harmonic clashes to be avoided on each beat while maximizing the range of harmonic contexts that a loop can be used in. For example, a bass loop could comprise only an F and move down to an E on the last beat of a loop. This loop will likely sound harmonically acceptable for most people in the key of F. If no temporal resolution is provided, and it is only known that an E and an F are in the audio, then it could be a sustained E with a short F at the end, which would not sound acceptable for most people in the context of the key of F. With higher resolution, the chance of harmonics, fretboard sound, and slides being detected as individual notes increases and thus additional notes could be falsely identified. By developing the system with the optimal resolution of temporal and pitch information for combining short audio recordings of instruments to create a musical mix with harmonically sound combinations, the complexity of the pitch detection problem may be reduced and robustness to short, less significant pitch events is increased, according to some embodiments.

In various embodiments of the music generator system described herein, the system may allow listeners to select the audio content that is used to create a pool from which the system constructs (generates) new music. This approach may be different from creating a playlist as the user does not need to select individual tracks or organize selections sequentially. Additionally, content from multiple artists may be used together simultaneously. In some embodiments, music content is grouped into "Packs" that are designed by software providers or by contributing artists. A Pack contains multiple audio files with corresponding image features and feature metadata files. A single Pack may contain, for example, 20 to 100 audio files that are available for use by the music generator system to create music. In some embodiments, a single Pack may be selected or multiple Packs may be selected in combination. During playback, Packs may be added or removed without stopping the music.

Exemplary Audio Techniques for Music Content Generation

In various embodiments, software frameworks for managing real-time generated audio may benefit from supporting certain types of functionality. For instance, audio processing software may follow a modular signal chain metaphor inherited from analog hardware, where different modules providing for audio generation and audio effects are chained together into an audio signal graph. Individual modules will typically expose various continuous parameters allowing for real-time modification of the module's signal processing. In the early days of electronic music, the parameters were often themselves analog signals, and thus the parameter processing chain and the signal processing chain coincided. Since the digital revolution, parameters have tended to be a separate digital signal.

Embodiments disclosed herein recognize that, for real-time music generation systems—whether a system interacts live with human performers or the system implements machine learning or other artificial intelligence (AI) techniques to generate music—a flexible control system that allows coordination and combination of parameters manipulations may be advantageous. Additionally, the present disclosure recognizes that it may also be advantageous for the effects of parameter changes to be invariant to changes in tempo.

In some embodiments, a music generator system generates new music content from playback music content based on different parameter representations of an audio signal. For example, an audio signal can be represented by both a graph of the signal (e.g., an audio signal graph) relative to time and a graph of the signal relative to beats (e.g., a signal graph). The signal graph is invariant to tempo, which allows for tempo invariant modification of audio parameters of the music content in addition to tempo variant modifications based on the audio signal graph.

Figure 11:
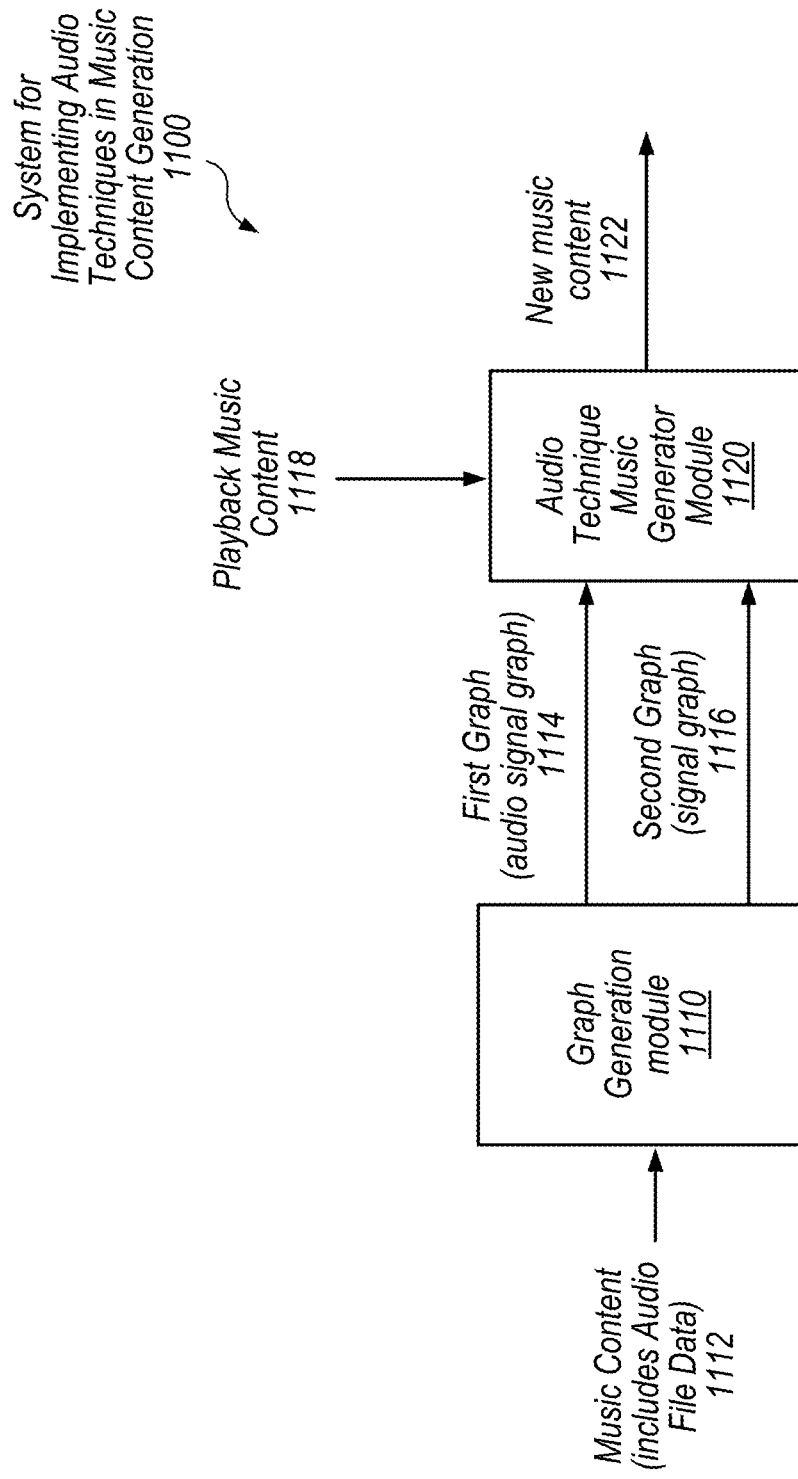
FIG. 11 is a block diagram illustrating an exemplary system configured to implement audio techniques in music content generation, according to some embodiments.

FIG. 11 is a block diagram illustrating an exemplary system configured to implement audio techniques in music content generation, according to some embodiments. In the illustrated embodiment, system 1100 includes graph generation module 1110 and audio technique music generator module 1120. Audio technique music generator module 1120 may operate as a music generator module (e.g., the audio technique music generator module is music generator module 160, described herein) or the audio technique music generator module may be implemented as a part of a music generator module (e.g., as part of music generator module 160).

In the illustrated embodiment, music content 1112, which includes audio file data, is accessed by graph generation module 1110. Graph generation module 1110 may generate first graph 1114 and second graph 1116 for an audio signal in the accessed music content 1112. In certain embodiments, first graph 1114 is an audio signal graph that graphs an audio signal as a function of time. The audio signal may include, for example, amplitude, frequency, or a combination of both. In certain embodiments, second graph 1116 is a signal graph that graphs the audio signal as a function of beats.

In certain embodiments, as shown in the illustrated embodiment of FIG. 11, graph generation module 1110 is located in system 1100 to generate first graph 1114 and second graph 1116. In such embodiments, graph generation module 1110 may be collocated with audio technique music generator module 1120. Other embodiments are contemplated, however, where graph generation module 1110 is located in a separate system and audio technique music generator module 1120 accesses the graphs from the separate system. For instance, the graphs may be generated and stored on a cloud-based server that is accessible by audio technique music generator module 1120.

Figure 12:
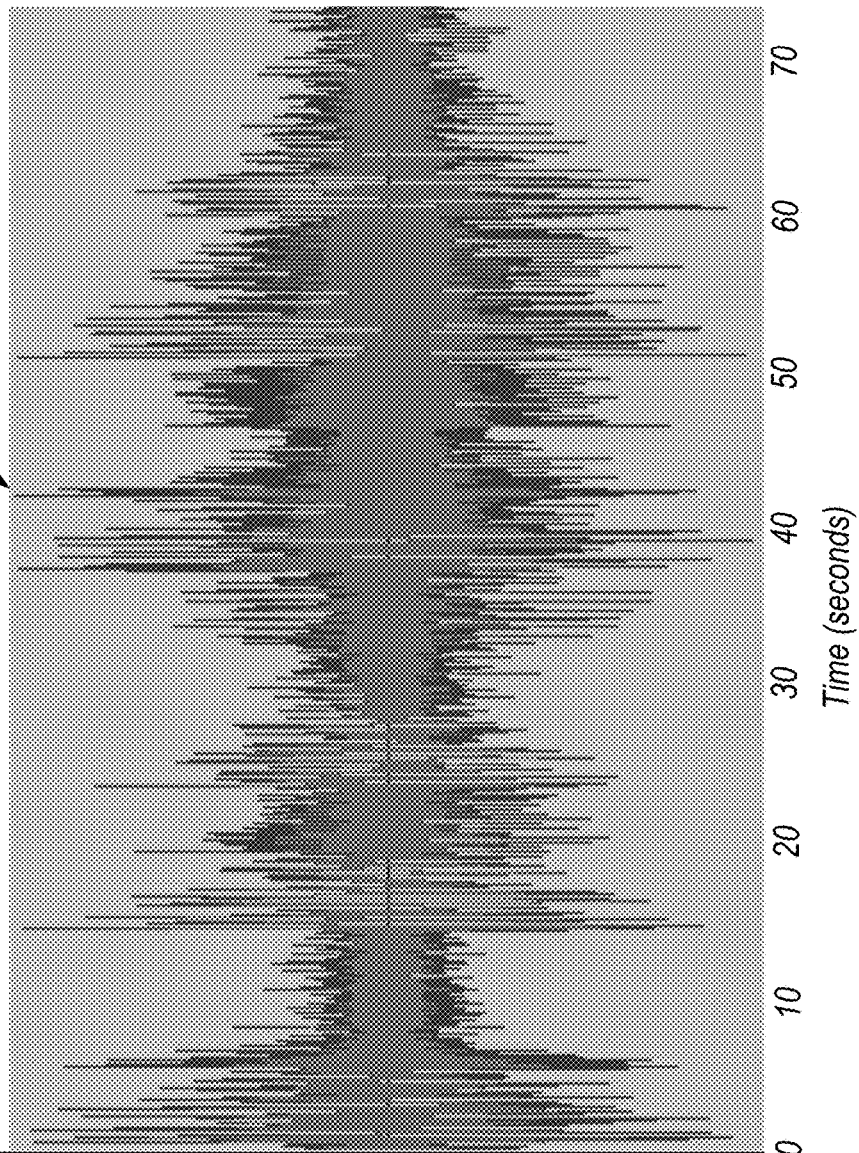
FIG. 12 depicts an example of an audio signal graph.
Figure 13:
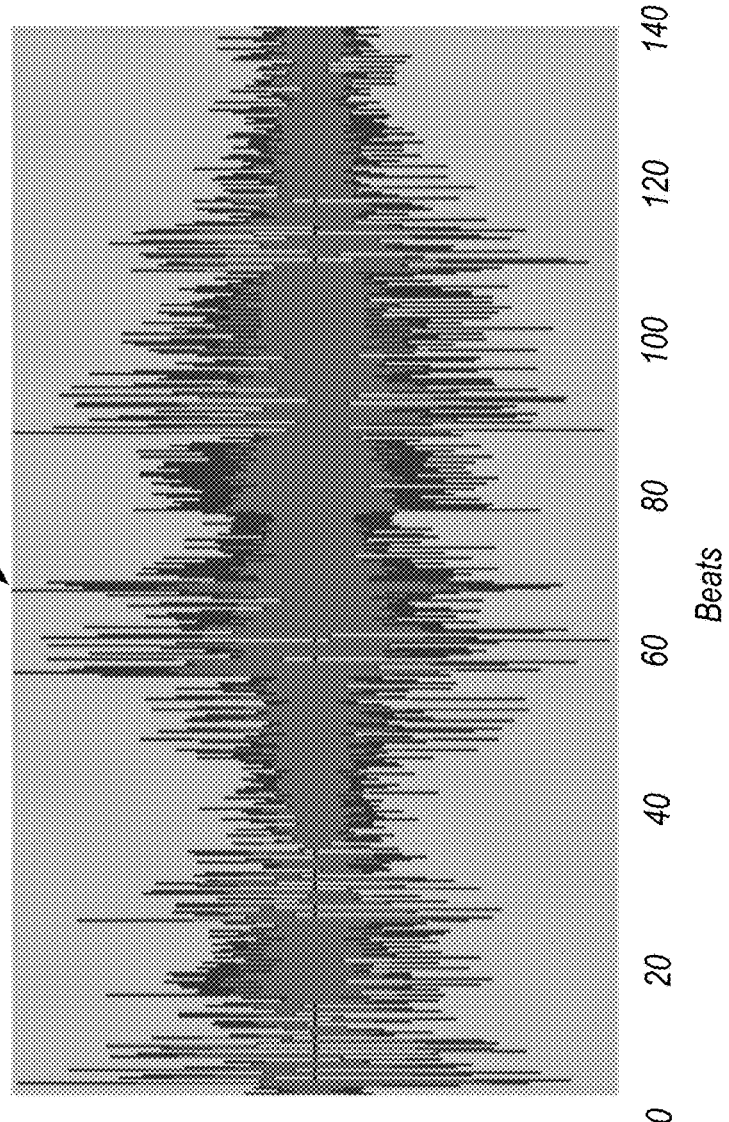
FIG. 13 depicts an example of an audio signal graph.

FIG. 12 depicts an example of an audio signal graph (e.g., first graph 1114). FIG. 13 depicts an example of a signal graph (e.g., second graph 1116). In the illustrated graphs in FIGS. 12 and 13, each change in the audio signal is represented as a node (e.g., audio signal node 1202 in FIG. 12 and signal node 1302 in FIG. 13). Thus, the parameters of a specified node determine (e.g., define) the changes to the audio signal at the specified node. As first graph 1114 and second graph 1116 are based on the same audio signal, the graphs may have similar structure with variant between the graphs being the x-axis scale (time versus beats). Having similar structure in the graphs allows modification of parameters (described below) for a node in one graph (e.g., node 1302 in second graph 1116) that corresponds to a node in the other graph (e.g., node 1202 in first graph 1114) to be determined by parameters either downstream or upstream of the node in the one graph.

Turning back to FIG. 11, first graph 1114 and second graph 1116 are received (or accessed) by audio technique music generator module 1120. In certain embodiments, audio technique music generator module 1120 generates new music content 1122 from playback music content 1118 based on audio modifier parameters selected from first graph 1114 and audio modifier parameters selected from second 1116. For instance, audio technique music generator module 1120 may modify playback music content 1118 with audio modifier parameters from either first graph 1114, audio modifier parameters from second graph 1116, or a combination thereof. New music content 1122 is generated by the modification of playback music content 1118 based on the audio modifier parameters.

In various embodiments, audio technique music generator module 1120 may select the audio modifier parameters to implement in the modification of playback content 1118 based on whether a tempo variant modification, a tempo invariant modification, or a combination thereof is desired. For instance, a tempo variant modification may be made based on audio modifier parameters selected or determined from first graph 1114 while a tempo invariant modification may be made based on audio modifier parameters selected or determined from second graph 1116. In embodiments where a combination of tempo variant modification and tempo invariant modification is desired, audio modifier parameters may be selected from both first graph 1114 and second graph 1116. In some embodiments, the audio modifier parameters from each individual graph are separately applied to different properties (e.g., amplitude or frequency) or different layers (e.g., different instrumental layers) in playback music content 1118. In some embodiments, the audio modifier parameters from each graph are combined into a single audio modifier parameter to apply to a single property or layer in playback music content 1118.

Figure 14:
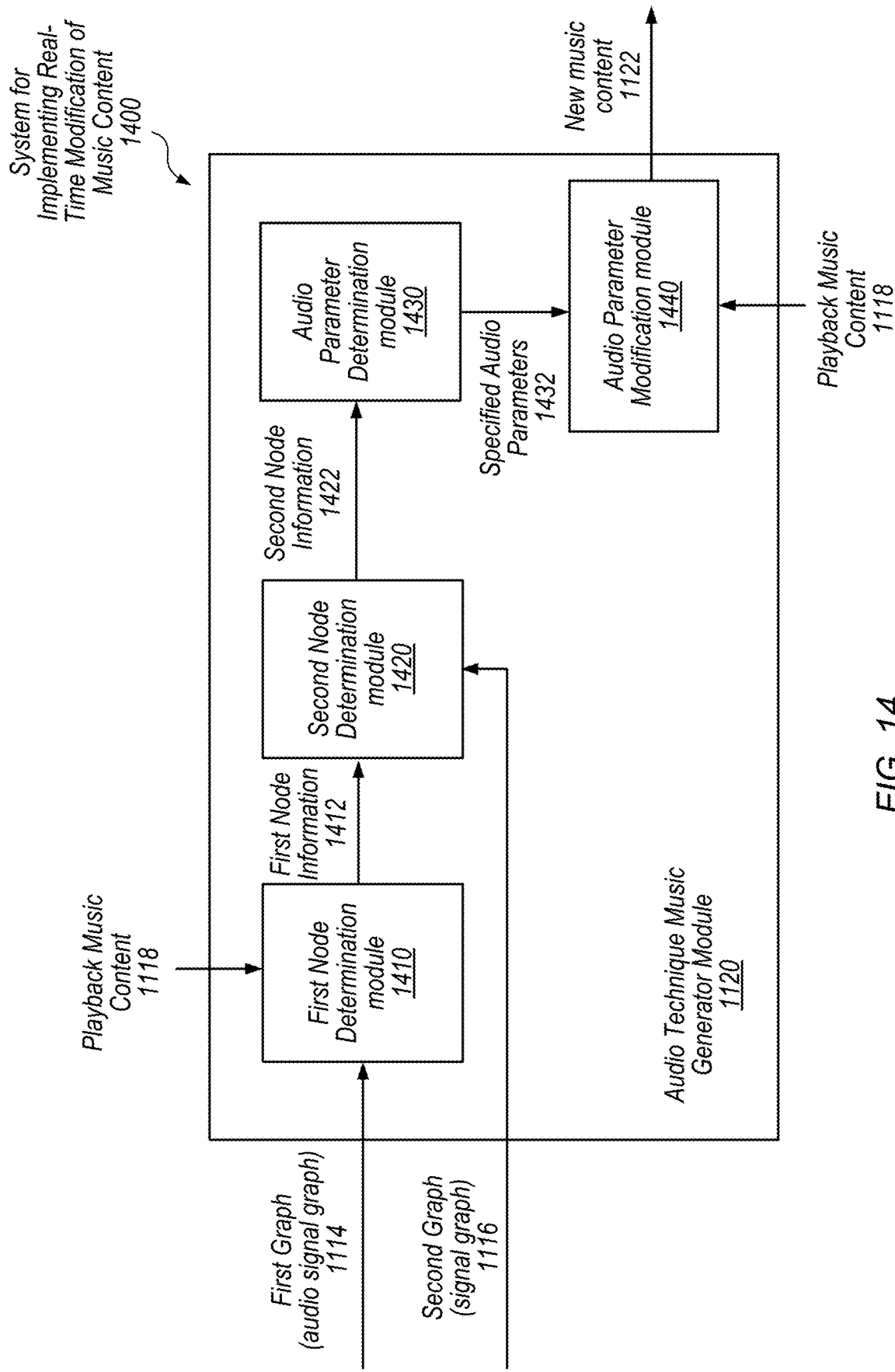
FIG. 14 depicts an exemplary system for implementing real-time modification of music content using an audio technique music generator module, according to some embodiments.

FIG. 14 depicts an exemplary system for implementing real-time modification of music content using audio technique music generator module 1420, according to some embodiments. In the illustrated embodiment, audio technique music generator module 1420 includes first node determination module 1410, second node determination module 1420, audio parameter determination module 1430, and audio parameter modification module 1440. Together, first node determination module 1410, second node determination module 1420, audio parameter determination module 1430, and audio parameter modification module 1440 implement system 1400.

In the illustrated embodiment, audio technique music generator module 1420 receives playback music content 1418 that includes an audio signal. Audio technique music generator module 1420 may process the audio signal through first graph 1414 (e.g., the time-based audio signal graph) and second graph 1416 (e.g., the beat-based signal graph) in first node determination module 1410. As the audio signal goes through first graph 1414, the parameters for each node in the graph determine the changes to the audio signal. In the illustrated embodiment, second node determination module 1420 may receive information on first node 1412 and determine information for second node 1422. In certain embodiments, second node determination module 1420 reads the parameters in second graph 1416 based on a location of the first node found in first node information 1412 in the audio signal going through first graph 1414. Thus, as an example, the audio signal going to node 1202 in first graph 1414 (shown in FIG. 12) as determined by first node determination module 1410 may trigger second node determination module 1420 determining the corresponding (parallel) node 1302 in second graph 1416 (shown in FIG. 13).

As shown in FIG. 14, audio parameter determination module 1430 may receive second node information 1422 and determine (e.g., select) specified audio parameters 1432 based on the second node information. For instance, audio parameter determination module 1430 may select audio parameters based on a portion of the next beats (e.g., x number of next beats) in second graph 1416 that follow a location of the second node as identified in second node information 1422. In some embodiments, a beat to real-time conversion may be implemented to determine the portion of second graph 1416 from which audio parameters may be read. The specified audio parameters 1432 may be provided to audio parameter modification module 1440.

Audio parameter modification module 1440 may control the modification of music content to generate new music content. For instance, audio parameter modification module 1440 may modify playback music content 1418 to generate new music content 1122. In certain embodiments, audio parameter modification module 1440 modifies properties of playback music content 1418 by modifying specified audio parameters 1432 (as determined by audio parameter determination module 1430) for an audio signal in the playback music content. For example, modifying specified audio parameters 1432 for the audio signal in playback music content 1418 modifies properties such as amplitude, frequency, or a combination of both in the audio signal. In various embodiments, audio parameter modification module 1440 modifies properties of different audio signals in playback music content 1418. For instance, different audio signals in playback music content 1418 may correspond to different instruments represented in playback music content 1418.

In some embodiments, audio parameter modification module 1440 modifies properties of audio signals in playback music content 1418 using machine learning algorithms or other AI techniques. In some embodiments, audio parameter modification module 1440 modifies properties of playback music content 1418 according to user input to the module, which may be provided through a user interface associated with the music generation system. Embodiments may also be contemplated where audio parameter modification module 1440 modifies properties of playback music content 1418 using a combination of AI techniques and user input. The various embodiments for modification of the properties of playback music content 1418 by audio parameter modification module 1440 allow real-time manipulation of music content (e.g., manipulation during playback). As described above, the real-time manipulation can include applying a tempo variant modification, a tempo invariant combination, or a combination of both to audio signals in playback music content 1418.

In some embodiments, audio technique music generator module 1420 implements a 2-tiered parameter system for modification of the properties of playback music content 1418 by audio parameter modification module 1440. In the 2-tiered parameter system, there may be a differentiation between "automations" (e.g., tasks performed automatically by the music generation system), which directly control audio parameter values, and "modulations", which layer audio parameter modifications on top of the automations multiplicatively, as described below. The 2-tiered parameter system may allow different parts of the music generation system (e.g., different machine learning models in the system architecture) to separately consider different musical aspects. For instance, one part of a music generation system may set the volume of a particular instrument according to intended section type of the composition, whereas another part may overlay a periodic variation of the volume for added interest.

Exemplary Techniques for Real-Time Audio Effects in Music Content Generation

Music technology software typically allows composers/ producers to control various abstract envelopes via automations. In some embodiments, automations are pre-programmed temporal manipulations of some audio processing parameter (such as volume, or reverb amount). Automations are typically either manually defined break-point envelopes (e.g., piecewise linear functions) or programmatic functions such as sinewaves (otherwise known as low frequency oscillators (LFOs)).

The disclosed music generator system may be different from typical music software. For instance, most parameters are, in a sense, automated by default. AI techniques in the music generator system may control most or all audio parameters in various ways. At a base level, a neural network may predict appropriate settings for each audio parameter based on its training. It may, however, be helpful to provide the music generator system with some higher-level automation rules. For example, large-scale musical structures may dictate a slow build in volume as an extra consideration, on top of the low-level settings that might otherwise be predicted.

The present disclosure generally relates to information architecture and procedural approaches for combining multiple parametric imperatives simultaneously issued by different levels of a hierarchical generative system to create a musically coherent and varied continuous output. The disclosed music generator system may create long-form musical experiences that are intended to be experienced continuously for several hours. Long-form musical experiences need to create a coherent musical journey for a more satisfactory experience. To do this, the music generator system may reference itself over long timescales. These references may vary from direct to abstract.

Figure 15:
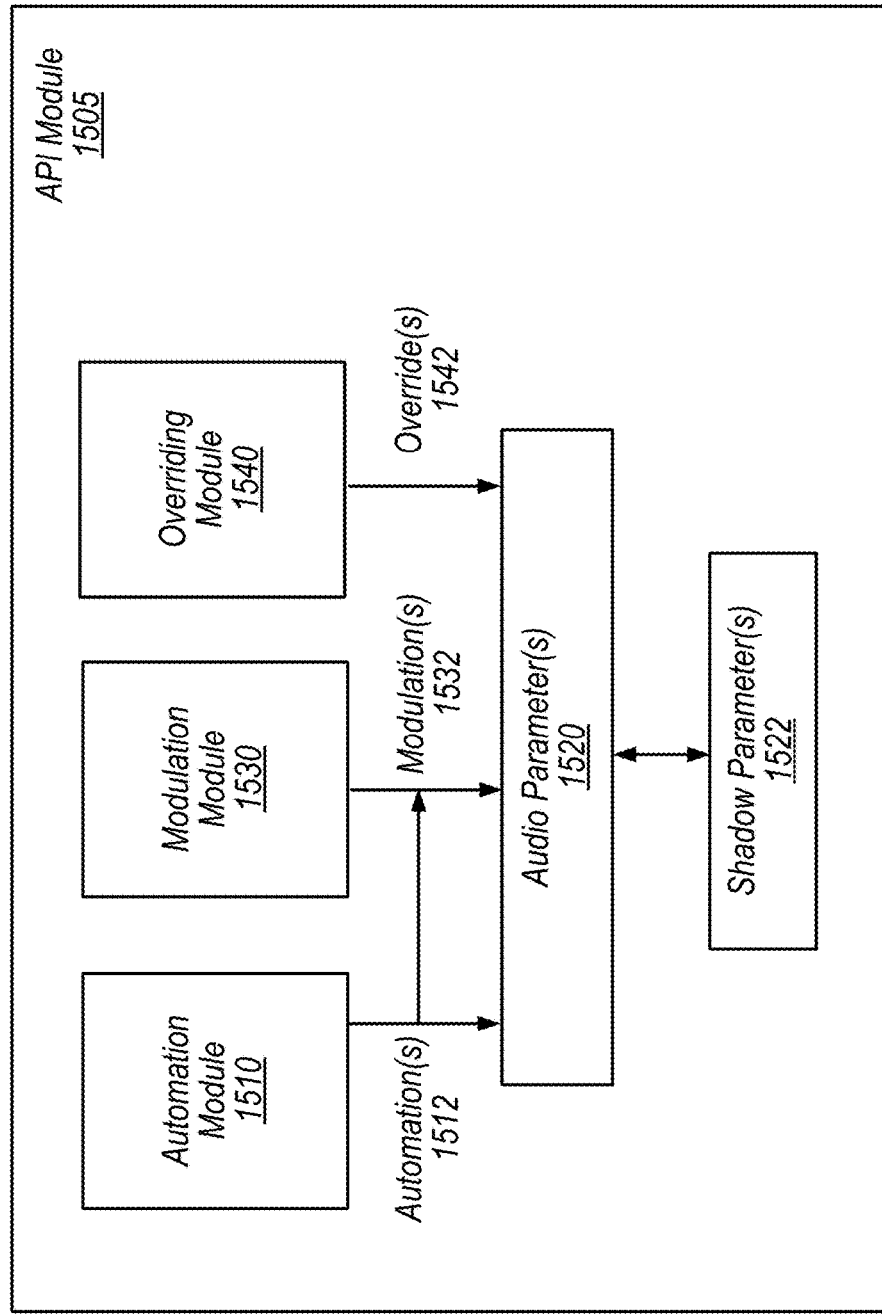
FIG. 15 depicts a block diagram of an exemplary API module in a system for automation of audio parameters, according to some embodiments.

In certain embodiments, to facilitate larger scale musical rules, the music generator system (e.g., music generator module 160) exposes an automation API (application programming interface). FIG. 15 depicts a block diagram of an exemplary API module in a system for automation of audio parameters, according to some embodiments. In the illustrated embodiment, system 1500 includes API module 1505. In certain embodiments, API module 1505 includes automation module 1510. The music generator system may support both wavetable-style LFOs and arbitrary breakpoint envelopes. Automation module 1510 may apply automation 1512 to any audio parameter 1520. In some embodiments, automation 1512 is applied recursively. For example, any programmatic automation like a sinewave, which itself has parameters (frequency, amplitude, etc.), can have automation applied to those parameters.

In various embodiments, automations 1512 include a signal graph parallel to the audio signal graph, as described above. The signal graph may be handled similarly: via a "pull" technique. In the "pull" technique, API module 1505 may request automation module 1510 to recalculate as needed, and to do the recalculation such that an automation 1512 recursively requests the upstream automations on which it depends to do the same. In certain embodiments, the signal graph for the automation is updated at a controlled rate. For example, the signal graph may update once each run of the performance engine update routine, which may align with the block-rate of the audio (e.g., after the audio signal graph renders one block (one block is, for instance, 512 samples)).

In some embodiments, it may be desirable for audio parameters 1520 themselves to vary at an audio-sample rate, otherwise discontinuous parameter changes at audio-block boundaries can lead to audible artefacts. In certain embodiments, the music generator system manages this issue by treating an automation update as a parameter value target. When the real-time audio thread renders an audio-block, the audio thread will smoothly ramp a given parameter from its current value to the supplied target value over the course of the block.

A music generator system described herein (e.g., music generator module 160, shown in FIG. 1) may have an architecture with a hierarchical nature. In some embodiments, different parts of the hierarchy may provide multiple suggestions for the value of a particular audio parameter. In certain embodiments, the music generator system provides two separate mechanisms for combining/resolving multiple suggestions: modulation and overriding. In the illustrated embodiment of FIG. 15, modulation 1532 is implemented by modulation module 1530 and override 1542 is implemented by overriding module 1540.

In some embodiments, an automation 1512 can be declared to be a modulation 1532. Such a declaration may mean that rather than setting an audio parameter's value directly, the automation 1512 should act multiplicatively on the audio parameter's current value. Thus, large-scale musical sections can apply a long modulation 1532 to an audio parameter (for example, a slow crescendo for a volume fader) and the value of the modulation will multiply whatever value other parts of the music generator system might dictate.

In various embodiments, API module 1505 includes overriding module 1540. Overriding module 1540 may be, for example, an override facility for audio parameter automation. Overriding module 1540 may be intended to be used by external control interfaces (e.g., an artist control user interface). Overriding module 1540 may take control over an audio parameter 1520 regardless of what the music generator system tries to do with it. When an audio parameter 1520 is overridden by override 1542, the music generator system may create a "Shadow Parameter" 1522 that tracks where the audio parameter would be if it wasn't overridden (e.g., where the audio parameter would be based on automation 1512 or modulation 1532). Thus, when the override 1542 is "released" (e.g., removed by the artist), the audio parameter 1520 can snap back to where it would have been according to automation 1512 or modulation 1532.

In various embodiments, these two approaches can be combined. For example, an override 1542 can be a modulation 1532. When override 1542 is modulation 1532, the basic value of an audio parameter 1520 may still be set by the music generator system but then multiplicatively modulated by the override 1542 (which overrides any other modulation). Each audio parameter 1520 may have one (or zero) automation 1512 and one (or zero) modulation 1532 at the same time, as well as one (or zero) of each override 1542.

In various embodiments, an abstract class hierarchy is defined as follows (note there is some multiple inheritance):
Automatable
    AutomationParameter
    Parameter
        AudioNodeParameter
        MacroParameter
        ShadowParameter
Beat-Dependent
    Automation
        Envelope
        ParameterFollower
        Periodic
        TransformedAutomation
        UberAutomation
    MacroParameter
    ShadowParameter Based on the abstract class hierarchy, things may be considered as either Automations, or Automatable. In some embodiments, any automation may be applied to anything that is automatable. Automations include things like LFOs, Break-point envelopes, etc. These automations are all tempo-locked, which means that they change through time according to the current beat.

Automations may themselves have automatable parameters. For example, the frequency and amplitude of an LFO automationare automatable. Thus, there is a signal graph of dependent automations and automation parameters running in parallel to the audio signal graph but at a control-rate rather than an audio rate. As described above, the signal graph uses a pull-model. The music generator system keeps track of any automations 1512 applied to audio parameters 1520, and updates these once per "game loop". The automations 1512 in turn request updates of their own automated audio parameters 1520 recursively. This recursive update logic may reside in a base class Beat-Dependent, which expects to be called frequently (but not necessarily regularly). The update logic may have a prototype described as follows:

BeatDependent::update(double currentBeat, int updateCounter, bool overRider)

In certain embodiments, the BeatDependent class maintains a list of its own dependencies (e.g., other BeatDependent instances), and recursively calls their update functions. An updateCounter may be passed up the chain such that the signal graph can have cycles without double updating. This may be important because automations may be applied to several different automatables. In some embodiments, this may not matter because the second update will have the same currentBeat as the first, and these update routines should be impotent unless the beat changes.

In various embodiments, when an automation is applied to an automatable, each cycle of the "game loop", the music generator system may request an updated value from each automation (recursively), and use that to set the value of the automatable. In this instance, "set" may depend on the particular subclass, and also on whether the parameter is also being modulated and/or overridden.

In certain embodiments, a modulation 1532 is an automation 1512 that is applied multiplicatively, rather than absolutely. For instance, a modulation 1532 can be applied to an already automated audio parameter 1520, and its effect will be as a percentage of the automated value. This multiplicatively may allow, for example, ongoing oscillations around a moving mean.

In some embodiments, audio parameters 1520 can be overridden, meaning, as described above, that any automations 1512 or modulations 1532 applied to them, or other (less privileged) requests are overridden by the overriding value in override 1542. This overriding may allow external control over some aspects of the music generator system, whilst music generator system continues as it otherwise would. When audio parameter 1520 is overridden, the music generator system keeps track of what the value would be (e.g., keeps track of the applied automations/modulations and other requests). When the override is released, the music generator system snaps the parameter to where it would have been.

To facilitate modulations 1532 and overrides 1542, the music generator system may abstract a setValue method of a Parameter. There may also be a private method_setValue, which actually sets the value. An example of a public method is as follows:

```
void Parameter::setValue(float value, bool overRider)
{
    _unmodulated→setValue(value, overRider);
    if (!modulated0)
        _setValue(value, overRider);
}
```

The public method may reference a member variable of the Parameter class called unmodulated. This variable is an instance of ShadowParameter, described above. Every audio parameter 1520 has a shadow parameter 1522 that tracks where it would be if not modulated. If an audio parameter 1520 is not currently being modulated, both the audio parameter 1520 and its shadow parameter 1522 are updated with the requested value. Otherwise, the shadow parameter 1522 tracks the request, and the actual audio parameter value 1520 is set elsewhere (e.g., in an updateModulations routine—where the modulating factor is multiplied by the shadow parameter value to give the actual parameter value).

In various embodiments, large scale structure in long-form musical experiences is be achieved by various mechanisms. One broad approach may be the use of musical self-references over time. For example, a very direct self-reference would be exactly repeating some audio segment previously played. In music theory, the repeated segment may be called a theme (or a motif). More typically, music content uses theme-and-variation, whereby the theme is repeated at a later time with some variation to give a sense of coherence but maintain a sense of progress. The music generator system disclosed herein may use theme-and-variation to create large-scale structure in several ways, including direct repetition or through the use of abstract envelopes.

An abstract envelope is a value of an audio parameter through time. Abstracted from the audio parameter it is controlling, an abstract envelope may be applied to any other audio parameter. For example, a collection of audio parameters could be automated in concert by a single controlling abstract envelope. This technique may "bond" different layers together perceptually for a short term. Abstract envelopes may also be reused temporally and applied to different audio parameters. In this way, the abstract envelope becomes the abstract musical theme, and this theme is repeated by applying the envelope to a different audio parameter later in the listening experience. Thus, there is a variation on the theme while a sense of structure and long-term coherence is established.

Viewed as musical themes, abstract envelopes can abstract many musical features. Examples of musical features that may be abstracted include, but are not limited to:

Building in tension (volume of any track, level of distortion, etc.).

Rhythm (volume adjustment and/or gating creates rhythmic effect applied to pads, etc.).

Melody (pitch filtering can imitate melodic contours applied to pads, etc.).

Exemplary Additional Audio Techniques for Real-Time Music Content Generation

Real-time music content generation may present unique challenges. For example, because of a hard real-time constraint, function calls or subroutines that have unpredictable and potentially unbounded execution times should be avoided. Avoiding this issue may rule out the use of most high-level programming languages, and large parts of low-level languages such as C and C++. Anything that allocates memory from the heap (e.g., via a malloc under the hood) may be ruled out as well as anything that may potentially block, such as locking a mutex. This may make multi-threaded programming particularly difficult for real-time music content generation. Most standard memory management approaches may also not be viable, and consequently dynamic data structures such as C++ STL containers have limited use for real-time music content generation.

Another area of challenge may be the management of audio parameters involved in DSP (digital signal processing) functions (such as the cutoff frequency for a filter). For instance, when changing audio parameters dynamically, audible artefacts may occur unless the audio parameters are changed continuously. Thus, communication between the real-time DSP audio thread(s) and user-facing or programmatic interfaces may be needed to change the audio parameters.

Various audio software may be implemented to deal with these constraints, and various approaches exist. For example:

Interthread communication may be handled with lock-free message queues.

Functions may be written in plain C and utilize function pointer callbacks.

Memory management may be implemented via custom "zones" or "arenas"

"Two-speed" system may be implemented with real-time audio thread calculations running at audio-rate, and control audio thread running at "control-rate". The control audio thread may set audio parameter change goals, which the real-time audio thread smoothly ramps to.

In some embodiments, synchronizing between control-rate audio parameter manipulation and the real-time audio thread safe storage of audio parameter values for use in actual DSP routines may require some sort of thread-safe communication of audio parameter goals. Most audio parameters for audio routines are continuous (rather than discrete) and thus are typically represented by floating point data types. Various contortions to the data have been historically necessitated by the lack of a lock-free atomic floating point data type.

In certain embodiments, a simple lock-free atomic floating point data type is implemented in the music generator system described herein. A lock-free atomic floating point data type may be achieved by treating the floating-point type as a sequence of bits, and "tricking" the compiler into treating it as an atomic integer type of the same bit-width. This approach may support atomic getting/setting, which is suitable for the music generator system described herein. An example implementation of a lock-free atomic floating point data type is described as follows:

```
//atomic float
class af32 {
public:
af32( ) { }
af32(float x) operator( )(x);}
~af32( ) { }
af32(const af32& x): valueStore(x( )) { }
af32& operator=(const af32& x) {this->operator( )(x( ));
    return *this;}
float operator( )( ) const {uint32_t voodoo=atomic_load
    (&valueStore);
return ((float)&voodoo);}
void operator( )(float value) {
uint32_t    voodoo=((uint32_t)&value);    atomic_store
    (&_valueStore, voodoo);
}
private:
std::atomic_uint32_t_valueStore {0};
};
```

In some embodiments, dynamic memory allocations from the heap are not viable for real-time code associated with music content generation. For example, static stack-based allocations may make it difficult to use programming techniques such as dynamic storage containers and functional programming approaches. In certain embodiments, the music generator system described herein implements "memory zones" for memory management in real-time contexts. As used herein, a "memory zone" is an area of heap allocated memory that is allocated up-front without real-time constraints (e.g., when real-time constraints are not yet present or paused). Memory storage objects may then be created in the area of heap allocated memory without needing to request more memory from the system, thereby making the memory real-time safe. Garbage collection may include deallocating the memory zone as a whole. The memory implementation by the music generator system may also be multithreading safe, real-time safe, and efficient.

Figure 16:
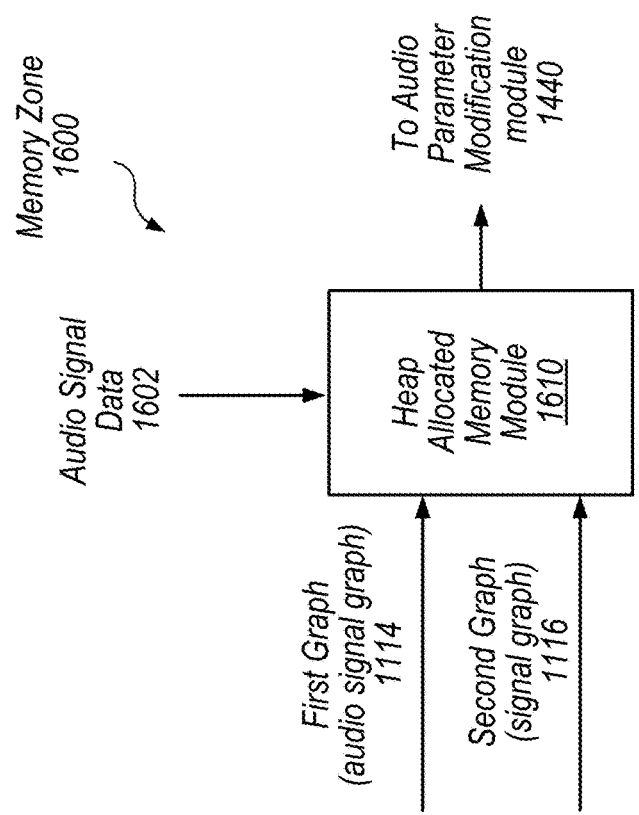
FIG. 16 depicts a block diagram of an exemplary memory zone, according to some embodiments.

FIG. 16 depicts a block diagram of an exemplary memory zone 1600, according to some embodiments. In the illustrated embodiment, memory zone 1600 includes heap allocated memory module 1610. In various embodiments, heap allocated memory module 1610 receives and stores first graph 1114 (e.g., the audio signal graph), second graph 1116 (e.g., the signal graph), and audio signal data 1602. Each of the stored items may be retrieved, for example, by audio parameter modification module 1440 (shown in FIG. 14).

An example implementation of a memory zone is described as follows:

```
//memory poolclass MemoryZone
{public:
MemoryZone(uint64_t sz):  sz(sz),  zone((char)malloc
    (sz)) { }
~MemoryZone( ) {free(zone);}
void*bags(size_t obj_size, size_t alignment) {
uint64_t p=atomic_load(&p);
uint64_t q=p % uint64_t(alignment);
if (p+q>sz) return nullptr;
uint64_t pp=atomic_fetch add(&p, uint64_t(obj_size)+
    q);
if (pp==p) {return zone_+p+q;}
else {return bags(obj_size, alignment);}
} uint64_t used( ) {return atomic_load(&p);}
uint64_t available( ) {return int64_t(sz)-int64_t(atomic_load(&p));}
void hose( ) {atomic_store(&p, 0ULL);}
private:
char zone;
uint64_t sz;
std::atomic_uint64_t p_{0};
```

In some embodiments, different audio threads of the music generator system need to communicate with each other. Typical thread-safety approaches (which may include locking 'mutually exclusive' data structures) may not be usable in a real-time context. In certain embodiments, dynamic routing data serializations to a pool of single-producer single-consumer circular buffers are implemented. A circular buffer is a type of FIFO (first-in first-out) queue data structure that typically doesn't require dynamic memory allocation after initialization. A single-producer, single-consumer thread safe circular buffer may allow one audio thread to push data into the queue while another audio thread pulls data out. For the music generator system described herein, circular buffers may be extended to allow multiple-producer, single-consumer audio threads. These buffers may be implemented by pre-allocating a static array of circular buffers and dynamically routing serialized data to a particular "channel" (e.g., a particular circular buffer) according to an identifier added to music content produced by the music generator system. The static array of circular buffers may be accessible by a single user (e.g., the single-consumer).

Figure 17:
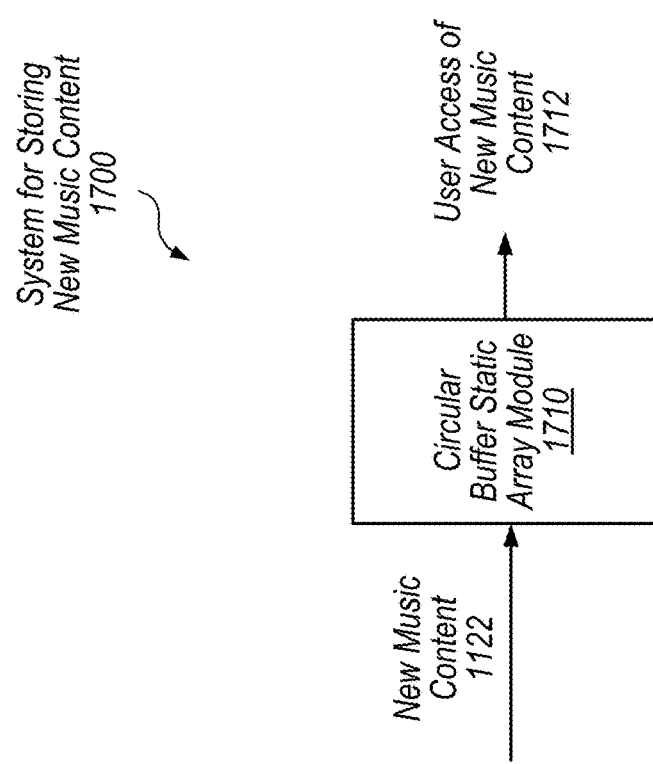
FIG. 17 depicts a block diagram of an exemplary system for storing new music content, according to some embodiments.

FIG. 17 depicts a block diagram of an exemplary system for storing new music content, according to some embodiments. In the illustrated embodiment, system 1700 includes circular buffer static array module 1710. Circular buffer static array module 1710 may include a plurality of circular buffers that allow storage of multiple-producer, single-consumer audio threads according to thread identifiers. For example, circular buffer static array module 1710 may receive new music content 1122 and store the new music content for access by a user in 1712.

In various embodiments, abstract data structures, such as dynamic containers (vector, queue, list), are typically implemented in non-real-time-safe ways. These abstract data structures may, however, be useful for audio programming. In certain embodiments, the music generator system described herein implements a custom list data structure (e.g., singly linked-list). Many functional programming techniques may be implemented from the custom list data structure. The custom list data structure implementation may use the "memory zones" (described above) for underlying memory management. In some embodiments, the custom list data structure is serializable, which may make it safe for real-time use and able to be communicated between audio threads using the multiple-producer, single-consumer audio threads described above.

Exemplary Blockchain Ledger Techniques

Disclosed systems may utilize secure recording techniques such as blockchains or other cryptographic ledgers, in some embodiments, to record information about generated music or elements thereof such as loops or tracks. In some embodiments, a system combines multiple audio files (e.g., tracks or loops) to generate output music content. The combination may be performed by combining multiple layers of audio content such that they overlap at least partially in time. The output content may be discrete pieces of music or may be continuous. Tracking use of musical elements may be challenging in the context of continuous music, e.g., in order to provide royalties to relevant stakeholders. Therefore, in some embodiments, disclosed systems record an identifier and usage information (e.g., timestamps or the number of plays) for audio files used in composed music content. Further, disclosed systems may utilize various algorithms for tracking playback times in the context of blended audio files, for example.

As used herein, the term "blockchain" refers to a set of records (referred to as blocks) that are cryptographically linked. For example, each block may include a cryptographic hash of the previous block, a timestamp, and transaction data. A blockchain may be used as a public distributed ledger and may be managed by a network of computing devices that use an agreed-upon protocol for communication and validating new blocks. Some blockchain implementations may be immutable while others may allow subsequent alteration of blocks. Generally, blockchains may record transactions in a verifiable and permanent fashion. While blockchain ledgers are discussed herein for purposes of illustration, it is to be understood that the disclosed techniques may be used with other types of cryptographic ledgers in other embodiments.

Figures 18, 19:
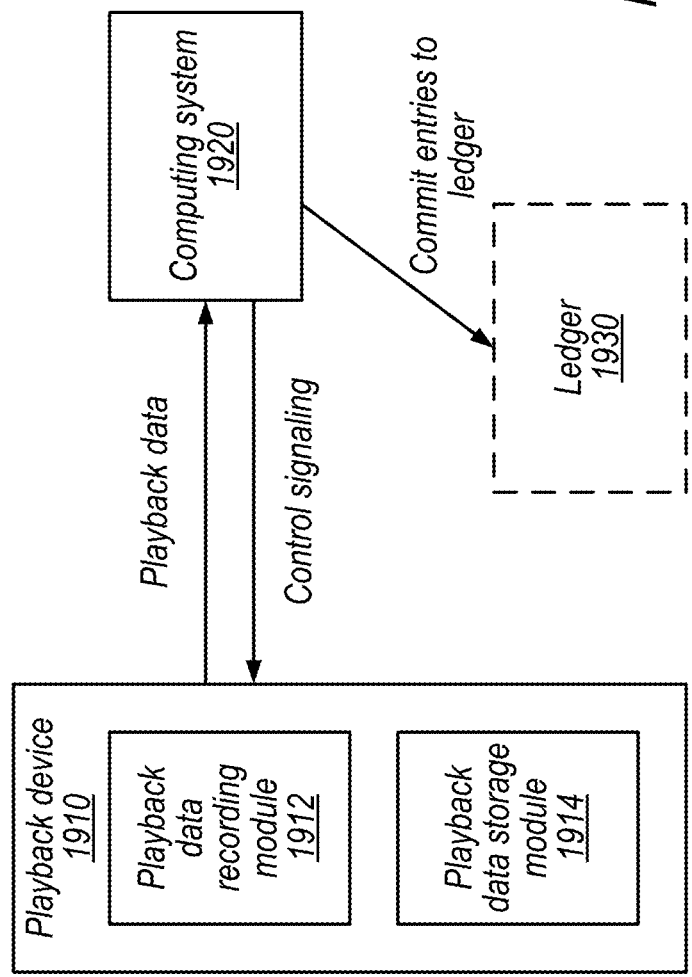
FIG. 18 is a diagram illustrating example playback data, according to some embodiments.
FIG. 19 is a block diagram illustrating an example composition system, according to some embodiments.

FIG. 18 is a diagram illustrating example playback data, according to some embodiments. In the illustrated embodiment, a database structure includes entries for multiple files. Each illustrated entry includes a file identifier, a start timestamp, and a total time. The file identifier may uniquely identify audio files tracked by the system. The start timestamp may indicate the first inclusion of the audio file in mixed audio content. This timestamp may be based on a local clock of a playback device or based on an internet clock, for example. The total time may indicate the length of the interval over which the audio file was incorporated. Note that this may be different than the length of the audio file, e.g., if only a portion of the audio file is used, if the audio file is sped up or slowed down in the mix, etc. In some embodiments, when an audio file is incorporated at multiple different times, each time results in an entry. In other embodiments, additional plays for a file may result in an increase to the time field of an existing entry, if an entry already exists for the file. In still other embodiments, the data structure may track the number of times each audio file is used rather than the length of incorporation. Further, other encodings of time-based usage data are contemplated.

In various embodiments, different devices may determine, store, and use a ledger to record playback data. Example scenarios and topologies are discussed below with reference to FIG. 19. Playback data may be temporarily stored on a computing device before being committed to a ledger. Stored playback data may be encrypted, e.g., to reduce or avoid manipulation of entries or insertion of false entries.

FIG. 19 is a block diagram illustrating an example composition system, according to some embodiments. In the illustrated example, the system includes playback device 1910, computing system 1920, and ledger 1930.

Playback device 1910, in the illustrated embodiment, receives control signaling from computing system 1920 and sends playback data to computing system 1920. In this embodiment, playback device 1910 includes playback data recording module 1912, which may record playback data based on audio mixes played by playback device 1910. Playback device 1910 also includes playback data storage module 1914, which is configured to store playback data temporarily, in a ledger, or both. Playback device 1910 may periodically report playback data to computing system 1920 or may report playback data in real time. Playback data may be stored for later reporting when playback device 1910 is offline, for example.

Computing system 1920, in the illustrated embodiment, receives playback data and commits entries that reflect the playback data to ledger 1930. Computing system 1920 also sends control signaling to the playback device 1910. This control signaling may include various types of information in different embodiments. For example, the control signaling may include configuration data, mixing parameters, audio samples, machine learning updates, etc. for use by playback device 1910 to compose music content. In other embodiments, computing system 1920 may compose music content and stream the music content data to playback device 1910 via the control signaling. In these embodiments, modules 1912 and 1914 may be included in computing system 1920. Speaking generally, the modules and functionality discussed with reference to FIG. 19 may be distributed among multiple devices according to various topologies.

In some embodiments, playback device 1910 is configured to commit entries directly to ledger 1930. For example, a playback device such as a mobile phone may compose music content, determine the playback data, and store the playback data. In this scenario, the mobile device may report the playback data to a server such as computing system 1920 or directly to a computing system (or set of computing nodes) that maintains ledger 1930.

In some embodiments, the system maintains a record of rights holders, e.g., with mappings to audio file identifiers or to sets of audio files. This record of entities may be maintained in the ledger 1930 or in a separate ledger or some other data structure. This may allow rights holders to remain anonymous, e.g., when the ledger 1930 is public but includes a non-identifying entity identifier that is mapped to an entity in some other data structure.

In some embodiments, music composition algorithms may generate a new audio file from two or more existing audio files for inclusion in a mix. For example, the system may generate new audio file C based on two audio files A and B. One technique for such blending uses interpolation between vector representations of the audio of files A and B and generating file C using an inverse transformation from vector to audio representation. In this example, the play time for audio files A and B may both be incremented, but they may be incremented by less than their actual play time, e.g., because they were blended.

For example, if audio file C is incorporated into mixed content for 20 seconds, audio file A may have playback data that indicates 15 second and audio file B may have playback data that indicates 5 seconds (and note that the sum of the blended audio files may or may not match the length of use of the resulting file C). In some embodiments, the playback time for each original file is based on its similarly to the blended file C. For example, in vector embodiments, for an n-dimensional vector representation, the interpolated vector a has the following distance d from the vector representations of audio files A and B:

$$d(a,c)=((a1-c1)^2+(a2-c2)^2+\ldots+(an-cn)^2)^{1/2}$$

$$d(b,c)=((b1-c1)^2+(b2-c2)^2+\ldots+(bn-cn)^2)^{1/2}$$

In these embodiments, the playback time i for each original file may be determined as:

$$i(a) = t * \frac{d(a, c)}{d(b, c) + d(a, c)}$$

$$i(b) = t * \frac{d(b, c)}{d(b, c) + d(a, c)}$$

where t represents the playback time of file C.

In some embodiments, forms of remuneration may be incorporated into the ledger structure. For example, certain entities may include information associating audio files with performance requirements such as displaying a link or including an advertisement. In these embodiments, the composition system may provide proof of performance of the associated operation (e.g., displaying an advertisement) when including an audio file in a mix. The proof of performance may be reported according to one of various appropriate reporting templates that require certain fields to show how and when the operation was performed. The proof of performance may include time information and utilize cryptography to avoid false assertions of performance. In these embodiments, use of an audio file that does not also show proof of performance of the associated required operation may require some other form of remuneration such as a royalty payment. Generally, different entities that submit audio files may register for different forms of remuneration.

As discussed above, disclosed techniques may provide trustworthy records of audio file use in music mixes, even when composed in real-time. The public nature of the ledger may provide confidence in fairness of remuneration. This may in turn encourage involvement of artists and other collaborators, which may improve the variety and quality of audio files available for automated mixing.

In some embodiments, an artist pack may be made with elements that are used by the music engine to create continuous soundscapes. Artist packs may be professionally (or otherwise) curated sets of elements that are stored in one or more data structures associated with an entity such as an artist or group. Examples of these elements include, without limitation, loops, composition rules, heuristics, and neural net vectors. Loops may be included in a database of music phrases. Each loop is typically a single instrument or sets of related instruments playing a musical progression over a period of time. These can range from short loops (e.g. 4 bars) to longer loops (e.g. 32 to 64 bars) and so on. Loops may be organized into layers such as melody, harmony, drums, bass, tops, FX etc. A loop database may also be represented as a Variational Auto Encoder with encoded loop representations. In this case, loops themselves are not needed, rather a NN is used to generate sounds that are encoded in the NN.

Heuristics refers to parameters, rules, or data that guide the music engine is the creation of music. Parameters guide such elements as section length, use of effects, frequency of variational techniques, complexity of music, or generally speaking any type of parameter that could be used to augment the music engines decision making as it composes and renders music.

The ledger records transactions related to consumption of content that has rights holders associated with it. This could be loops, heuristics, or neural network vectors, for example. The goal of the ledger is to record these transactions and make them inspectable for transparent accounting. The ledger is meant to capture transactions as they happen, which may include consumption of content, use of parameters in guiding the music engine, and use of vectors on a neural network, etc. The ledger may record various transaction types including discrete events (e.g. this loop was played at this time), this pack was played for this amount of time, or this machine learning module (e.g., neural network module) was used for this amount of time.

The ledger makes it possible to associate multiple rights holders with any given artist pack or, more granularly, with specific loops or other elements of the artist pack. For example, a label, artist, and composer might have rights for a given artist pack. The ledger may allow them to associate payment details for the pack which specifics what percentage each of party will receive. For example, the artist could receive 25%, the label 25% and the composer 50%. Use of blockchain to manage these transactions may allow micropayments to be made in real-time to each of the rights holder, or accumulated over appropriate time periods.

As indicated above, in some implementations, loops might be replaced with VAEs that are essentially encodings of the loops in a machine learning module. In this case, the ledger may associate playtime with a particular artist pack that includes the machine learning module. For example, if an artist pack is played on aggregate 10% of the total play time across all devices, then this artist could receive 10% of the total revenue distribution.

In some embodiments, the system allows artists to create artist profiles. The profiles include pertinent information for the artist including bio, profile picture, banking details, and other data needed to verify the artist identity. Once an artist profile is created, the artist can then upload and publish artist packs. These packs include elements that are used by the music engine to create soundscapes.

For each artist pack that is created, rights holders can be defined and associated with the pack. Each rights holder can claim a percentage of the pack. In addition, each rights holder creates a profile and associates a bank account with their profile for payment. Artists are themselves rights holders and may own 100% of the rights associated with their packs.

In addition to recording events in the ledger that will be used for revenue recognition, the ledger may manage promotions that are associated with an artist pack. For example, an artist pack might have a free month promotion where the revenue generated will be different than when the promo is not running. The ledger automatically accounts for these revenue inputs as it calculates the payments to the rights holders.

This same model for rights management may allow an artist to sell rights to their pack to one or more external rights holders. For example, at the launch of a new pack, an artist could pre-fund their pack by selling 50% of their stake in the pack to fans or investors. The number of investors/rights-holders in this case could be arbitrarily large. As an example, the artist could sell 50% of their percentage to 100K users, which of whom would get ¹⁄₁₀₀K of the revenue generated by the pack. Since all the accounting is managed by the ledger, investors would be paid directly in this scenario, removing any need for auditing of artist accounts.

Exemplary User and Enterprise GUIs

FIGS. 20A-20B are block diagrams illustrating graphical user interfaces, according to some embodiments. In the illustrated embodiment, FIG. 20A contains a GUI displayed by user application 2010 and FIG. 20B contains a GUI displayed by enterprise application 2030. In some embodiments, the GUIs displayed in FIGS. 20A and 20B are generated by a website rather than by an application. In various embodiments, any of various appropriate elements may be displayed, including one or more of the following elements: dials (e.g., to control volume, energy, etc.), buttons, knobs, display boxes (e.g., to provide the user with updated information), etc.

In FIG. 20A, user application 2010 displays a GUI that contains section 2012 for selecting one or more artist packs. In some embodiments, packs 2014 may alternatively or additionally include theme packs or packs for a specific occasion (e.g., a wedding, birthday party, graduation ceremony, etc.). In some embodiments, the number of packs shown in section 2012 is greater than the number that can be displayed in section 2012 at one time. Therefore, in some embodiments, the user scrolls up and/or down in section 2012 to view one or more packs 2014. In some embodiments, the user can select an artist pack 2014 based on which he/she would like to hear output music content. In some embodiments, artist packs may be purchased and/or downloaded, for example.

Selection element 2016, in the illustrated embodiment, allows the user to adjust one or more music attributes (e.g., energy level). In some embodiments, selection element 2016 allows the user to add/delete/modify one or more target music attributes. In various embodiments, selection element 2016 may render one or more UI control elements (e.g., control elements 830).

Selection element 2020, in the illustrated embodiment, allows the user to let the device (e.g., mobile device) listen to the environment to determine target musical attributes. In some embodiments, the device collects information about the environment using one or more sensors (e.g., cameras, microphones, thermometers, etc.) after the user selects selection element 2020. In some embodiments, application 2010 also selects or suggests one or more artist packs based on the environment information collected by the application when the user selected element 2020.

Selection element 2022, in the illustrated embodiment, allows the user to combine multiple artist packs to generate a new rule set. In some embodiments, the new rule set is based on the user selecting one or more packs for the same artist. In other embodiments, the new rule set is based on the user selecting one or more packs for different artists. The user may indicate weights for different rule sets, e.g., such that a highly-weighted rule set has more effect on generated music than a lower-weighted rule set. The music generator may combine rule sets in multiple different ways, e.g., by switching between rules from different rule sets, averaging values for rules from multiple different rule sets, etc.

In the illustrated embodiment, selection element 2024 allows the user to adjust rule(s) in one or more rule sets manually. For example, in some embodiments, the user would like to adjust the music content being generated at a more granular level, by adjusting one or more rules in the rule set used to generate the music content. In some embodiments, this allows the user of application 2010 to be their own disk jockey (DJ), by using the controls displayed in the GUI in FIG. 20A to adjust a rule set used by a music generator to generate output music content. These embodiments may also allow more fine-grained control of target music attributes.

In FIG. 20B, enterprise application 2030 displays a GUI that also contains an artist pack selection section 2012 with artist packs 2014. In the illustrated embodiment, the enterprise GUI displayed by application 2030 also contains element 2016 to adjust/add/delete one or more music attributes. In some embodiments, the GUI displayed in FIG. 20B is used in a business or storefront to generate a certain environment (e.g., for optimizing sales) by generating music content. In some embodiments, an employee uses application 2030 to select one or more artist packs that have been previously shown to increase sales (for example, metadata for a given rule set may indicate actual experimental results using the rule set in real-world contexts).

Input hardware 2040, in the illustrated embodiment, sends information to the application or website that is displaying enterprise application 2030. In some embodiments, input hardware 2040 is one of the following: a cash register, heat sensors, light sensors, a clock, noise sensors, etc. In some embodiments, the information sent from one or more of the hardware devices listed above is used to adjust target music attributes and/or a rule set for generating output music content for a specific environment. In the illustrated embodiment, selection element 2038 allows the user of application 2030 to select one or more hardware devices from which to receive environment input.

Display 2034, in the illustrated embodiment, displays environment data to the user of application 2030 based on information from input hardware 2040. In the illustrated embodiment, display 2032 shows changes to a rule set based on environment data. Display 2032, in some embodiments, allows the user of application 2030 to see the changes made based on the environment data.

In some embodiments, the elements shown in FIGS. 20A and 20B are for theme packs and/or occasion packs. That is, in some embodiments, the user or business using the GUIs displayed by applications 2010 and 2030 can select/adjust/modify rule sets to generate music content for one or more occasions and/or themes.

Detailed Example Music Generator System

Figure 21:
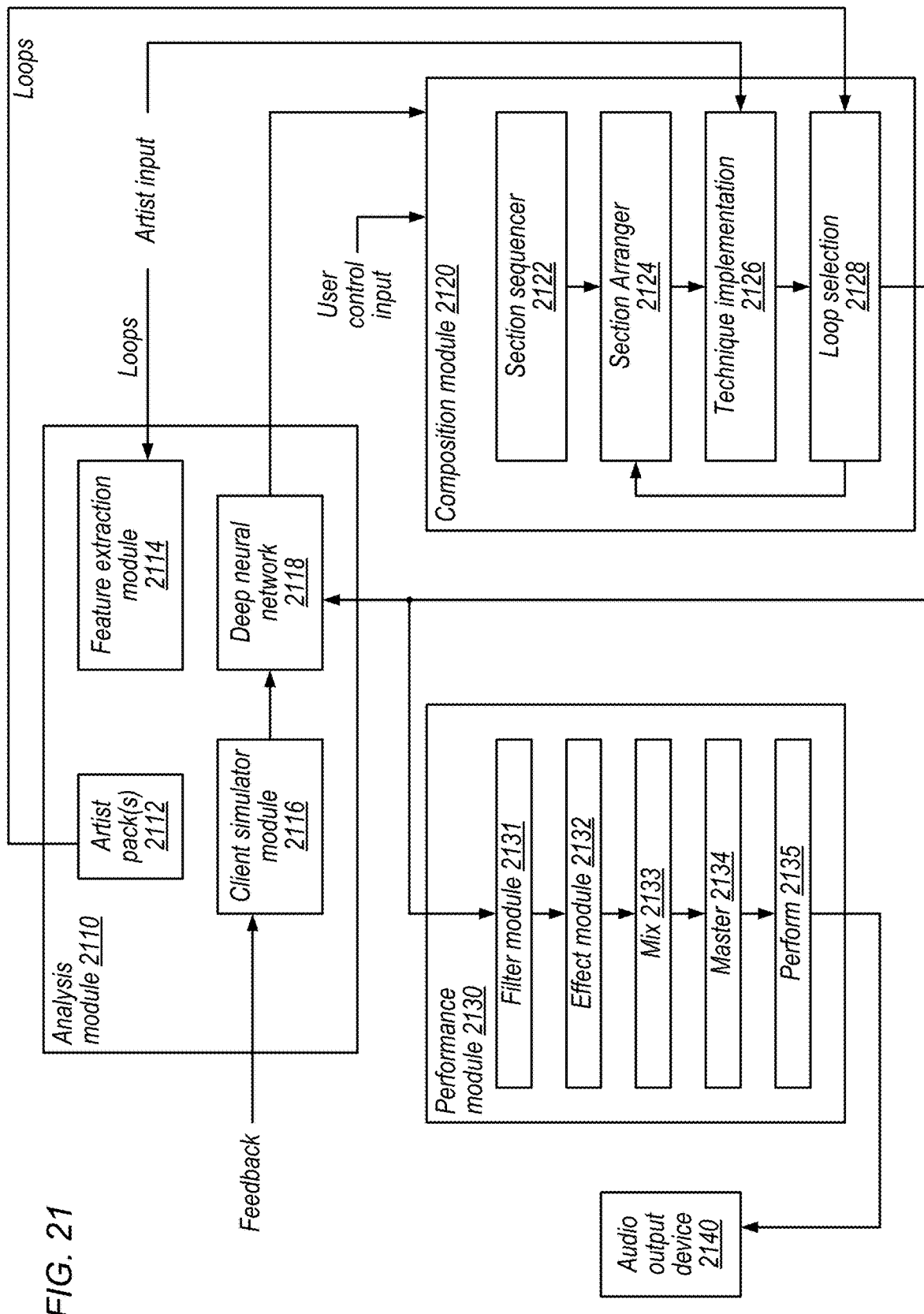
FIG. 21 is a block diagram illustrating an example music generator system that includes analysis and composition modules, according to some embodiments.
Figure 22:
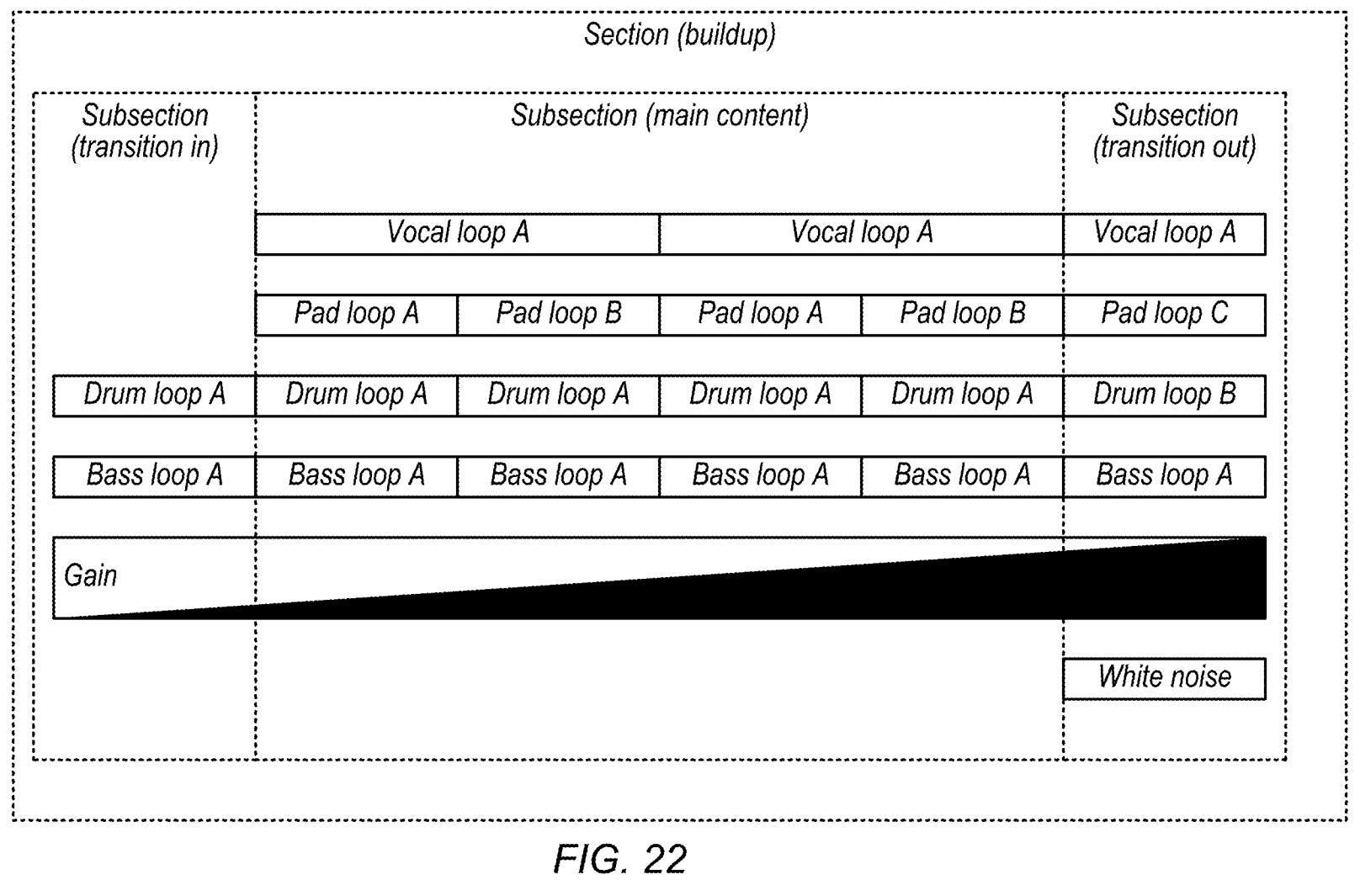
Figure 23:
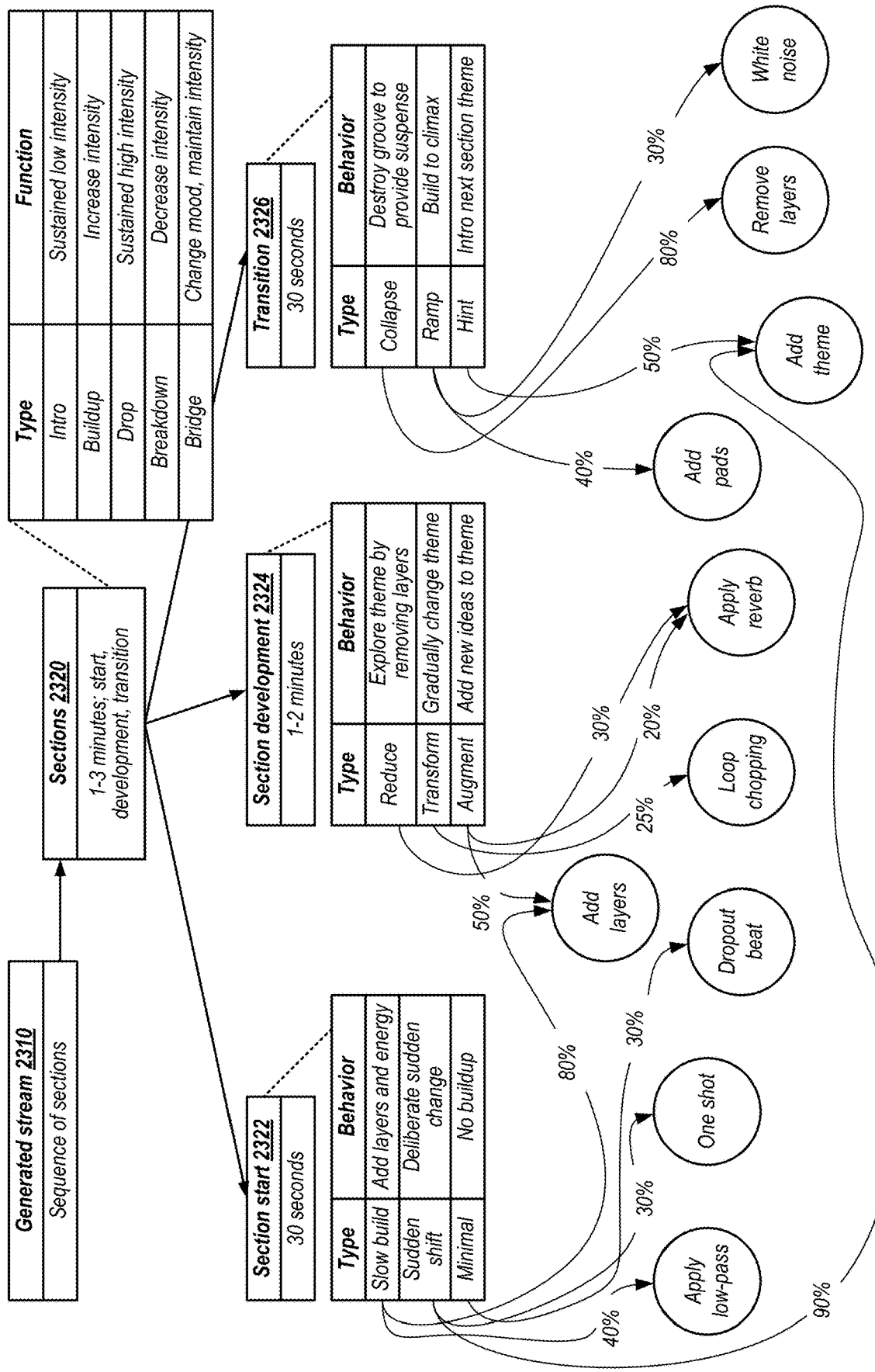
FIG. 23 is a diagram illustrating example techniques for arranging sections of music content, according to some embodiments.

FIGS. 21-23 show details regarding specific embodiments of music generator module 160. Note that although these specific examples are disclosed for purposes of illustration, they are not intended to limit the scope of the present disclosure. In these embodiments, construction of music from loops is performed by a client system, such as a personal computer, mobile device, media device, etc. As used in the discussion of FIGS. 21-23, the term "loops" may be interchangeable with the term "audio files". In general, loops are included in audio files, as described herein. Loops may be divided into professionally curated loop packs, which may be referred to as artist packs. Loops may be analyzed for music properties and the properties may be stored as loop metadata. Audio in constructed tracks may be analyzed (e.g., in real-time) and filtered to mix and master the output stream. Various feedback may be sent to the server, including explicit feedback such as from user interaction with sliders or buttons and implicit feedback, e.g., generated by sensors, based on volume changes, based on listening lengths, environment information, etc. In some embodiments, control inputs have known effects (e.g., to specify target music attributes directly or indirectly) and are used by the composition module.

The following discussion introduces various terms used with reference to FIGS. 21-23. In some embodiments, a loop library is a master library of loops, which may be stored by a server. Each loop may include audio data and metadata that describes the audio data. In some embodiments, a loop package is a subset of the loop library. A loop package may be a pack for a particular artist, for a particular mood, for a particular type of event, etc. Client devices may download loop packs for offline listening or download parts of loop packs on demand, e.g., for online listening.

A generated stream, in some embodiments, is data that specifies the music content that the user hears when they use the music generator system. Note that the actual output audio signals may vary slightly for a given generated stream, e.g., based on capabilities of audio output equipment.

A composition module, in some embodiments, constructs compositions from loops available in a loop package. The composition module may receive loops, loop metadata, and user input as parameters and may be executed by a client device. In some embodiments, the composition module outputs a performance script that is sent to a performance module and one or more machine learning engines. The performance script, in some embodiments, outlines which loops will be played on each track of the generated stream and what effects will be applied to the stream. The performance script may utilize beat-relative timing to represent when events occur. The performance script may also encode effect parameters (e.g., for effects such as reverb, delay, compression, equalization, etc.).

A performance module, in some embodiments, receives a performance script as input and renders it into a generated stream. The performance module may produce a number of tracks specified by the performance script and mix the tracks into a stream (e.g., a stereo stream, although the stream may have various encodings including surround encodings, object-based audio encodings, multi-channel stereo, etc. in various embodiments). In some embodiments, when provided with a particular performance script, the performance module will always produce the same output.

An analytics module, in some embodiments, is a server-implemented module that receives feedback information and configures the composition module (e.g., in real-time, periodically, based on administrator commands, etc.). In some embodiments, the analytics module uses a combination of machine learning techniques to correlate user feedback with performance scripts and loop library metadata.

FIG. 21 is a block diagram illustrating an example music generator system that includes analysis and composition modules, according to some embodiments. In some embodiments, the system of FIG. 21 is configured to generate a potentially-infinite stream of music with direct user control over the mood and style of music. In the illustrated embodiment, the system includes analysis module 2110, composition module 2120, performance module 2130, and audio output device 2140. In some embodiments, analysis module 2110 is implemented by a server and composition module 2120 and performance module 2130 are implemented by one or more client devices. In other embodiments, modules 2110, 2120, and 2130 may all be implemented on a client device or may all be implemented server-side.

Analysis module 2110, in the illustrated embodiment, stores one or more artist packs 2112 and implements a feature extraction module 2114, a client simulator module 2116, and a deep neural network 2118.

In some embodiments, feature extraction module 2114 adds loops to a loop library after analyzing loop audio (although note that some loops may be received with metadata already generated and may not require analysis). For example, raw audio in a format such as way, aiff, or FLAC may be analyzed for quantifiable musical properties such as instrument classification, pitch transcription, beat timings, tempo, file length, and audio amplitude in multiple frequency bins. Analysis module 2110 may also store more abstract musical properties or mood descriptions for loops, e.g., based on manual tagging by artists or machine listening. For example, moods may be quantified using multiple discrete categories, with ranges of values for each category for a given loop.

Consider, for example, a loop A that is analyzed to determine that the notes G2, Bb2, and D2 are used, the first beat begins 6 milliseconds into the file, the tempo is 122 bpm, the file is 6483 milliseconds long, and the loop has normalized amplitude values of 0.3, 0.5, 0.7, 0.3, and 0.2 across five frequency bins. The artist may label the loop as "funk genre" with the following mood values:

| Transcendence | Peacefulness | Power | Joy | Sadness | Tension |
|---|---|---|---|---|---|
| HIGH | HIGH | LOW | MEDIUM | NONE | LOW |

Analysis module 2110 may store this information in a database and clients may download subsections of the information, e.g., as loop packages. Although artists packs 2112 are shown for purposes of illustration, analysis module 2110 may provide various types of loop packages to composition module 2120.

Client simulator module 2116, in the illustrated embodiment, analyzes various types of feedback to provide feedback information in a format supported by deep neural network 2118. In the illustrated embodiment, the deep neural network 2118 also receives performance scripts generated by composition modules as inputs. In some embodiments, the deep neural network configures the composition module based on these inputs, e.g., to improve correlations between types of generated music output and desired feedback. For example, the deep neural network may periodically push updates to client devices implementing composition module 2120. Note that deep neural network 2118 is shown for purposes of illustration and may provide strong machine learning performance in disclosed embodiments, but is not intended to limit the scope of the present disclosure. In various embodiments, various types of machine learning techniques may be implemented alone or in various combinations to perform similar functionality. Note that machine learning modules may be used to implement rule sets (e.g., arrangement rules or techniques) directly in some embodiments or may be used to control modules implementing other types of rule sets, e.g., using deep neural network 2118 in the illustrated embodiment.

In some embodiments, analysis module 2110 generates composition parameters for composition module 2120 to improve correlation between desired feedback and use of certain parameters. For example, actual user feedback may be used to adjust composition parameters, e.g., to attempt to reduce negative feedback.

As one example, consider a situation where module 2110 discovers a correlation between negative feedback (e.g., explicit low rankings, low volume listening, short listening times, etc.) and compositions that use a high number of layers. In some embodiments, module 2110 uses a technique such as backpropagation to determine that adjusting probability parameters used to add more tracks reduces the frequency of this issue. For example, module 2110 may predict that reducing a probability parameter by 50% will reduce negative feedback by 8% and may determine to perform the reduction and push updated parameters to the composition module (note that probability parameters are discussed in detail below, but any of various parameters for statistical models may similarly be adjusted).

As another example, consider a situation where module 2110 discovers that negative feedback is correlated with the user setting mood control to high tension. A correlation between loops with low tension tags and users asking for high tension may also be found. In this case, module 2110 may increase a parameter such that the probability of selecting loops with high tension tags is increased when users ask for high tension music. Thus, the machine learning may be based on various information, including composition outputs, feedback information, user control inputs, etc.

Composition module 2120, in the illustrated embodiment, includes a section sequencer 2122, section arranger 2124, technique implementation module 2126, and loop selection module 2128. In some embodiments, composition module 2120 organizes and constructs sections of the composition based on loop metadata and user control input (e.g., mood control).

Section sequencer 2122, in some embodiments, sequences different types of sections. In some embodiments, section sequencer 2122 implements a finite state machine to continuously output the next type of section during operation. For example, composition module 2120 may be configured to use different types of sections such as an intro, buildup, drop, breakdown, and bridge, as discussed in further detail below with reference to FIG. 23. Further, each section may include multiple subsections that define how the music changes throughout a section, e.g., including a transition-in subsection, a main content subsection, and a transition-out subsection.

Section arranger 2124, in some embodiments, constructs subsections according to arranging rules. For example, one rule may specify to transition-in by gradually adding tracks. Another rule may specify to transition-in by gradually increasing gain on a set of tracks. Another rule may specify to chop a vocal loop to create a melody. In some embodiments, the probability of a loop in the loop library being appended to a track is a function of the current position in a section or subsection, loops that overlap in time on another track, and user input parameters such as a mood variable (which may be used to determine target attributes for generated music content). The function may be adjusted, e.g., by adjusting coefficients based on machine learning.

Technique implementation module 2120, in some embodiments, is configured to facilitate section arrangement by adding rules, e.g., as specified by an artist or determined by analyzing compositions of a particular artist. A "technique" may describe how a particular artist implements arrangement rules at a technical level. For example, for an arrangement rule that specifies to transition-in by gradually adding tracks, one technique may indicate to add tracks in order of drums, bass, pads, then vocals while another technique may indicate to add tracks in order of bass, pads, vocals, then drums. Similarly, for an arrangement rule that specifies to chop a vocal loop to create a melody a technique may indicate to chop vocals on every second beat and repeat a chopped section of loop twice before moving to the next chopped section.

Loop selection module 2128, in the illustrated embodiment, selects loops according to the arrangement rules and techniques, for inclusion in a section by section arranger 2124. Once sections are complete, corresponding performance scripts may be generated and sent to performance module 2130. Performance module 2130 may receive performance script portions at various granularities. This may include, for example, an entire performance script for a performance of a certain length, a performance script for each section, a performance script for each sub-section, etc. In some embodiments, arrangement rules, techniques, or loop selection are implemented statistically, e.g., with different approaches used different percentages of the time.

Performance module 2130, in the illustrated embodiment, includes filter module 2131, effect module 2132, mix module 2133, master module 2134, and perform module 2135. In some embodiments, these modules process the performance script and generate music data in a format supported by audio output device 2140. The performance script may specify the loops to be played, when they should be played, what effects should be applied by module 2132 (e.g., on a per-track or per-subsection basis), what filters should be applied by module 2131, etc.

For example, the performance script may specify to apply a low pass filter ramping from 1000 to 20000 Hz from 0 to 5000 milliseconds on a particular track. As another example, the performance script may specify to apply reverb with a 0.2 wet setting from 5000 to 15000 milliseconds on a particular track.

Mix module 2133, in some embodiments, is configured to perform automated level control for the tracks being combined. In some embodiments, mix module 2133 uses frequency domain analysis of the combined tracks to measure frequencies with too much or too little energy and applies gain to tracks in different frequency bands to even the mix. Master module 2134, in some embodiments, is configured to perform multi-band compression, equalization (EQ), or limiting procedures to generate data for final formatting by perform module 2135. The embodiment of FIG. 21 may automatically generate various output music content according to user input or other feedback information, while the machine learning techniques may allow for improved user experience over time.

FIG. 22 is a diagram illustrating an example buildup section of music content, according to some embodiments. The system of FIG. 21 may compose such a section by applying arranging rules and techniques. In the illustrated example, the buildup section includes three subsections and separate tracks for vocals, pad, drum, bass, and white noise.

The transition in subsection, in the illustrated example, includes a drum loop A, which is also repeated for the main content subsection. The transition in subsection also includes a bass loop A. As shown, the gain for the section begins low and increases linearly throughout the section (although non-linear increases or decreases are contemplated). The main content and transition-out subsection, in the illustrated example, include various vocal, pad, drum, and bass loops. As described above, disclosed techniques for automatically sequencing sections, arranging sections, and implementing techniques may generate near-infinite streams of output music content based on various user-adjustable parameters.

In some embodiments, a computer system displays an interface similar to FIG. 22 and allows artists to specify techniques used to compose sections. For example, artists may create structures such as shown in FIG. 22 which may be parsed into code for the composition module.

FIG. 23 is a diagram illustrating example techniques for arranging sections of music content, according to some embodiments. In the illustrated embodiment, a generated stream 2310 includes multiple sections 2320 that each include a start subsection 2322, development subsection 2324, and transition subsection 2326. In the illustrated example, multiple types of each section/subsection are show in tables connected via dotted lines. The circular elements, in the illustrated embodiment, are examples of arranging tools, which may further be implemented using specific techniques as discussed below. As shown, various composition decisions may be performed pseudo-randomly according to statistical percentages. For example, the types of subsections, the arranging tools for a particular type or subsection, or the techniques used to implement an arranging tool may be statistically determined.

In the illustrated example, a given section 2320 is one of five types: intro, buildup, drop, breakdown, and bridge, each with different functions that control intensity over the section. The state sub-section, in this example, is one of three types: slow build, sudden shift, or minimal, each with different behavior. The development sub-section, in this example, is one of three types: reduce, transform, or augment. The transition sub-section, in this example, is one of three types: collapse, ramp, or hint. The different types of sections and subsections may be selected based on rules or may be pseudo-randomly selected, for example.

In the illustrated example, the behaviors for different subsection types are implemented using one or more arranging tools. For a slow build, in this example, 40% of the time a low pass filter is applied and 80% of the time layers are added. For a transform development sub-section, in this example, 25% of the time loops are chopped. Various additional arranging tools are shown, including one-shot, dropout beat, apply reverb, add pads, add theme, remove layers, and white noise. These examples are included for purposes of illustration and are not intended to limit the scope of the present disclosure. Further, to facilitate illustration, these examples may not be complete (e.g., actual arranging may typically involve a much larger number of arranging rules).

In some embodiments, one or more arranging tools may be implemented using specific techniques (which may be artist specified or determined based on analysis of an artist's content). For example, one-shot may be implemented using sound-effects or vocals, loop chopping may be implemented using stutter or chop-in-half techniques, removing layers may be implemented by removing synth or removing vocals, white noise may be implemented using a ramp or pulse function, etc. In some embodiments, the specific technique selected for a given arranging tool may be selected according to a statistical function (e.g., 30% of the time removing layers may remove synths and 70% of the time it may remove vocals for a given artist). As discussed above, arranging rules or techniques may be determined automatically by analyzing existing compositions, e.g., using machine learning.

Example Methods

Figure 24:
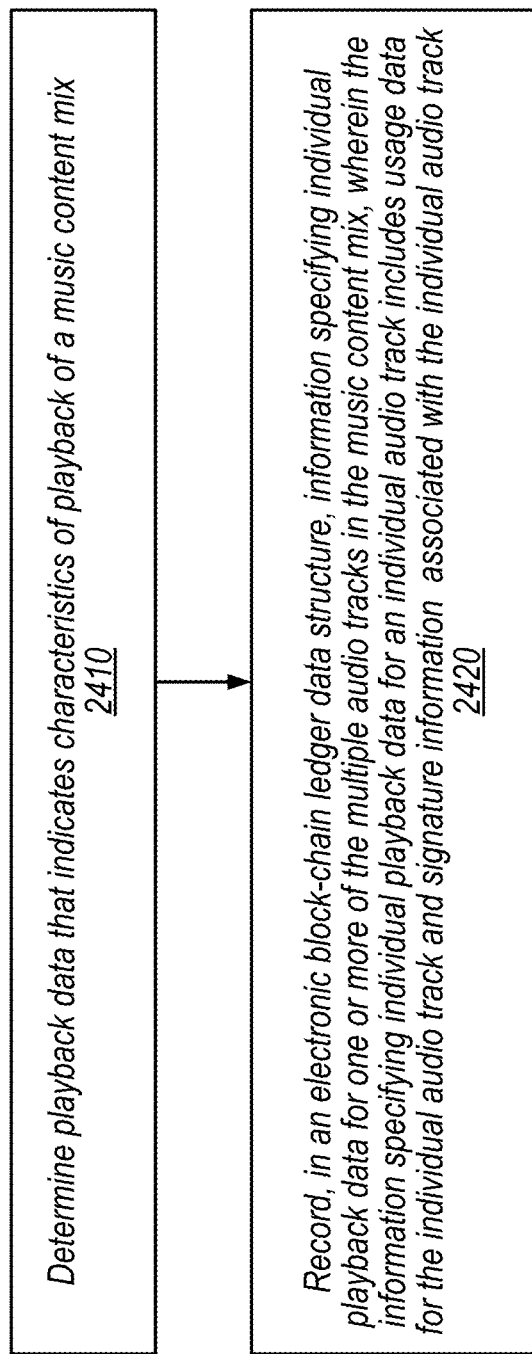
FIG. 24 is a flow diagram method for using a ledger, according to some embodiments.

FIG. 24 is a flow diagram method for using a ledger, according to some embodiments. The method shown in FIG. 24 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2410, in the illustrated embodiment, a computing device determines playback data that indicates characteristics of playback of a music content mix. The mix may be includes a determined combination of multiple audio tracks (note that the combination of tracks may be determined in real-time, e.g., just prior to output of the current portion of the music content mix, which may be a continuous stream of content). The determination may be based on composing the content mix (e.g., by a server or playback device such as a mobile phone) or may be received from another device that determines which audio files to include in the mix. The playback data may be stored (e.g., in an offline mode) and may be encrypted. The playback data may be reported periodically or in response to certain events (e.g., regaining connectivity to a server).

At 2420, in the illustrated embodiment, a computing device records, in an electronic block-chain ledger data structure, information specifying individual playback data for one or more of the multiple audio tracks in the music content mix. In the illustrated embodiment, the information specifying individual playback data for an individual audio track includes usage data for the individual audio track and signature information associated with the individual audio track.

In some embodiments, the signature information is an identifier for one or more entities. For example, the signature information may be a string or a unique identifier. In other embodiments, the signature information may be encrypted or otherwise obfuscated to avoid others from identifying the entit(ies). In some embodiments, the usage data includes at least one of: a time played for the music content mix or a number of times played for the music content mix.

In some embodiments, data identifying individual audio tracks in the music content mix is retrieved from a data store that also indicates an operation to be performed in association with inclusion of one or more individual audio tracks. In these embodiments, the recording may include recording an indication of proof of performance of the indicated operation.

In some embodiments, the system determines, based on information specifying individual playback data recorded in the electronic block-chain ledger, remuneration for a plurality of entities associated with the plurality of audio tracks.

In some embodiments, the system determines usage data for a first individual audio track that is not included in the music content mix in its original musical form. For example, the audio track may be modified, used to generate a new audio track, etc. and the usage data may be adjusted to reflect this modification or use. In some embodiments, the system generates a new audio track based on interpolating between vector representations of audio in at least two of the multiple audio tracks and the usage data is determined based on a distance between a vector representation of the first individual audio track and a vector representation of the new audio track. In some embodiments, the usage data is based on a ratio of a Euclidean distance from the interpolated vector representations and vectors in the at least two of the multiple audio tracks.

Figure 25:
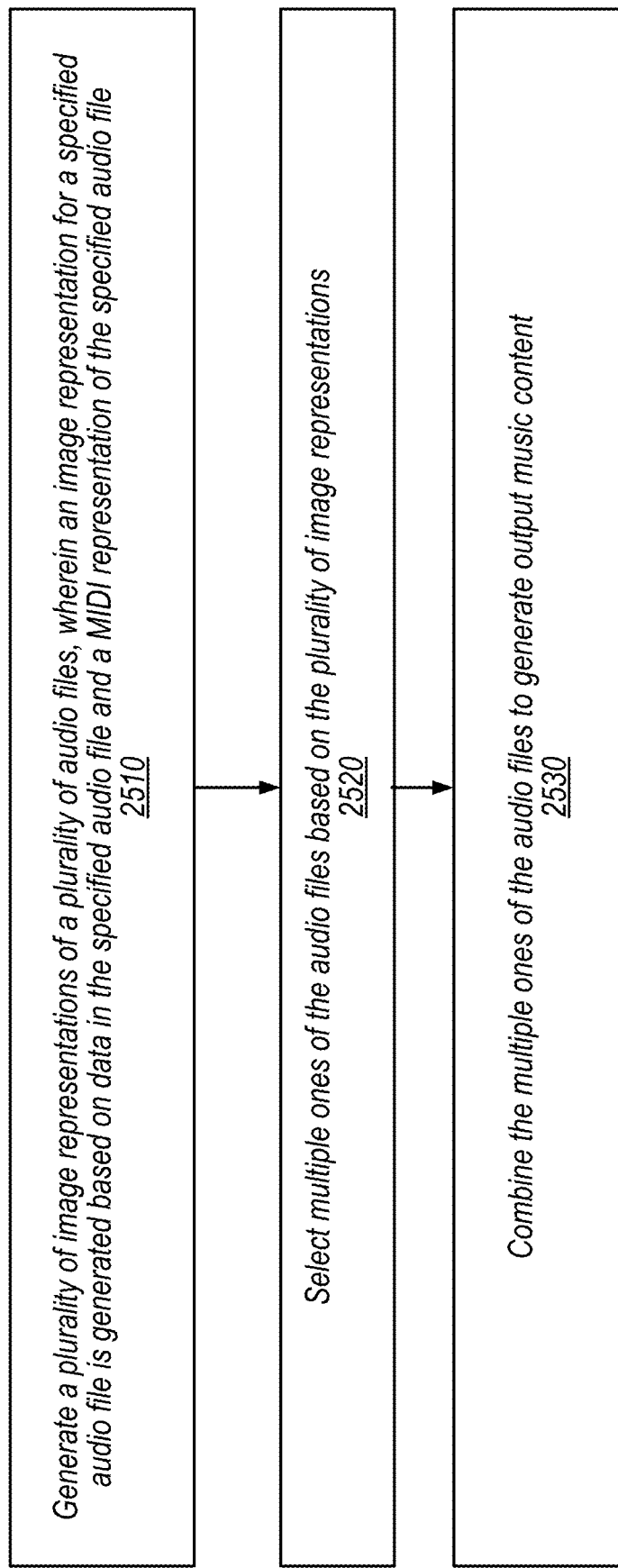
FIG. 25 is a flow diagram method for using image representations to combine audio files, according to some embodiments.

FIG. 25 is a flow diagram method for using image representations to combine audio files, according to some embodiments. The method shown in FIG. 25 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2510, in the illustrated embodiment, a computing device generates a plurality of image representations of a plurality of audio files where an image representation for a specified audio file is generated based on data in the specified audio file and a MIDI representation of the specified audio file). In some embodiments, pixel values in the image representations represent velocities in the audio files where the image representations are compressed in resolution of velocity.

In some embodiments, the image representations are two-dimensional representations of the audio files. In some embodiments, pitch is represented by rows in the two-dimensional representations where time is represented by columns in the two-dimensional representations and where pixel values in the two-dimensional representations represent velocities. In some embodiments, pitch is represented by rows in the two-dimensional representations where time is represented by columns in the two-dimensional representations and where pixel values in the two-dimensional representations represent velocities. In some embodiments, a pitch axis is banded into two sets of octaves in an 8 octave range, where a first 12 rows of pixels represents a first 4 octaves with a pixel value of a pixel determining which one of the first 4 octaves is represented, and where a second 12 rows of pixels represents a second 4 octaves with the pixel value of the pixel determining which one of the second 4 octaves is represented. In some embodiments, odd pixel values along a time axis represent note starts and even pixel values along the time axis represent note sustains. In some embodiments, each pixel represents a fraction of a beat in a temporal dimension.

At 2520, in the illustrated embodiment, a computing device selects multiple ones of the audio files based on the plurality of image representations.

At 2530, in the illustrated embodiment, a computing device combines the multiple ones of the audio files to generate output music content.

In some embodiments, one or more composition rules are applied to select the multiple ones of the audio files based on the plurality of image representations. In some embodiments, applying one or more composition rules includes removing pixel values in the image representations above a first threshold and removing pixel values in the image representations below a second threshold.

In some embodiments, one or more machine learning algorithms are applied to the image representations for selecting and combining the multiple ones of the audio files and generate the output music content. In some embodiments, harmony and rhythm coherence are tested in the output music content.

In some embodiments, a single image representation is generated from the plurality of image representations and a description of texture features is appended to the single image representation where the texture features are extracted from the plurality of audio files. In some embodiments, the single image representation is stored along with the plurality of audio files. In some embodiments, multiple ones of the audio files are selected by applying one or more composition rules on the single image representation.

Figure 26:
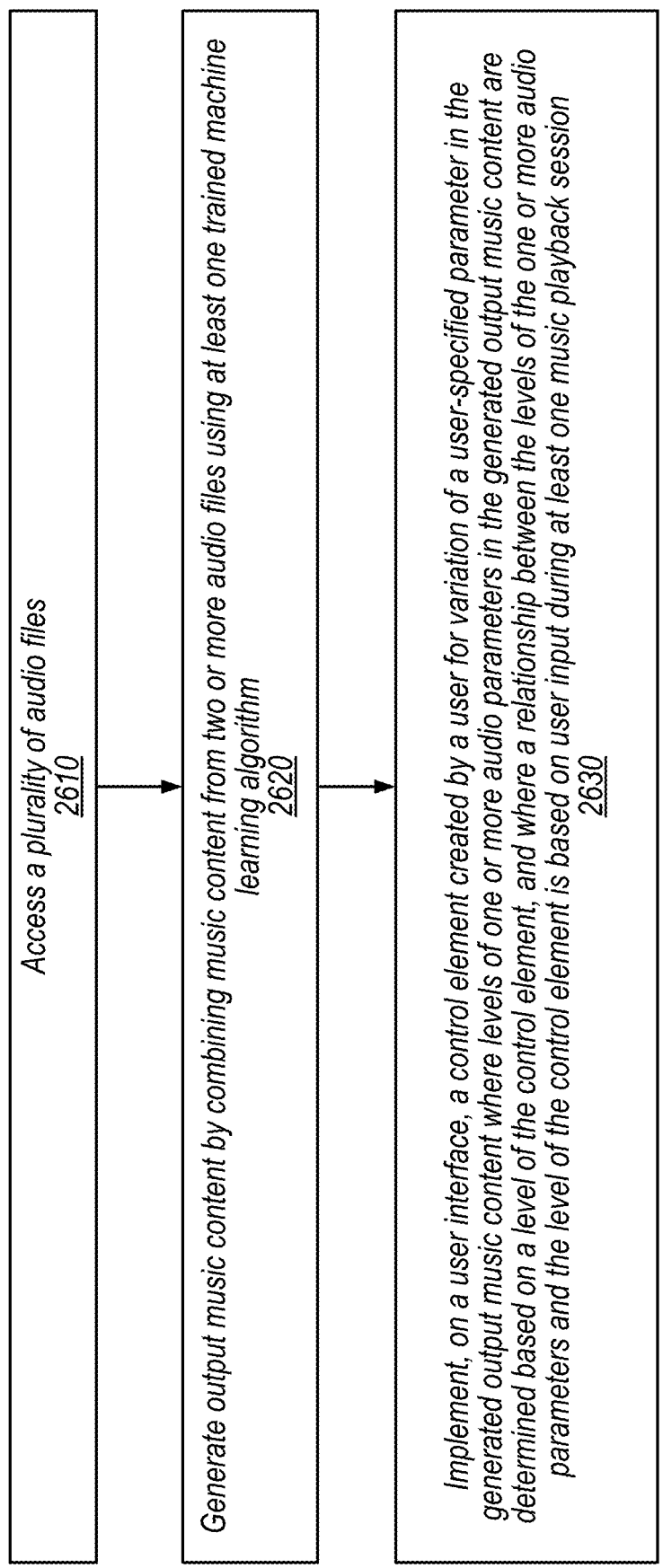
FIG. 26 is a flow diagram method for implementing user-created control elements, according to some embodiments.

FIG. 26 is a flow diagram method for implementing user-created control elements, according to some embodiments. The method shown in FIG. 26 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2610, in the illustrated embodiment, a computing device accesses a plurality of audio files. In some embodiments, the audio files are accessed from a memory of the computer system, wherein the user has rights to the accessed audio files.

At 2620, in the illustrated embodiment, a computing device generates output music content by combining music content from two or more audio files using at least one trained machine learning algorithm. In some embodiments, the combining of the music content is determined by the at least one trained machine learning algorithm based on the music content within the two or more audio files. In some embodiments, the at least one trained machine learning algorithm combines the music content by sequentially selecting music content from the two or more audio files based on the music content within the two or more audio files.

In some embodiments, the at least one trained machine learning algorithm has been trained to select music content for upcoming beats after a specified time based on metadata of music content played up to the specified time. In some embodiments, the at least one trained machine learning algorithm has further been trained to select music content for upcoming beats after the specified time based on the level of the control element.

At 2630, in the illustrated embodiment, a computing device implements, on a user interface, a control element created by a user for variation of a user-specified parameter in the generated output music content, where levels of one or more audio parameters in the generated output music content are determined based on a level of the control element, and where a relationship between the levels of the one or more audio parameters and the level of the control element is based on user input during at least one music playback session. In some embodiments, the level of the user-specified parameter is varied based on one or more environmental conditions.

In some embodiments, the relationship between the levels of the one or more audio parameters and the level of the control element is determined by: playing multiple audio tracks during the at least one music playback session, wherein the multiple audio tracks have varying audio parameters; receiving, for each of the audio tracks, an input specifying a user selected level of the user-specified parameter in the audio track; assessing, for each of the audio tracks, levels of one or more audio parameters in the audio track; and determining the relationship between the levels of the one or more audio parameters and the level of the control element based on correlations between each of the user selected levels of the user-specified parameter and each of the assessed levels of the one or more audio parameters.

In some embodiments, the relationship between the levels of the one or more audio parameters and the level of the control element is determined using one or more machine learning algorithms. In some embodiments, the relationship between the levels of the one or more audio parameters and the level of the control element is refined based on user variation of the level of the control element during playback of the generated output music content. In some embodiments, the levels of the one or more audio parameters in the audio tracks are assessed using metadata from the audio tracks. In some embodiments, the relationship between the levels of the one or more audio parameters and the level of the user-specified parameter is further based on additional user input during one or more additional music playback sessions.

In some embodiments, the computing device implements, on the user interface, at least one additional control element created by the user for variation of an additional user-specified parameter in the generated output music content where the additional user-specified parameter is a sub-parameter of the user-specified parameter. In some embodiments, the generated output music content is modified based on user adjustment of the level of the control element. In some embodiments, a feedback control element is implemented on the user interface where the feedback control element allows the user to provide positive or negative feedback on the generated output music content during playback. In some embodiments, the at least one trained machine algorithm modifies generation of subsequent generated output music content based on the feedback received during the playback.

Figure 27:
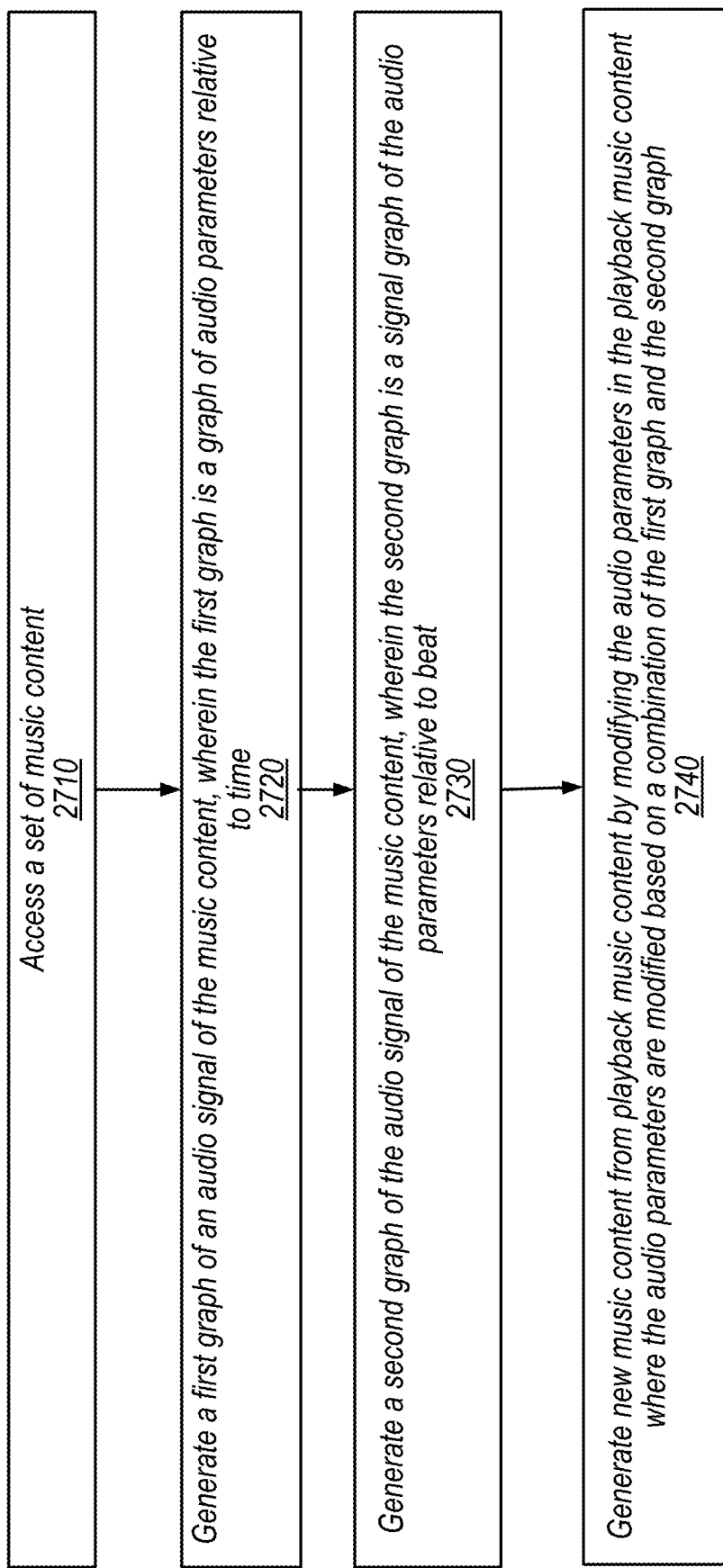
FIG. 27 is a flow diagram method for generating music content by modifying audio parameters, according to some embodiments.

FIG. 27 is a flow diagram method for generating music content by modifying audio parameters, according to some embodiments. The method shown in FIG. 27 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2710, in the illustrated embodiment, a computing device accesses a set of music content. In some embodiments.

At 2720, in the illustrated embodiment, a computing device generates a first graph of an audio signal of the music content where the first graph is a graph of audio parameters relative to time.

At 2730, in the illustrated embodiment, a computing device generates a second graph of the audio signal of the music content where the second graph is a signal graph of the audio parameters relative to beat. In some embodiments, the second graph of the audio signal has a similar structure to the first graph of the audio signal.

At 2740, in the illustrated embodiment, a computing device generates new music content from playback music content by modifying the audio parameters in the playback music content, wherein the audio parameters are modified based on a combination of the first graph and the second graph.

In some embodiments, the audio parameters in the first graph and the second graph are defined by nodes in the graphs that determine changes in properties of the audio signal. In some embodiments, generating the new music content includes: receiving the playback music content; determining a first node in the first graph corresponding to an audio signal in the playback music content; determining a second node in the second graph that corresponds to the first node; determining one or more specified audio parameters based on the second node; and modifying one or more properties of an audio signal in the playback music content by modifying the specified audio parameters. In some embodiments, one or more additional specified audio parameters are determined based on the first node and one or more properties of an additional audio signal in the playback music content are modified by modifying the additional specified audio parameters.

In some embodiments, determining the one or more audio parameters includes: determining a portion of the second graph to implement for the audio parameters based on a position of the second node in the second graph and selecting the audio parameters from the determined portion of the second graph as the one or more audio specified parameters. In some embodiments, modifying the one or more specified audio parameters modifies a portion of the playback music content that corresponds to the determined portion of the second graph. In some embodiments, the modified properties of the audio signal in the playback music content include signal amplitude, signal frequency, or a combination thereof.

In some embodiments, one or more automations are applied to the audio parameters where at least one of the automations is a pre-programmed temporal manipulation of at least one audio parameter. In some embodiments, one or more modulations are applied to the audio parameters where at least one of the modulations modifies at least one audio parameter multiplicatively on top of at least one automation.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
accessing, by a computer system, a plurality of audio files;
generating output music content by combining music content from two or more audio files using at least one trained machine learning algorithm; and
implementing, on a user interface associated with the computer system, a control element created by a user, the control element having a label created by the user to describe a user defined parameter that controls a combination of multiple audio parameters in the generated output music content, the audio parameters being different than the user-defined parameter, wherein a level of the control element on the user interface determines a level of the user-defined parameter, levels of the multiple audio parameters in the generated output music content being determined according to a relationship that defines the levels of each of the multiple audio parameters based on the level of the user-defined parameter, wherein the relationship has been determined from user input during a playback session of multiple audio tracks, the user input being selection of the level of the user-defined parameter in each of the multiple audio tracks played during the playback session, and wherein the relationship is based on assessment of correlations between the levels of the audio parameters and the selected level of the user-defined parameter for each of the multiple audio tracks.

2. The method of claim 1, wherein the combining of the music content is determined by the at least one trained machine learning algorithm based on the music content within the two or more audio files.

3. The method of claim 1, wherein the at least one trained machine learning algorithm combines the music content by sequentially selecting music content from the two or more audio files based on the music content within the two or more audio files.

4. The method of claim 1, wherein the at least one trained machine learning algorithm has been trained to select music content for upcoming beats after a specified time based on metadata of music content played up to the specified time.

5. The method of claim 4, wherein the at least one trained machine learning algorithm has further been trained to select music content for upcoming beats after the specified time based on the level of the control element.

6. The method of claim 1, wherein the relationship that defines the levels of each of the multiple audio parameters based on the level of the user-defined parameter is determined by assessing the levels of the audio parameters and the selected level of the user-defined parameter for each of the multiple audio tracks using one or more machine learning algorithms.

7. The method of claim 1, further comprising refining the relationship that defines the levels of each of the multiple audio parameters based on the level of the user-defined parameter according to user variation of the level of the control element during playback of the generated output music content.

8. The method of claim 1, wherein the levels of the audio parameters in the multiple audio tracks are assessed using metadata from the multiple audio tracks.

9. The method of claim 1, further comprising varying, by the computer system, the level of the user defined parameter based on one or more environmental conditions.

10. The method of claim 1, further comprising implementing, on the user interface associated with the computer system, at least one additional control element created by the user for variation of an additional user defined parameter in the generated output music content, wherein the additional user defined parameter is a sub-parameter of the user defined parameter, and wherein the additional user-defined parameter controls a different combination of multiple audio parameters.

11. The method of claim 1, further comprising accessing the audio files from a memory of the computer system, wherein the user has rights to the accessed audio files.

12. The method of claim 1, wherein the user-defined parameter is a parameter created by the user to allow custom control of the combination of multiple audio parameters, wherein the combination of multiple audio parameters custom controlled by the user-defined parameter are determined during the playback session.

13. The method of claim 1, wherein adjustment of the level of the control element adjusts the level of each of the multiple audio parameters in the combination of multiple audio parameters according to the relationship that defines the levels of each of the multiple audio parameters based on the level of the user-defined parameter.

14. A non-transitory computer-readable medium having instructions stored thereon that are executable by a computing device to perform operations comprising:
accessing a plurality of audio files;
generating output music content by combining music content from two or more audio files using at least one trained machine learning algorithm; and
implementing, on a user interface, a control element created by a user, the control element having a label created by the user to describe a user defined parameter that controls a combination of multiple audio parameters in the generated output music content, the audio parameters being different than the user-defined parameter, wherein a level of the control element on the user interface determines a level of the user-defined parameter, levels of the multiple audio parameters in the generated output music content being determined according to a relationship that defines the levels of each of the multiple audio parameters based on the level of the user-defined parameter, wherein the relationship has been determined from user input during a playback session of multiple audio tracks, the user input being selection of the level of the user-defined parameter in each of the multiple audio tracks played during the playback session, and wherein the relationship is based on assessment of correlations between the levels of the audio parameters and the selected level of the user-defined parameter for each of the multiple audio tracks.

15. The non-transitory computer-readable medium of claim 14, further comprising modifying the generated output music content based on user adjustment of the level of the control element.

16. The non-transitory computer-readable medium of claim 14, wherein the relationship that defines the levels of each of the multiple audio parameters based on the level of the user-defined parameter is further based on additional user input during one or more additional music playback sessions.

17. The non-transitory computer-readable medium of claim 16, further comprising implementing, on the user interface, a feedback control element, wherein the feedback control element allows the user to provide positive or negative feedback on the generated output music content during playback.

18. The non-transitory computer-readable medium of claim 17, wherein the at least one trained machine algorithm modifies generation of subsequent generated output music content based on the feedback received during the playback.

19. An apparatus, comprising:
one or more processors; and
one or more memories having program instructions stored thereon that are executable by the one or more processors to:
 access a plurality of audio files;
 generate output music content by combining music content from two or more audio files using at least one trained machine learning algorithm; and
 implement, on a user interface, a control element created by a user, the control element having a label created by the user to describe a user defined parameter that controls a combination of multiple audio parameters in the generated output music content, the audio parameters being different than the user-defined parameter, wherein a level of the control element on the user interface determines a level of the user-defined parameter, levels of the multiple audio parameters in the generated output music content being determined according to a relationship that defines the levels of each of the multiple audio parameters based on the level of the user-defined parameter, wherein the relationship has been determined from user input during a playback session of multiple audio tracks, the user input being selection of the level of the user-defined parameter in each of the multiple audio tracks played during the playback session, and wherein the relationship is based on assessment of correlations between the levels of the audio parameters and the selected level of the user-defined parameter for each of the multiple audio tracks.

20. The apparatus of claim 19, wherein the program instructions stored on the one or memories are further executable to play the generated output music content on the apparatus and allow the user to vary the level of the user defined parameter by setting the level of the control element.

* * * * *